(12) United States Patent
Motomura et al.

(10) Patent No.: US 7,961,222 B2
(45) Date of Patent: Jun. 14, 2011

(54) IMAGE CAPTURING APPARATUS AND IMAGE CAPTURING METHOD

(75) Inventors: Hideto Motomura, Nara (JP); Katsuhiro Kanamori, Nara (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 12/294,368

(22) PCT Filed: Mar. 13, 2008

(86) PCT No.: PCT/JP2008/000580
§ 371 (c)(1),
(2), (4) Date: Sep. 24, 2008

(87) PCT Pub. No.: WO2008/114499
PCT Pub. Date: Sep. 25, 2008

(65) Prior Publication Data
US 2009/0096879 A1  Apr. 16, 2009

(30) Foreign Application Priority Data

Mar. 20, 2007 (JP) ................................ 2007-073148

(51) Int. Cl.
*H04N 5/228* (2006.01)
(52) U.S. Cl. .................................................. 348/208.6
(58) Field of Classification Search ............... 348/208.6
See application file for complete search history.

(56) References Cited

U.S. PATENT DOCUMENTS

| | | | |
|---|---|---|---|
| 5,012,270 A | 4/1991 | Sekine et al. | |
| 5,237,405 A | 8/1993 | Egusa et al. | |
| 5,712,474 A * | 1/1998 | Naneda ..................... | 250/208.1 |
| 7,512,328 B2 * | 3/2009 | Suda ............................. | 396/52 |
| 2005/0259739 A1 * | 11/2005 | Nakamura et al. ....... | 375/240.16 |
| 2007/0065127 A1 * | 3/2007 | Suda ............................. | 396/52 |
| 2009/0167959 A1 * | 7/2009 | Nakamura et al. ......... | 348/699 |

FOREIGN PATENT DOCUMENTS

| | | |
|---|---|---|
| JP | 1-264373 | 10/1989 |
| JP | 3-198488 | 8/1991 |
| JP | 4-180370 | 6/1992 |
| JP | 5-22645 | 1/1993 |
| JP | 6-350895 | 12/1994 |
| JP | 7-107369 | 4/1995 |
| JP | 2506469 | 4/1996 |
| JP | 8-251473 | 9/1996 |
| JP | 2001-160062 | 6/2001 |
| JP | 2003-58893 | 2/2003 |
| JP | 2005-252570 | 9/2005 |

OTHER PUBLICATIONS

International Search Report issued Apr. 15, 2008 in the International (PCT) Application of which the present application is the U.S. National Stage.

* cited by examiner

*Primary Examiner* — James M Hannett
(74) *Attorney, Agent, or Firm* — Wenderoth, Lind & Ponack, L.L.P.

(57) ABSTRACT

To provide an image capturing apparatus that detects a camera movement accurately and corrects image blurring appropriately. An image capturing apparatus (200) includes: an image sensor unit (103) that captures and outputs an input image (105); an output unit (121) that outputs an image of a framing area (160) of the input image (105); a motion vector calculation unit (106) and a stationary object detection unit (201) that detect motion vectors in an outer-frame area (161) of the input image (105) and derive detection accuracy; an outer-frame area adjustment unit (205) that adjusts the outer-frame area (161) in size so that the detection accuracy meets an outer-frame area change threshold (tr); and a camera movement calculation unit (113) and a framing area modification unit (115) that move the framing area (160) according to motion vectors in the adjusted outer-frame area (161), irrespective of motion vectors in the other area.

15 Claims, 32 Drawing Sheets

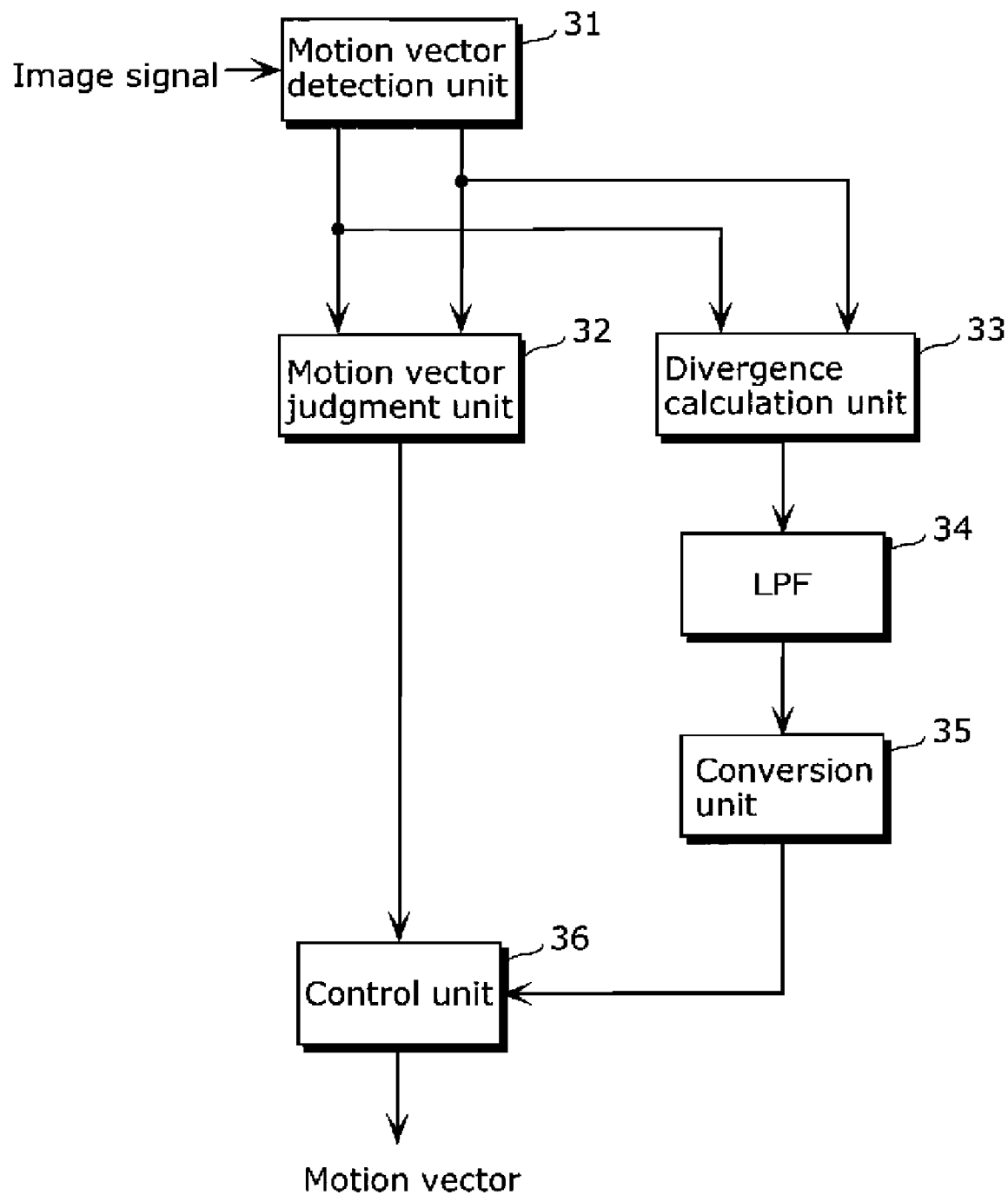

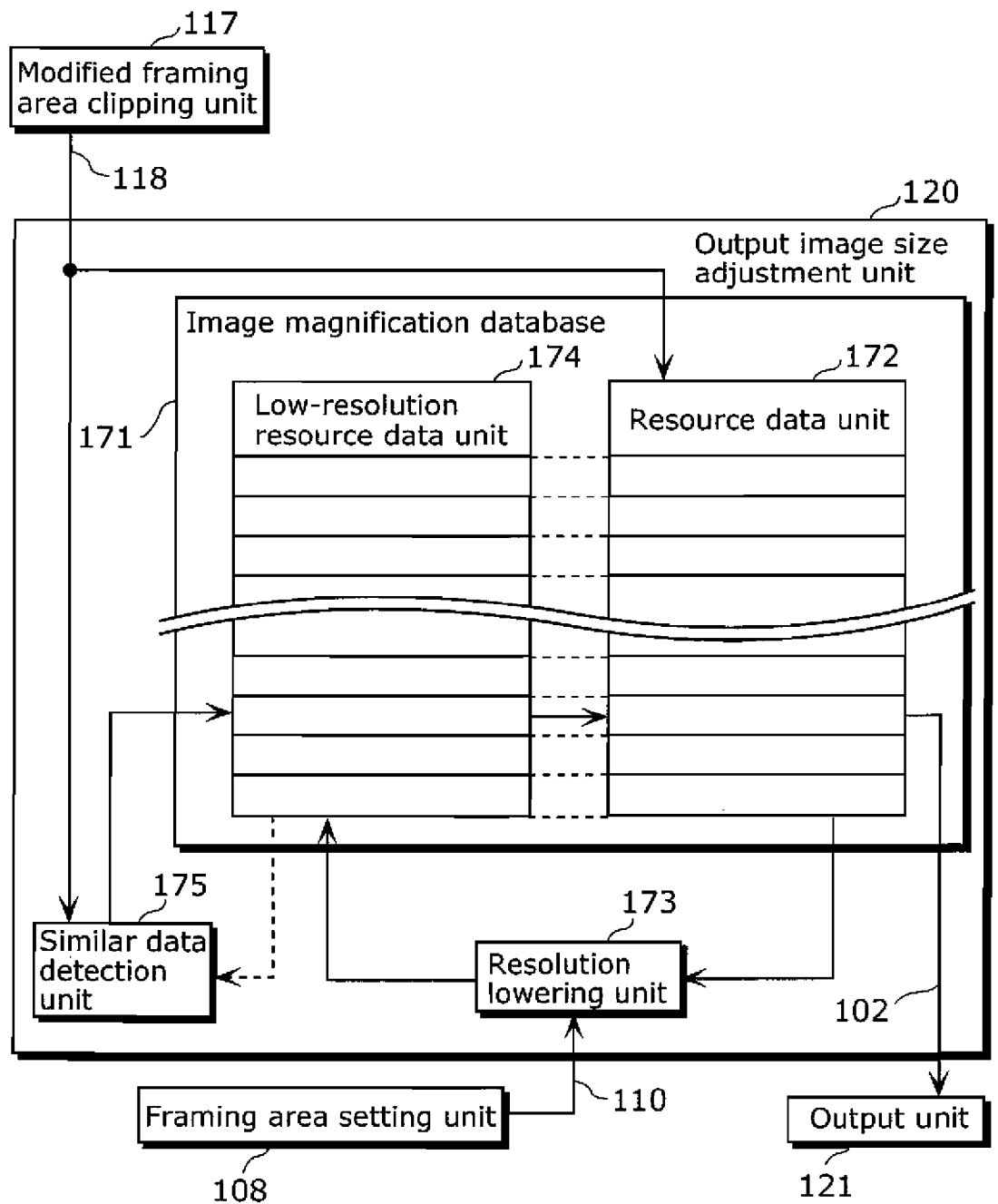

IMAGE CAPTURING APPARATUS AND IMAGE CAPTURING METHOD

TECHNICAL FIELD

The present invention relates to an image capturing apparatus and image capturing method for correcting image blurring that occurs when capturing an image.

BACKGROUND ART

In recent years, with the development of imaging devices of higher densities, there is a remarkable trend toward higher resolution and downsizing of digital video cameras and digital still cameras. In an imaging device of a higher density, an area of a light-receiving element is smaller, so that long exposure time is required to ensure a Signal/Noise (S/N) ratio. When a position of a camera moves during exposure, image blurring occurs. To move the camera as little as possible, a photographer needs considerations such as fixing the camera to a tripod or, in the case of a handheld camera, holding the camera with the elbows brought tightly into the body.

Cameras provided with image blurring correction functions have been put to practical use, in order to reduce the burden of image blurring prevention on photographers. A fundamental concept of the image blurring correction functions is to detect a camera movement and obtain a captured image so as to compensate for the camera movement. Specific methods of compensating for the camera movement can be roughly classified into two types, namely, "electronic type" and "optical type". The electronic type is a method of clipping a part of a captured image, whereby a clipping position is moved in an opposite direction to a camera movement to compensate for image blurring.

FIGS. 1A to 1C are explanatory views of an example of the electronic-type image blurring correction function.

As shown in FIG. 1A, a camera sets a clipping frame 11 which is smaller than a captured image 10. The camera outputs an image of the clipping frame 11 as an output image 12, which is displayed on a display screen or recorded on a recording medium. A captured image 13 shown in FIG. 1B is an image of a frame immediately following the captured image 10. A camera movement 14 occurs during a period from the image capturing in FIG. 1A to the image capturing in FIG. 1B. Without the image blurring correction function, even when a subject 15 is stationary, the position of the subject 15 in the screen changes as shown by an output image 16. This difference between the output image 12 and the output image 16 is "image blurring". If both the camera and the subject are stationary, the position of the subject in the output image should be unchanged.

Accordingly, the camera having the image blurring correction function moves the clipping frame 11 by a camera movement correction vector 17 that has an opposite direction to and a same magnitude as the camera movement 14 as shown in FIG. 1C, thereby resolving image blurring and obtaining an output image 18 which is the same as the output image 12.

On the other hand, a camera having the optical-type image blurring correction function mechanically moves a lens system or an imaging device so as to compensate for the camera movement. That is, image blurring correction is performed directly on an image formed on the imaging device.

In electronic-type image blurring correction, the clipping frame 11 is moved in accordance with the camera movement, as explained with reference to FIGS. 1A to 1C. This requires accurate detection of the camera movement. The camera movement is detected on the basis of a movement of a captured image. When the subject is stationary, the accurate camera movement can be easily detected. In reality, however, there is a case where an image of a moving subject is captured. In particular, a video camera is mainly intended for recording a moving image by following a movement of a subject with time, and so there is hardly any instance where the subject is stationary.

In view of this, for example Patent References 1 to 3 disclose electronic-type image blurring correction techniques that can correct image blurring even in the case of capturing an image of a moving subject.

FIG. 2 is a block diagram showing a structure of a motion vector detection apparatus included in an image capturing apparatus of Patent Reference 1.

This motion vector detection apparatus includes a motion vector detection unit 31, a motion vector judgment unit 32, a divergence calculation unit 33, an LPF 34, a conversion unit 35, and a control unit 36.

The motion vector detection unit 31 detects a motion vector for each block of a captured image.

FIGS. 3A and 3B each show a motion vector detected for each block.

As shown in FIG. 3A, the motion vector detection unit 31 divides a captured image 20 into a plurality of blocks, and detects a motion vector for each block. In the case where a subject is stationary, motion vectors of all blocks are in agreement, and these motion vectors represent a camera movement. In the case where a moving subject is present, on the other hand, motion vectors of all blocks are not in agreement. In this case, the motion vector detection unit 31 detects motion vectors having different directions, as shown in FIG. 3B. The divergence calculation unit 33 calculates "divergence" indicating an extent of distribution of these motion vectors. The control unit 36 calculates an overall motion vector (camera movement) of the captured image 20 according to the divergence. In detail, the conversion unit 35 sets a relation between a motion vector coefficient for controlling a magnitude of the overall motion vector of the captured image and the divergence so that the magnitude of the motion vector decreases as the divergence increases.

FIG. 4 shows the relation between the motion vector coefficient and the divergence.

The conversion unit 35 decreases the motion vector coefficient of the motion vector when the divergence is larger, to reduce the effect of the motion vectors having larger divergence on the overall motion vector of the captured image. The control unit 36 controls the magnitude of the overall motion vector of the captured image on the basis of this processing result of the conversion unit 35.

Thus, even when the captured image contains a moving subject, the image capturing apparatus of Patent Reference 1 can correct image blurring by reducing the effect of motion vectors of the subject.

Meanwhile, Patent References 2 and 3 disclose techniques of detecting a camera movement by using only motion vectors in an outer part of a captured image, without using motion vectors in an entire area of the captured image. In detail, an image capturing apparatus of Patent Reference 2 detects a camera movement by using motion vectors in four corners of a captured image. Often a captured image contains a moving subject in its center part and a stationary background in its outer part such as the four corners. This being so, image capturing apparatuses of Patent References 2 and 3 detect a camera movement using only motion vectors in the outer part, and move the clipping frame according to the detected camera movement.

In this way, even when a captured image includes a moving subject, the image capturing apparatuses of Patent References 2 and 3 can correct image blurring by detecting a camera movement using only motion vectors in the outer part where the moving subject is not present.

Patent Reference 1: Japanese Patent No. 2506469 (FIGS. 1 and 2)
Patent Reference 2: Japanese Unexamined Patent Application Publication No. 6-350895 (paragraph 0007, FIG. 2)
Patent Reference 3: Japanese Unexamined Patent Application Publication No. 5-22645

DISCLOSURE OF INVENTION

Problems that Invention is to Solve

However, the above image capturing apparatuses of Patent References 1 to 3 have problems of failing to detect a camera movement accurately and correct image blurring appropriately.

In the image capturing apparatus of Patent Reference 1, the divergence of the motion vectors of the individual blocks increases when the subject moves actively, which leads to a decrease in magnitude of the overall motion vector of the captured image. This causes the situation where, when the divergence is large, a camera movement cannot be detected accurately and image blurring cannot be corrected appropriately. In particular, a video camera mainly captures an image of a moving subject. Hence it is more difficult to detect a camera movement in the case of a video camera than in the case of a still camera.

Moreover, in the image capturing apparatuses of Patent References 2 and 3, when a moving subject appears large in the outer part of the captured image, the motion vectors detected in the outer part have a large dispersion. This makes it impossible to detect a camera movement accurately and correct image blurring appropriately.

The present invention was conceived in view of the above problems, and has an object to provide an image capturing apparatus that detects a camera movement accurately and corrects image blurring appropriately.

Means to Solve the Problems

To achieve the stated object, an image capturing apparatus according to the present invention is an image capturing apparatus that captures an image and corrects blurring of the captured image, the image capturing apparatus including: an image capturing unit that captures an image; an output unit that outputs an image of a framing area, the framing area being a part of a spatial area of the image captured by the image capturing unit; a movement detection unit that detects motion vectors in an outer area in the spatial area of the image captured by the image capturing unit, and derives a dispersion of the detected motion vectors as detection accuracy; an area adjustment unit that adjusts a size of the outer area so that the detection accuracy derived by the movement detection unit meets a predetermined threshold; and a correction unit that corrects blurring of the image outputted by the output unit, by moving the framing area according to the motion vectors detected by the movement detection unit in the outer area of the size which has been adjusted by the area adjustment unit, irrespective of a movement of an image in an inner area in the spatial area.

For example, when capturing a moving image, a photographer usually captures the image so that a moving subject is positioned at a center of a screen. Therefore, a movement of the moving image that allows a movement (blurring) of the image capturing apparatus to be appropriately specified is unlikely to be present in an inner area, e.g., a framing area, of the moving image which is a captured image or an input image. On the other hand, the movement of the moving image that allows the movement (blurring) of the image capturing apparatus to be appropriately specified is often present in an outer area (outer-frame area) of the moving image.

In view of this, the present invention moves the framing area according to the movement of the image in the outer area, irrespective of the movement of the image in the inner area. By doing so, the framing area can be appropriately moved in a direction and a distance that compensate for the movement (blurring) of the image capturing apparatus, without being affected by the movement of the subject. As a result, the image blurring of the framing area can be appropriately corrected even when the subject moves actively.

In other words, even when the subject which the photographer wants to capture moves, a stationary object present around the subject can be captured in the outer area (outer-frame area). By obtaining motion vectors of such a stationary object, the image blurring correction can be performed stably.

Moreover, according to the present invention, the detection accuracy of motion vectors in the outer area is derived and the size of the outer area is adjusted so that the detection accuracy meets a predetermined threshold. For example, the detection accuracy is expressed by an inverse of a variance of the motion vectors.

When a moving subject appears large in the outer area, the motion vectors in the outer area have a large variance, and so the detection accuracy is lower than the predetermined threshold. In such a case, for example the outer area is adjusted to be larger so that the detection accuracy meets the predetermined threshold. Which is to say, when the outer area is adjusted to be larger, a proportion of a stationary background occupying the outer area can be increased, with it being possible to improve the detection accuracy. As a result, the camera movement (the movement of the image capturing apparatus) can be detected accurately by using motion vectors having high detection accuracy, namely, motion vectors having a small variance, without being affected by the moving subject. Thus, the image blurring can be corrected appropriately.

It should be noted that the present invention can be realized not only as the above image capturing apparatus, but also as an image capturing method or a program corresponding to the image capturing apparatus, a recording medium on which the program is stored, or an image capturing and recording/reproduction apparatus having a recording and reproduction function.

Effects of the Invention

The image capturing apparatus according to the present invention has an advantage of detecting a camera movement accurately and correcting image blurring appropriately. A photographer does not need to pay consideration to prevent image blurring such as by using a tripod or holding a camera with the elbows brought tightly into the body, and is allowed to concentrate on the act of image capturing itself such as framing. In addition, even a beginner who has little knowledge of image blurring can capture an unblurred image. This enhances the convenience of video capturing, and leads to expansion of user base and usage scenes.

BRIEF DESCRIPTION OF DRAWINGS

FIG. 2 is a block diagram showing a structure of a motion vector detection apparatus included in a conventional image capturing apparatus.

FIG. 12 is a block diagram showing an internal structure of an output image size adjustment unit that performs a magnification process in the first embodiment of the present invention.

Figure 1A:
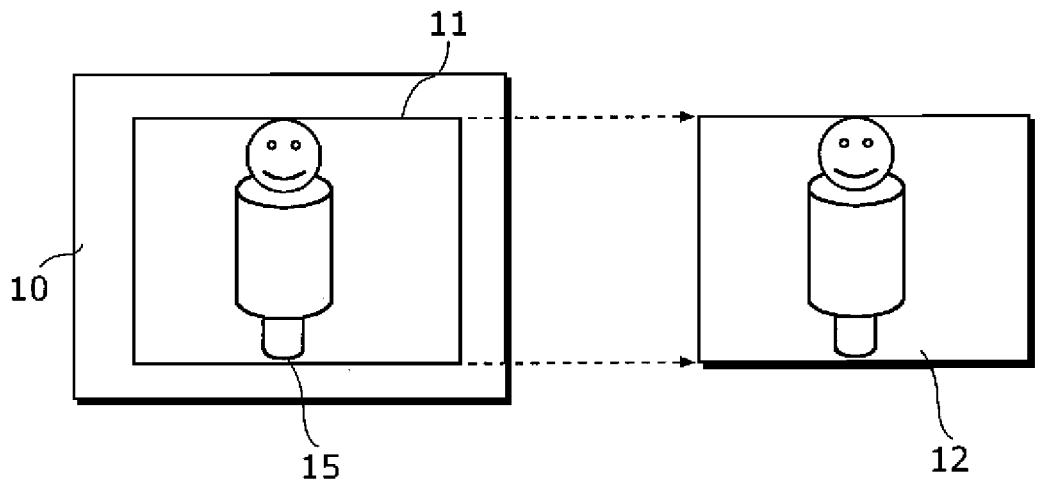
FIG. 1A is an explanatory view of a principle of conventional electronic-type image blurring correction.

NUMERICAL REFERENCES 100, 200, 300, 400 Image capturing apparatus
500, 600 Image capturing and recording/reproduction apparatus
101 Subject
102 Output image
103 Image sensor unit
104 Focal length fixed lens system
106 Motion vector calculation unit
108, 402 Framing area setting unit
109 Framing area display unit
111, 401 Stationary object detection unit
113 Camera movement calculation unit
115 Framing area modification unit
117 Modified framing area clipping unit
119 Display image size adjustment unit
120 Output image size adjustment unit 121 Output unit
122 Output image size selection unit
202 Focal length variable lens unit
205 Outer-frame area adjustment unit
207, 302, 403 Focal length calculation unit
301 Zoom factor designation unit
501, 601 Image capturing and recording unit
502, 602 Reproduction unit
503, 604 Recording medium unit
506 Reproduction instruction unit

BEST MODE FOR CARRYING OUT THE
INVENTION

The following describes embodiments of the present invention in detail, with reference to drawings.

First Embodiment

An image capturing apparatus in the first embodiment of the present invention captures an image with a wider angle of view than an angle of view set by a photographer, and corrects image blurring when clipping an output image to be outputted from the image capturing apparatus out of the captured image.

Figure 5:
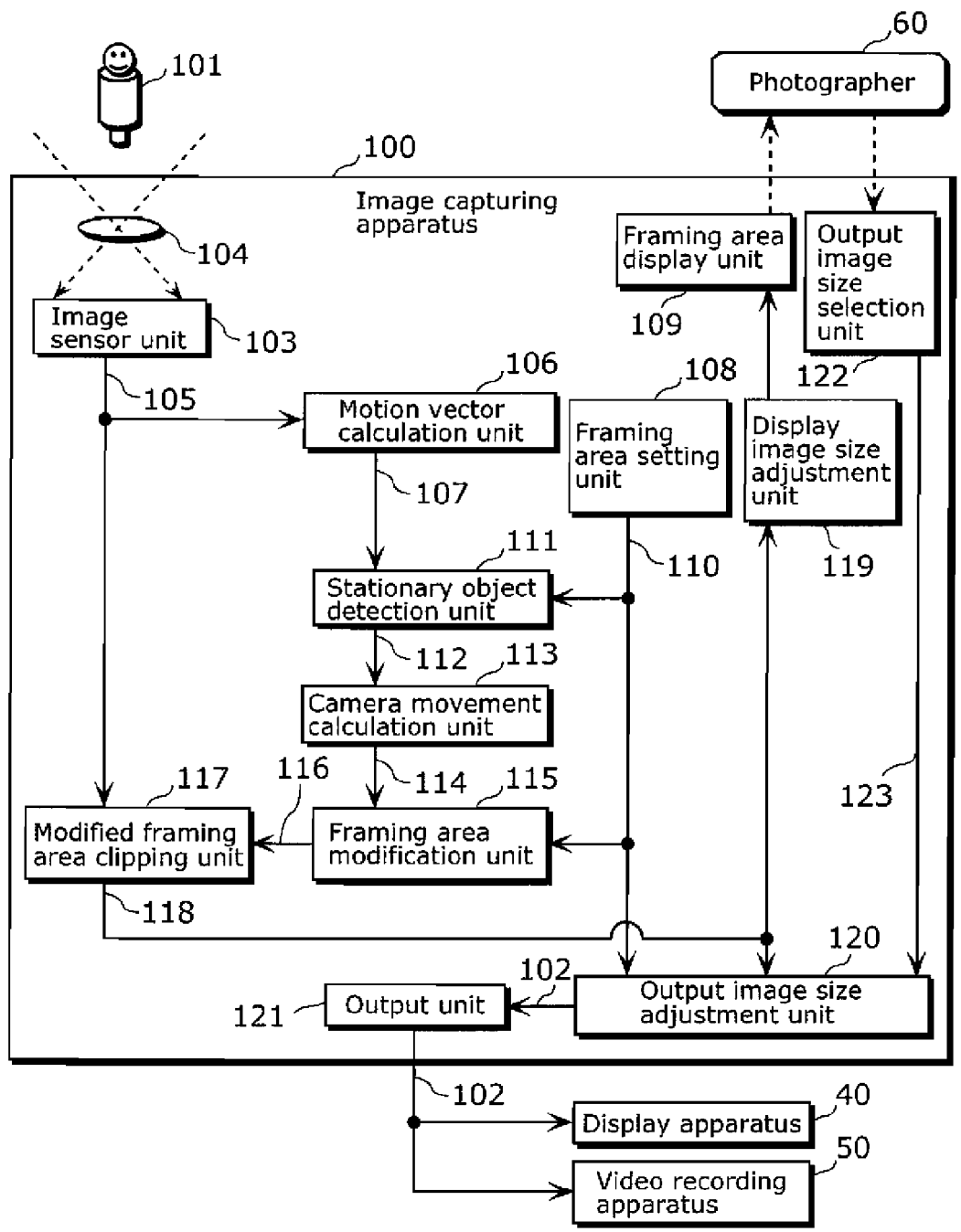
FIG. 5 is a block diagram showing a structure of an image capturing apparatus in a first embodiment of the present invention.

FIG. 5 is a block diagram showing a structure of an image capturing apparatus 100 in the first embodiment of the present invention.

The image capturing apparatus 100 in this embodiment is an apparatus that captures a subject 101 as a moving image and outputs an output image 102 which is a moving image to a display apparatus 40 and a video recording apparatus 50. The image capturing apparatus 100 appropriately corrects blurring of the output image 102 even when the subject 101 moves actively.

The image capturing apparatus 100 includes an image sensor unit 103, a focal length fixed lens system 104, a motion vector calculation unit 106, a framing area setting unit 108, a framing area display unit 109, a stationary-object detection unit 111, a camera movement calculation unit 113, a framing area modification unit 115, a modified framing area clipping unit 117, a display image size adjustment unit 119, an output image size adjustment unit 120, an output unit 121, and an output image size selection unit 122.

That is, the image capturing apparatus 100 in this embodiment includes: the image sensor unit 103 which is an image capturing unit that captures an image; the output unit 121 that outputs an image of a framing area which is a part of a spatial area of the image captured by the image capturing unit; the motion vector calculation unit 106 and the stationary object detection unit 111 which are a movement detection unit that detects a movement of an image in an outer area in the spatial area of the image captured by the image capturing unit; and the camera movement calculation unit 113 and the framing area modification unit 115 which are a correction unit that corrects blurring of the image outputted by the output unit by moving the framing area according to the movement of the image in the outer area detected by the movement detection unit, irrespective of a movement of an image in an inner area in the spatial area.

For example, the output image 102 is displayed on the display apparatus 40 connected to the image capturing apparatus 100 so as to include the image of the subject 101, or recorded to the video recording apparatus 50 connected to the image capturing apparatus 100.

The image sensor unit 103 outputs the image of the subject 101 formed by the focal length fixed lens system 104, as an input image (captured image) 105.

The motion vector calculation unit 106 calculates movements of feature points of the input image 105 as motion vectors, and outputs the motion vectors as motion vector signals 107.

Figure 6:
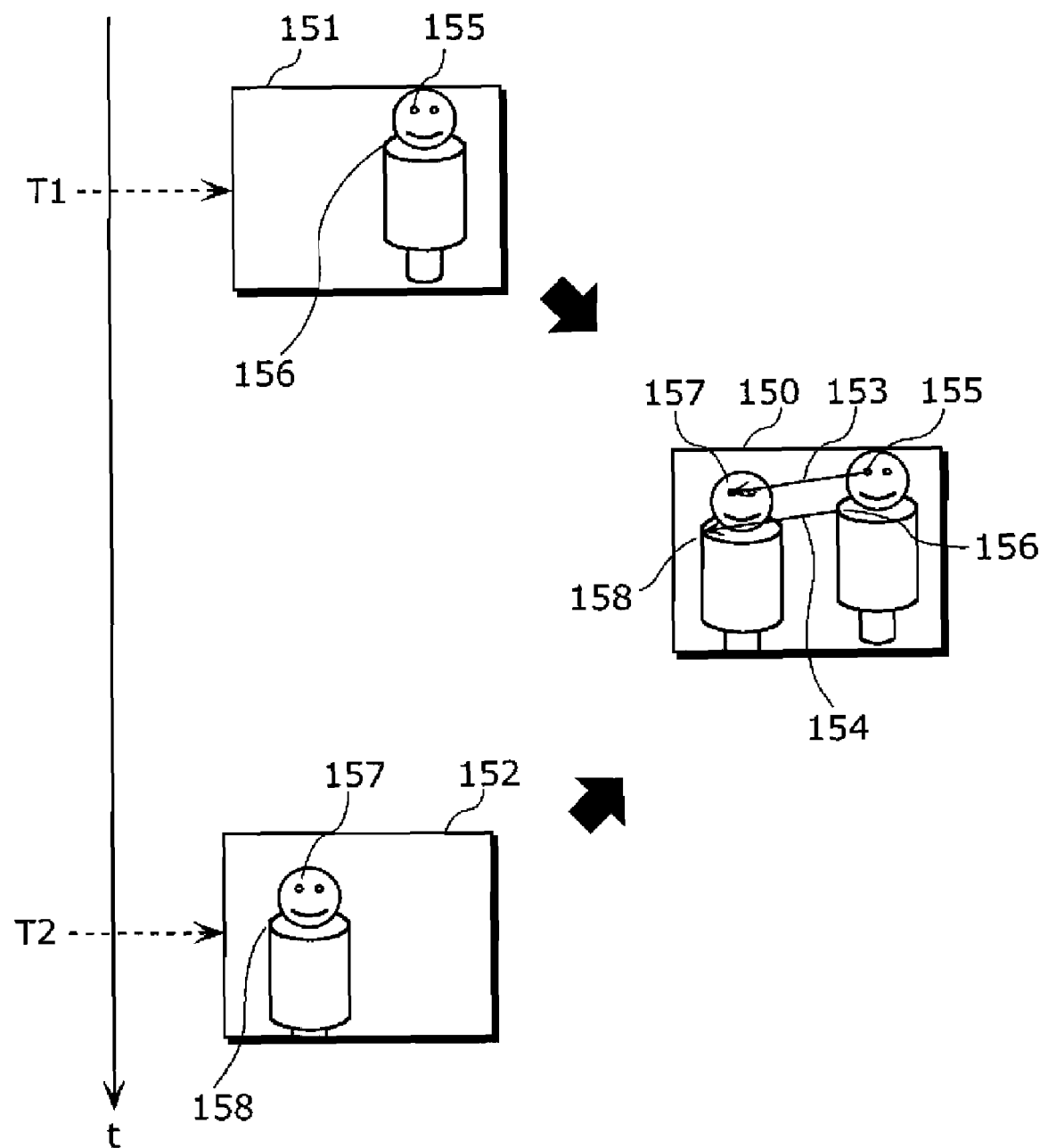
FIG. 6 is an explanatory view of an example of a motion vector calculation method in the first embodiment of the present invention.

FIG. 6 shows an example of a motion vector calculation method.

For example, the captured image changes from a captured image 151 at time T1 to a captured image 152 at time T2. An image 150 is a result of superimposing the captured image 151 at time T1 and the captured image 152 at time T2. In this example, the motion vector calculation unit 106 calculates a motion vector 153 from a difference in position between a feature point 155 and a feature point 157 that are located at an eye of the subject 101. The motion vector calculation unit 106 also calculates a motion vector 154 from a difference in position between a feature point 156 and a feature point 158 that are located at a shoulder of the subject 101. Moreover, the motion vector calculation unit 106 detects, on the basis of a difference in pixel value between adjacent pixels, for example a position where a difference in pixel value between adjacent pixels is larger than a preset threshold, as a feature point mentioned above.

Thus, the motion vector calculation unit 106 first detects all feature points included in an input image (captured image), and then detects a movement of each feature point between the input image (captured image) and an input image (captured image) at another time, as a motion vector.

Figure 7:
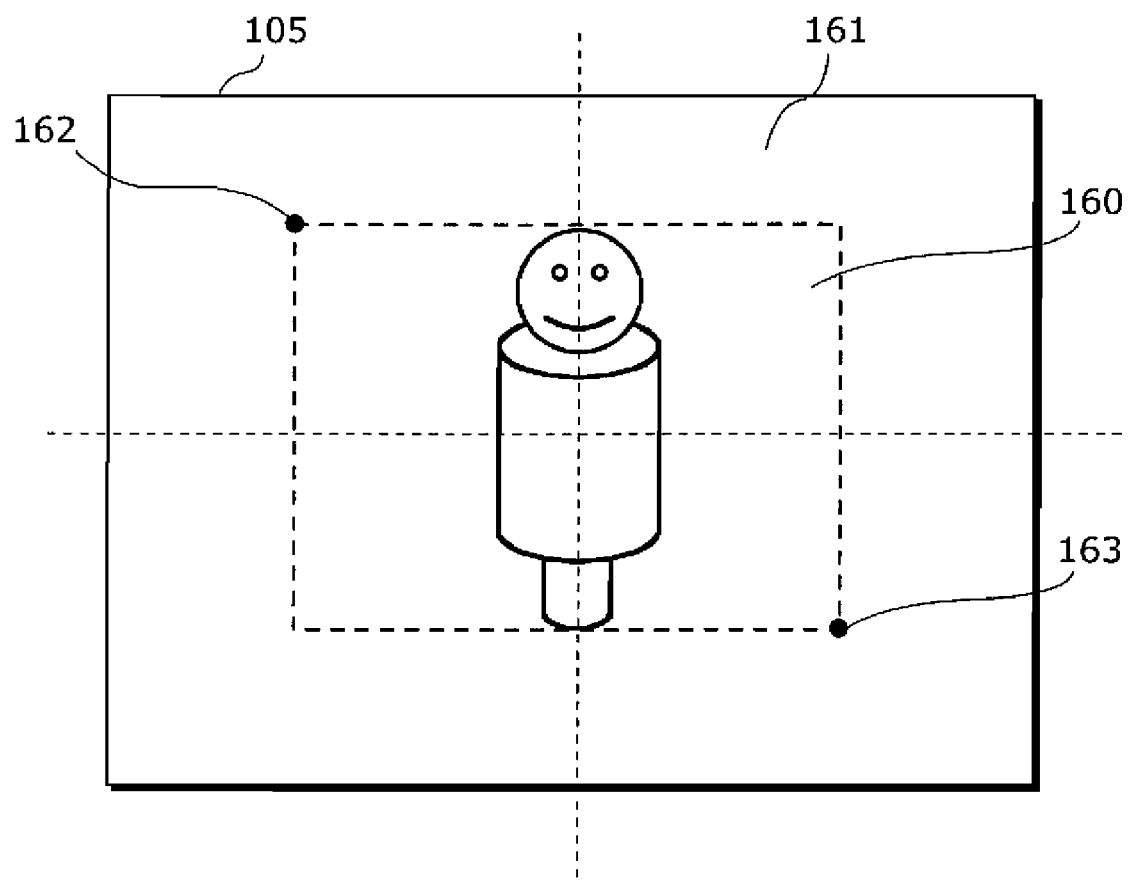
FIG. 7 shows a framing area and an outer-frame area in the first embodiment of the present invention.

FIG. 7 shows a framing area and an outer-frame area set in the input image 105.

The framing area setting unit 108 sets a framing area 160 and an outer-frame area 161 in the input image 105, as shown in FIG. 7.

The framing area 160 is an area enclosed by a dotted-line box in FIG. 7, and is an area of an image displayed by the framing area display unit 109. Note that a photographer 60 recognizes the displayed image of the framing area as a captured image (angle of view), and adjusts a camera position and orientation.

The outer-frame area 161 is an area of the input image 105 other than the framing area 160. The outer-frame area 161 is set in order to correct image blurring by using motion vectors calculated in this area, as described later.

The framing area setting unit 108 defines the framing area 160 by, for example, x and y coordinates of a point 162 and x and y coordinates of a point 163, and outputs information showing these coordinates as a framing area setting signal 110.

The stationary object detection unit 111 detects a stationary object by using only motion vectors calculated in the outer-frame area 161 from among the motion vectors shown by the motion vector signals 107. Which is to say, the stationary object detection unit 111 extracts the motion vectors in the outer-frame area 161, from the motion vectors of all feature points included in the input image 105. The stationary object detection unit 111 further extracts only motion vectors which are estimated to be stationary object motion vectors, from the motion vectors in the outer-frame area 161.

Typically, in the case of wide-angle image capturing, a stationary object is often present in a background of a subject. This being so, the reason for using only the outer-frame area 161 as mentioned above is that, when capturing an image using a video camera which is intended for recording a movement of a subject, a stationary object can be expected to be present around an area framed by the photographer 60 (i.e., the framing area 160) as a subject background. That is, the image sensor unit 103 which is the image capturing unit captures the image so that the image of the moving subject 101 is contained in the inner area.

Figure 8A:
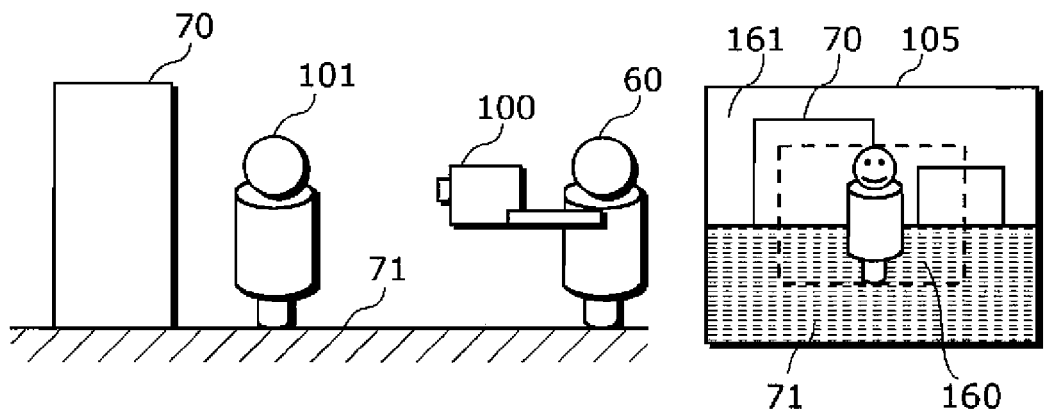
FIG. 8A is an explanatory view of a reason for using the outer-frame area for stationary object detection in the first embodiment of the present invention.
Figure 8B:
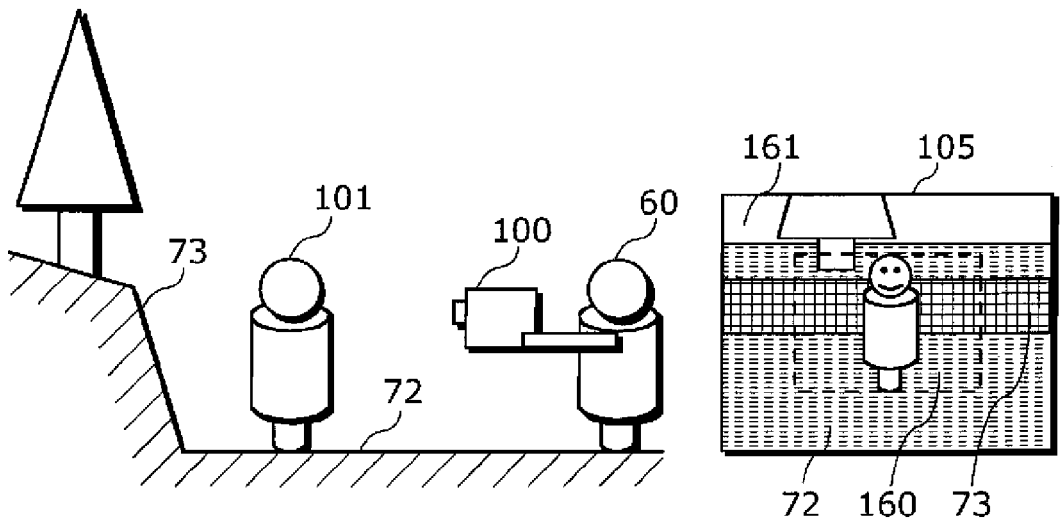
FIG. 8B is another explanatory view of the reason for using the outer-frame area for stationary object detection in the first embodiment of the present invention.

FIGS. 8A and 8B show examples of images displayed in the framing area 160 and the outer-frame area 161.

In the case where the photographer 60 and a stationary background 70 are in contact with a same land surface or building floor, wall, and the like as shown in FIG. 8A, when the photographer 60 is stationary, a positional relation between the photographer 60 and the stationary background 70 is fixed, and the stationary background 70 is captured at a same position between the input images 105. In addition, a land surface or a building floor, wall, and the like usually has a texture (a generic term for patterns, lusters, and shadows due to small irregularities), and accordingly feature points can be detected from differences in luminance even in the case of a flat land surface, floor surface, wall surface, and the like.

Figure 1B:
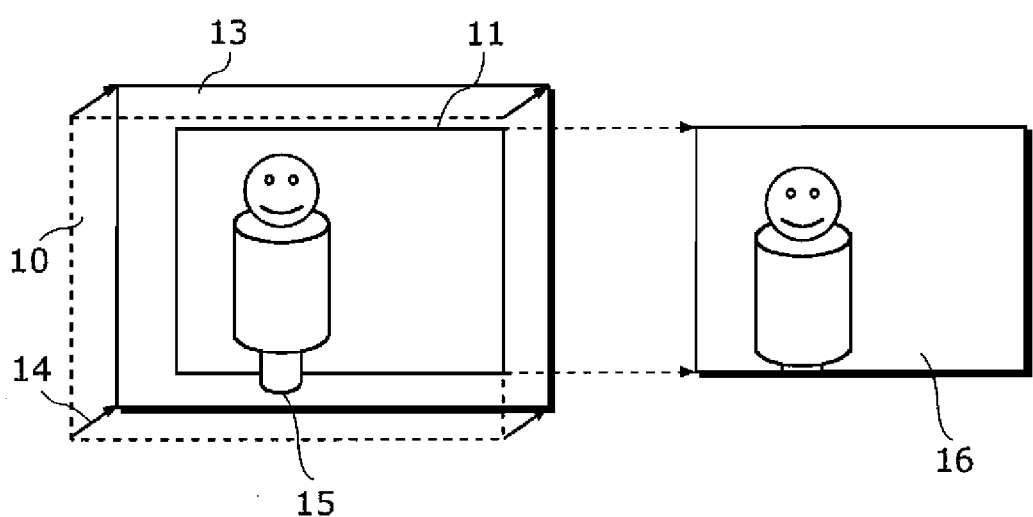
FIG. 1B is another explanatory view of the principle of conventional electronic-type image blurring correction.
Figure 1C:
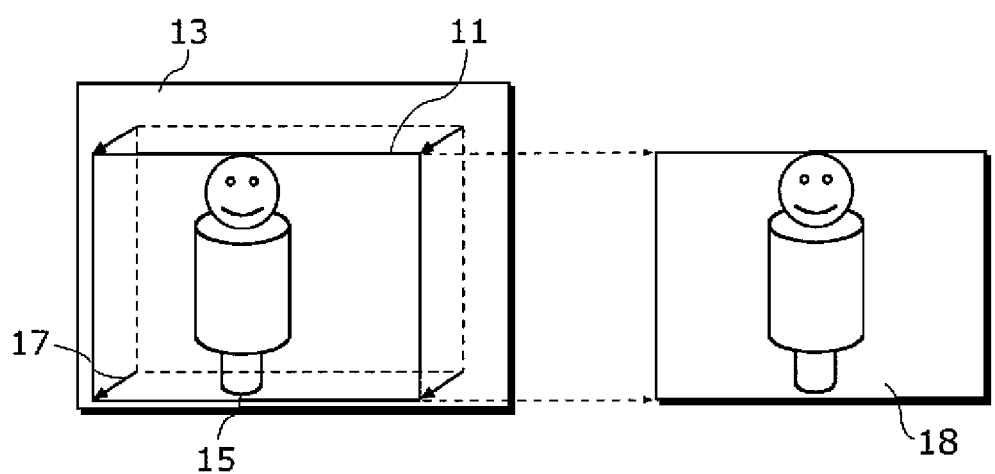
FIG. 1C is another explanatory view of the principle of conventional electronic-type image blurring correction.
Figure 3A:
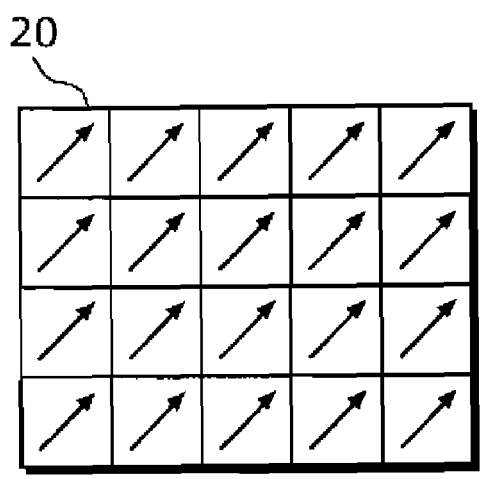
FIG. 3A shows a motion vector of each block detected in the motion vector detection apparatus.
Figure 3B:
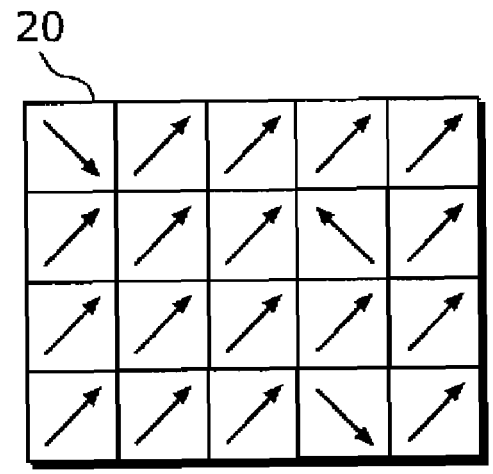
FIG. 3B shows a motion vector of each block detected in the motion vector detection apparatus.
Figure 4:
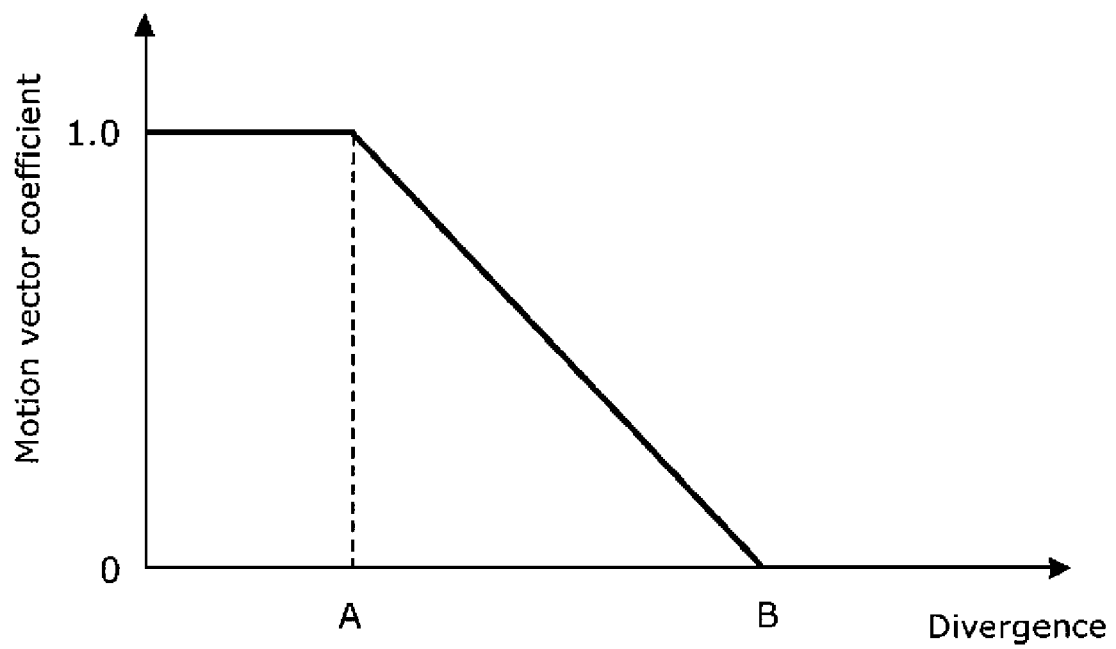
FIG. 4 shows a relation between a motion vector coefficient and a divergence in the motion vector detection apparatus.

Therefore, by using only the outer-frame area 161, a land surface 71 shown in FIG. 8A and a land surface 72 and a wall surface 73 shown in FIG. 8B can be used as stationary objects, too. This increases the possibility of detecting a stationary object in the outer-frame area 161. On the other hand, when the image capturing apparatus 100 held by the photographer 60 moves, a stationary object such as the stationary background 70, the land surface 71, the land surface 72, or the wall surface 73 is captured at different positions between the input images 105. As a result, motion vectors are generated as explained with reference to FIG. 6. These motion vectors represent a direction and a magnitude of image blurring, and the image blurring can be corrected by using these motion vectors as shown in FIG. 1C.

Figure 9:
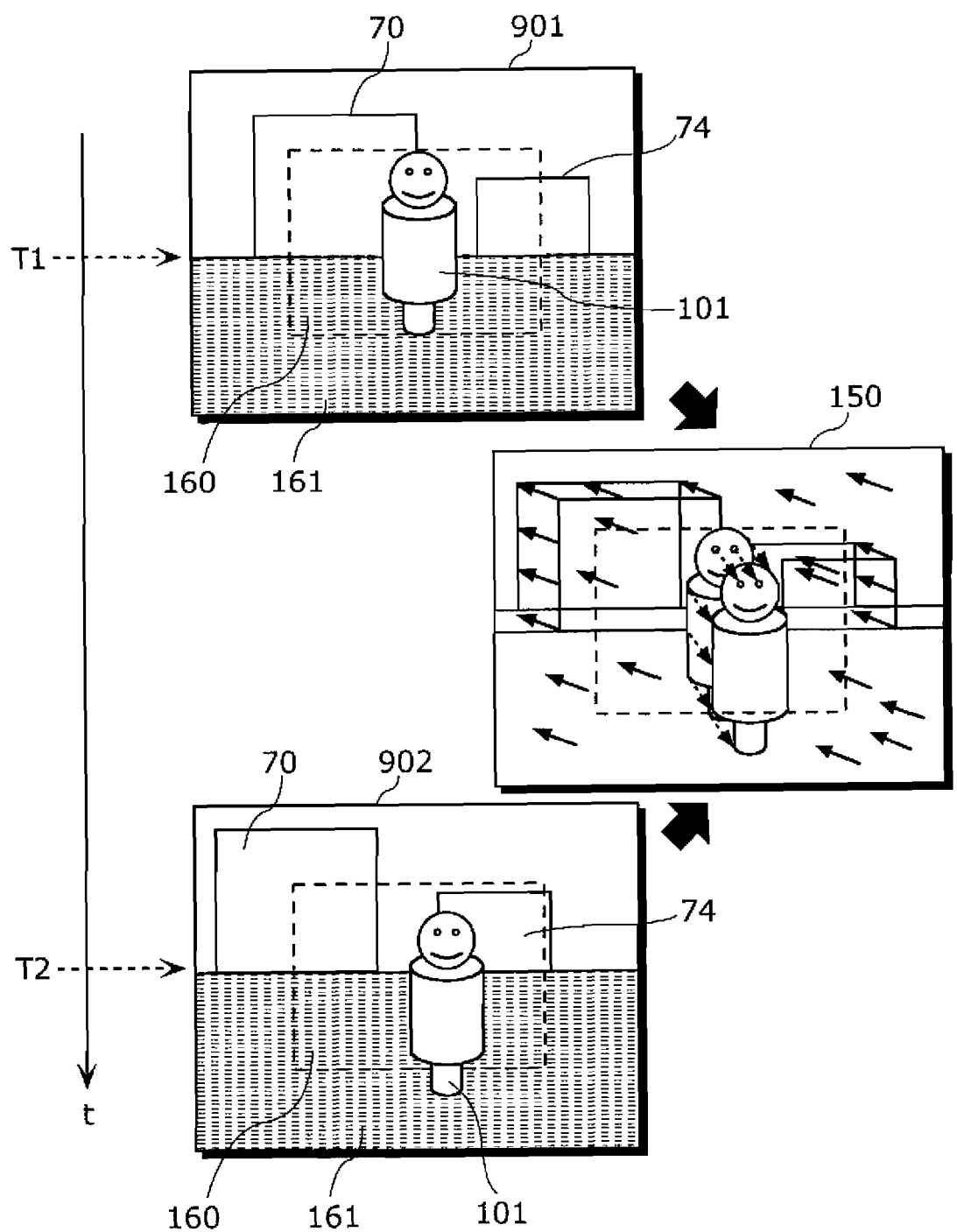
FIG. 9 is an explanatory view of a method of detecting a stationary object from motion vectors in the first embodiment of the present invention.

FIG. 9 is an explanatory view of a method of detecting a stationary object (stationary object motion vectors) by the stationary object detection unit 111.

As one example, suppose the subject 101 moves ahead on the left as seen from the subject 101, during a period from time T1 to time T2. An image 150 is a result of superimposing an input image 901 at time T1, an input image 902 at time T2, and motion vectors. Stationary object motion vectors occur due to a movement of the image capturing apparatus 100, and therefore all stationary object motion vectors are similar in direction and magnitude.

Since 3-dimensional spatial information of a captured scene is projected onto a 2-dimensional plane of the image sensor unit 103, a motion vector of a stationary object far from the image capturing apparatus 100 and a motion vector of a stationary object close to the image capturing apparatus 100 cannot be in complete agreement in direction and magnitude. Nevertheless, these motion vectors basically show a same tendency. Note also that motion vectors may differ between a screen center and a screen periphery due to peripheral distortion of the focal length fixed lens system 104.

In view of this, the stationary object detection unit 111 sets a tolerable range for motion vector directions and magnitudes. The stationary object detection unit 111 assumes, among the motion vectors in the outer-frame area 161, motion vectors within the tolerable range as stationary object motion vectors, and a movement shown by the motion vectors as image blurring of the image capturing apparatus 100. Here, an initial point or a terminal point of a motion vector may be present in the framing area 160. Since there is a possibility that a stationary object (the stationary background 70 and a stationary background 74 shown in FIG. 9) is captured in the framing area 160 too, the stationary object detection unit 111 judges a motion vector as being included in the outer-frame area 161 when at least one of an initial point and a terminal point of that motion vector is present in the outer-frame area 161.

Figure 10:
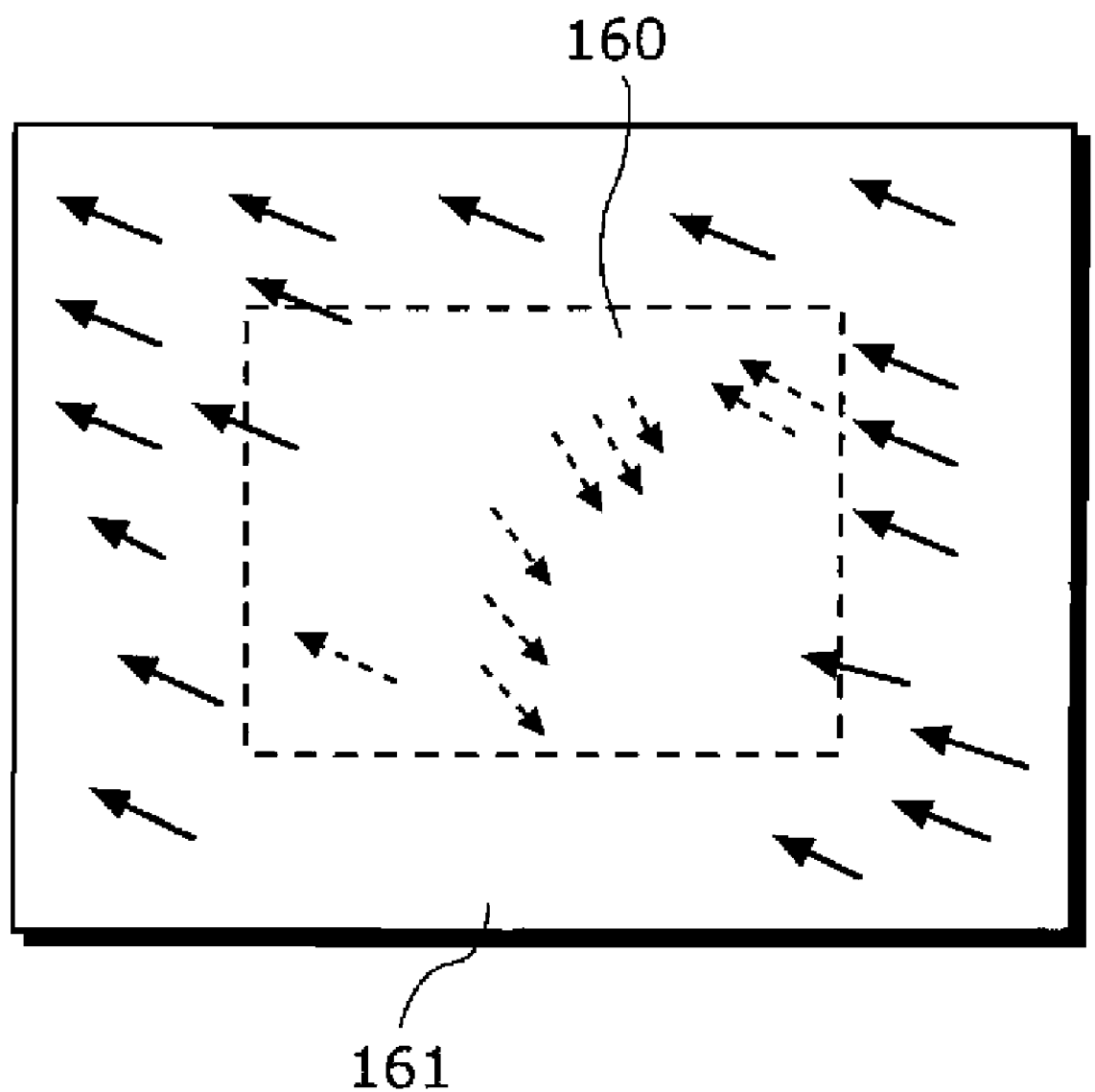
FIG. 10 shows motion vectors in the outer-frame area in the first embodiment of the present invention.

FIG. 10 shows motion vectors in the outer-frame area 161.

The stationary object detection unit 111 extracts motion vectors shown by solid-line arrows in FIG. 10, as motion vectors in the outer-frame area 161. In detail, the stationary object detection unit 111 extracts only motion vectors each of which has at least one of an initial point and a terminal point included in the outer-frame area 161. The stationary object detection unit 111 then calculates a mean vector of the extracted motion vectors, sets a distance (distance threshold tv) from the mean vector as the tolerable range, and detects each motion vector whose distance so from the mean vector is smaller than distance threshold tv as a stationary object motion vector.

That is, the motion vector calculation unit 106 and the stationary object detection unit 111 which are the movement detection unit detect motion vectors in the outer area and extract, from the detected motion vectors, motion vectors having higher similarity to a mean of the detected motion vectors as motion vectors of an image of a stationary object, with a higher priority.

However, there are cases where a stationary object cannot be captured in the outer-frame area 161.

Figure 11A:
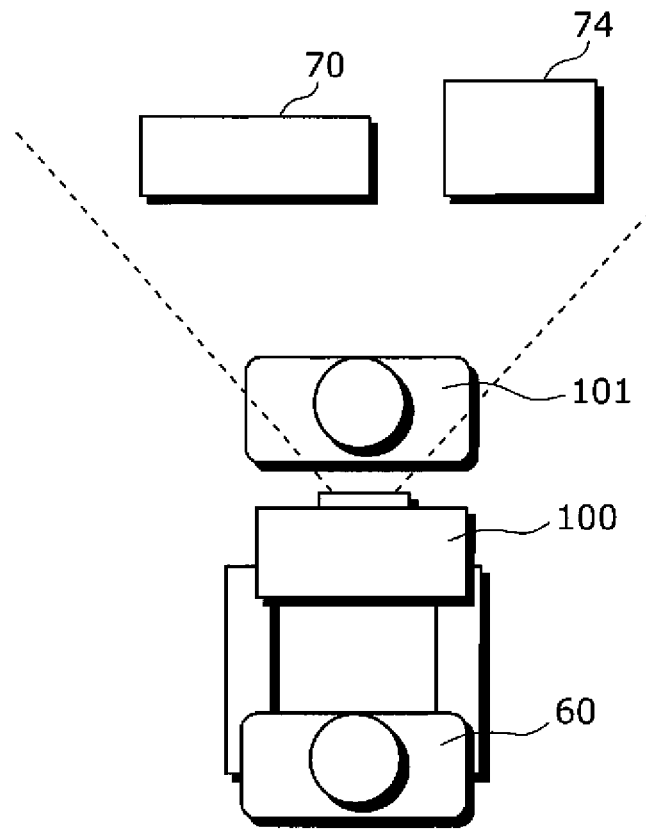
FIG. 11A shows a situation where an image of a stationary object cannot be captured in the first embodiment of the present invention.
Figure 11B:
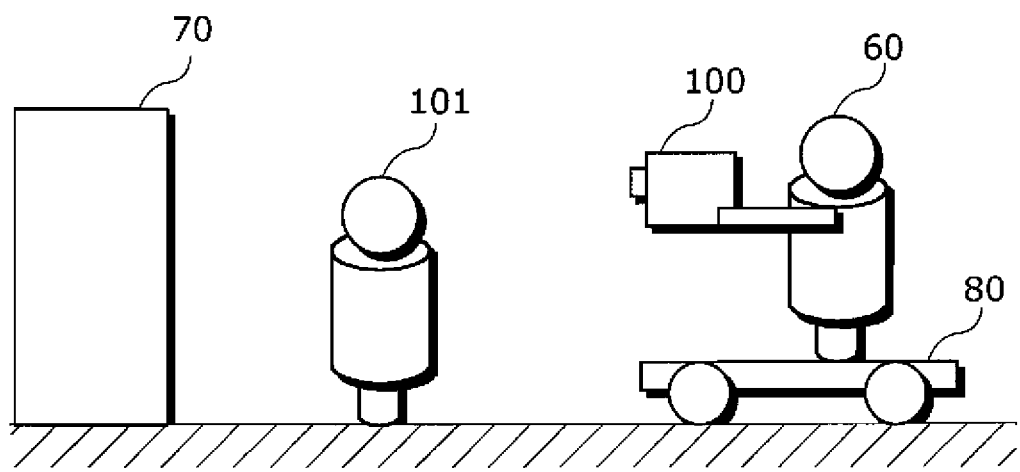
FIG. 11B shows another situation where an image of a stationary object cannot be captured in the first embodiment of the present invention.

FIGS. 11A and 11B each show a case where a stationary object cannot be captured.

For example, when the image capturing apparatus 100 and the subject 101 are very close to each other as shown in FIG. 11A or when the photographer 60 is moving on a movement unit 80 as shown in FIG. 11B, a stationary object cannot be captured. In both cases, a movement is observed in the entire screen, with a viewer naturally perceiving a movement from a displayed image.

Accordingly, the stationary object detection unit 111 judges whether or not a stationary object is captured, on the basis of the input image 105. When judging that a stationary object is captured, the stationary object detection unit 111 detects stationary object motion vectors as described above. When judging that no stationary object is captured, on the other hand, the stationary object detection unit 111 does not detect stationary object motion vectors, and executes a correction suspension process of cancelling image blurring correction. In this case, the image capturing apparatus 100 outputs the input image 105 itself as the output image 102.

For example, the stationary object detection unit 111 judges that no stationary object is captured, when the motion vectors in the outer-frame area 161 and the motion vectors in the framing area 160 have a substantially same magnitude and direction. Alternatively, the stationary object detection unit 111 judges that no stationary object is captured, when the motion vectors in the outer-frame area 161 have an extremely large dispersion.

As described above, when judging that a stationary object is captured, the stationary object detection unit 111 detects a stationary object (stationary object motion vector) from motion vectors included in the outer-frame area 161, and outputs the detected one or more motion vectors as a stationary object motion vector signal 112. When judging that no stationary object is captured, the stationary object detection unit 111 outputs the stationary object motion vector signal 112 indicating the absence of a stationary object in the correction suspension process, without performing stationary object motion vector detection. For instance, as the stationary object motion vector signal 112 indicating the absence of a stationary object, the stationary object detection unit 111 outputs the stationary object motion vector signal 112 showing a motion vector whose components are all 0, or the stationary object motion vector signal 112 showing a motion vector whose components are all clearly larger than a maximum motion vector magnitude (in detail, a diagonal length of an image).

The camera movement calculation unit 113 described later stops an operation of calculating a camera movement upon receiving the stationary object motion vector signal 112 indicating the absence of a stationary object. As a result, an operation of the framing area modification unit 115 is stopped, too. In this case, the modified framing area clipping unit 117 outputs the input image 105 itself which is obtained from the image sensor unit 103.

That is, the image capturing apparatus 100 includes, in the stationary object detection unit 111, a correction judgment unit that judges whether or not to perform the correction according to a movement of the image captured by the image sensor unit 103 which is the image capturing unit. When the correction judgment unit judges not to perform the correction, the camera movement calculation unit 113 and the framing area modification unit 115 which are the correction unit cancel the movement of the framing area. In this way, the image blurring correction function is stopped depending on an image capturing situation, with it being possible to output such an image that enables a movement to be observed in the entire screen or such an image that makes a viewer perceive a movement.

The camera movement calculation unit 113 calculates a camera movement signal 114 from the stationary object motion vector signal 112 obtained from the stationary object detection unit 111. As mentioned earlier, the stationary object motion vector signal 112 includes motion vectors whose directions and magnitudes differ within the tolerable range. This being so, the camera movement calculation unit 113 converts these motion vectors to one motion vector by calculating a simple mean of the motion vectors, a weighted mean of the motion vectors through frequency distribution, and the like. The camera movement calculation unit 113 then outputs a motion vector (camera movement) that has an opposite direction to and a same magnitude as the motion vector obtained by the conversion, as the camera movement signal 114. That is, the correction unit includes the camera movement calculation unit 113 which is a calculation unit that calculates a mean motion vector showing a mean of the motion vectors of the image of the stationary object.

The framing area modification unit 115 modifies the framing area to such a position that compensates for image blurring, using the camera movement signal 114 obtained from the camera movement calculation unit 113. This modification is carried out according to the same process as the one explained with reference to FIGS. 1A to 1C. In detail, the camera movement signal 114 shows a movement such as the camera movement 14 in FIG. 1B. Accordingly, upon obtaining the framing area setting signal 110 from the framing area setting unit 108, the framing area modification unit 115 moves the coordinates (the coordinates of the points 162 and 163 in FIG. 7) of the framing area 160 shown by the framing area setting signal 110, by a camera movement correction vector that has an opposite direction to and a same magnitude as the motion vector shown by the camera movement signal 114. The framing area modification unit 115 then outputs information showing a position of the framing area modified by moving the coordinates, as a modified framing area signal 116. That is, the correction unit includes the framing area modification unit 115 that moves the framing area 160 according to the mean motion vector.

The modified framing area clipping unit 117 obtains the input image 105 from the image sensor unit 103, and the modified framing area signal 116 from the framing area modification unit 115. The modified framing area clipping unit 117 clips, out of the input image 105, the blurring-corrected framing area shown by the modified framing area signal 116, and outputs the clipped image as a blurring-corrected framing image 118.

That is, the image capturing apparatus 100 in this embodiment includes the modified framing area clipping unit 117 which is a clipping unit that clips the image of the framing area 160 out of the captured image.

The blurring-corrected framing image 118 matches the image capturing angle of view determined by the photographer 60 by controlling the position and orientation of the image capturing apparatus 100, where the image blurring caused when changing the position and orientation of the image capturing apparatus 100 has been corrected.

The display image size adjustment unit 119 obtains the blurring-corrected framing image 118 from the modified framing area clipping unit 117, and converts an image size of the blurring-corrected framing image 118 to match a display image size of the framing area display unit 109.

The framing area display unit 109 displays the blurring-corrected framing image 118 whose image size has been converted.

The photographer 60 can visually check the image capturing angle of view, by viewing the blurring-corrected framing image 118 displayed by the framing area display unit 109. In view of a size of the image capturing apparatus 100, a display panel used in the framing area display unit 109 typically measures about 3 inches diagonally, with the number of horizontal pixels and the number of lines not exceeding 320 and 240 respectively. Thus, in many cases the number of horizontal pixels and the number of lines of the display panel are smaller than the number of horizontal pixels and the number of lines of the image sensor unit 103. Hence the image size conversion by the display image size adjustment unit 119 is substantially a reduction process. The reduction process of an image is usually performed by deleting high-frequency components using a low-pass filter and decreasing the number of horizontal pixels and the number of lines by sub-sampling, in order to prevent image degradation caused by aliasing distortion.

The output image size selection unit 122 selects, from a plurality of image sizes, a size of the output image 102 to be outputted from the output unit 121, according to an operation by the photographer 60. The output image size selection unit 122 outputs an output image size selection signal 123 showing the selected image size, to the output image seize adjustment unit 120. Which is to say, the output image size selection unit 122 notifies the output image size adjustment unit 120 of the target size of the output image 102.

The output image size adjustment unit 120 obtains the blurring-corrected framing image 118 from the modified framing area clipping unit 117, and converts the image size (the number of horizontal pixels and the number of lines) of the blurring-corrected framing image 118 to match an image size displayed by the display apparatus 40 or an image size recorded to the video recording apparatus 50, namely, the target size of the output image 102. The output image size adjustment unit 120 outputs the blurring-corrected framing image 118 whose image size has been converted, as the output image 102.

In the case where the framing area setting unit 108 sets the framing area so that the number of horizontal pixels and the number of lines of the blurring-corrected framing image 118 match the target size of the output image 102, the output image size adjustment unit 120 does not need to convert the image size. In this case, the output image size adjustment unit 120 outputs the blurring-corrected framing image 118 itself as the output image 102.

In the case where the number of horizontal pixels and the number of lines of the blurring-corrected framing image 118 are larger than the target size of the output image 102, the output image size adjustment unit 120 performs a reduction process. For example, when the size of the blurring-corrected framing image 118 is 720 pixels×480 lines and the target size of the output image 102 is 360 pixels×240 lines, the output image size adjustment unit 120 reduces both the number of horizontal pixels and the number of lines by ½. The reduction process is usually performed by deleting high-frequency components using a low-pass filter and decreasing the number of horizontal pixels and the number of lines by sub-sampling, in order to prevent image degradation caused by aliasing distortion.

In the case where the number of horizontal pixels and the number of lines of the blurring-corrected framing image 118 are smaller than the target size of the output image 102, the output image size adjustment unit 120 performs a magnification process. That is, the image capturing apparatus 100 in this embodiment includes the output image size adjustment unit 120 which is a size adjustment unit that magnifies the image clipped by the clipping unit.

For example, when the size of the blurring-corrected framing image 118 is 720 pixels×480 lines and the target size of the output image 102 is 2160 pixels×1440 lines, the output image size adjustment unit 120 magnifies both the number of horizontal pixels and the number of lines three times. Though the magnification process may be performed by re-sampling according to bilinear interpolation, bicubic interpolation, or the like, it is difficult to produce high-frequency components by interpolation, and usually a resulting image is out of focus without sharpness. This tendency increases as the magnifying power increases. Thus, the image quality of the output image 102 degrades more when the proportion of the framing area 160 in the input image 105 is smaller.

Accordingly, in the present invention, the output image size adjustment unit 120 forms the output image 102 from a previously captured image, when performing the magnification process. In detail, the output image size adjustment unit 120 uses a previously captured image as an image magnification database, and forms the output image 102 from image data extracted from the database.

FIG. 12 is a block diagram showing an example of an internal structure of the output image size adjustment unit 120 that performs the magnification process.

The output image size adjustment unit 120 magnifies the blurring-corrected framing image 118 by referencing an image magnification database 171, and includes the image magnification database 171, a resolution lowering unit 173, and a similar data detection unit 175. The image magnification database 171 includes a resource data unit 172 and a low-resolution resource data unit 174.

In the case of performing the magnification process, the output image size adjustment unit 120 creates resources of the image magnification database 171 beforehand, and performs the magnification process using the resources.

The creation of resources of the image magnification database 171 by the output image size adjustment unit 120 is described first.

The resource data unit 172 holds a previously captured image as a image magnification resource. Which is to say, the resource data unit 172 obtains the blurring-corrected framing image 118 outputted from the modified framing area clipping unit 117, and holds the blurring-corrected framing image 118 as an image magnification resource.

The resolution lowering unit 173 lowers a resolution of the image magnification resource held in the resource data unit 172, in accordance with a ratio of the number of horizontal pixels and the number of lines of the framing area 160 to the target size of the output image 102 and a resolution lowering model of the image sensor unit 103. As the resolution lowering model of the image sensor unit 103, an image reduction database is created by capturing low-resolution images and high-resolution images using a plurality of samples or a resolution lowering function is analytically derived from a plurality of samples, in advance. Alternatively, the resolution lowering model is created by applying a low-pass filter and sub-sampling to the image magnification resource.

The resolution lowering unit 173 stores the resource whose resolution has been lowered, in the low-resolution resource data unit 174. When doing so, the resolution lowering unit 173 associates the image magnification resource (the previously captured high-resolution image) in the resource data unit 172 with the resource (low-resolution image) generated by lowering the resolution of the image magnification resource. This makes it possible to replace the low-resolution image with the high-resolution image by using the image magnification database 171. Note here that the resource data unit 172 and the low-resolution resource data unit 174 may store the high-resolution image and the low-resolution image in units of pictures or in units of blocks that constitute a picture.

The magnification process by the output image size adjustment unit 120 is described next.

The similar data detection unit 175 obtains the blurring-corrected framing image 118 from the modified framing area clipping unit 117. The similar data detection unit 175 references the low-resolution resource data unit 174, and detects a low-resolution resource (image) that has highest similarity to the blurring-corrected framing image 118. The similar data detection unit 175 then detects the original resource (high-resolution image) corresponding to the detected low-resolution resource, in the resource data unit 172. The similar data detection unit 175 outputs the detected high-resolution resource from the resource data unit 172 to the output unit 121, as the output image 102.

That is, the output image size adjustment unit 120 which is the size adjustment unit includes: the image magnification database 171 which is a resource data storage unit in which low-resolution resource data and high-resolution resource data are stored for each image, the low-resolution resource data showing the image in a low resolution and the high-resolution resource data showing the image in a high resolution; and the similar data detection unit 175 which is a similar data search unit that magnifies the image clipped by the clipping unit, by searching the resource data storage unit for low-resolution resource data showing an image having similarity to the clipped image, and extracting high-resolution resource data corresponding to the low-resolution resource data from the resource data storage unit.

Though a measure of similarity used in the similar data detection unit 175 is arbitrary, for example a spatial frequency characteristic may be used as the measure.

Which is to say, the data stored in each of the resource data unit 172 and the low-resolution resource data unit 174 may be an image feature vector such as a wavelet coefficient, instead of an image.

Figure 13:
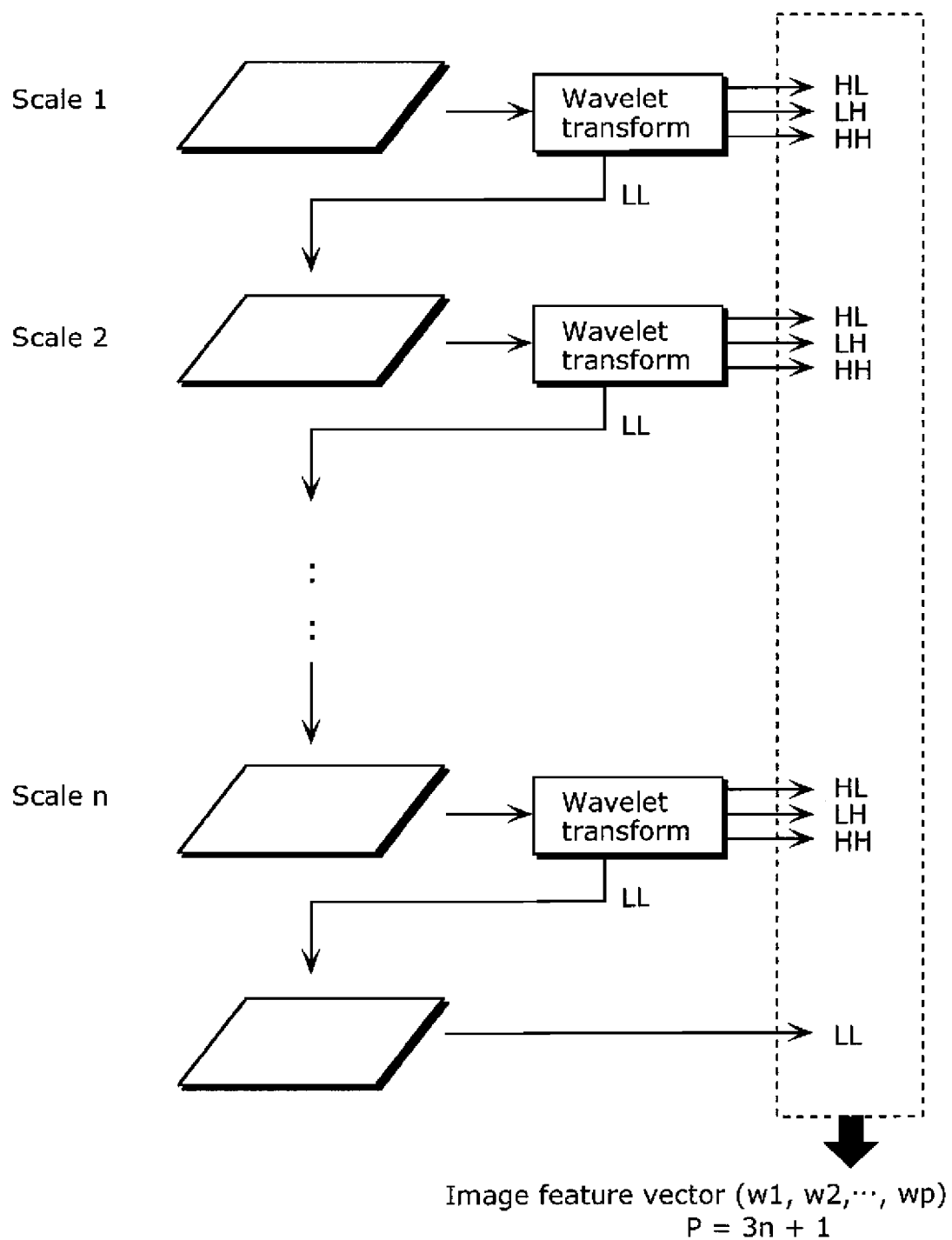
FIG. 13 shows an example of a multiple resolution representation by wavelet transform in the first embodiment of the present invention.

FIG. 13 shows an example of a multiple resolution representation by wavelet transform.

In the case of using an image feature vector such as a wavelet coefficient as a resource, the output image size adjustment unit 120 performs wavelet transform n times. When scale n=3, the output image size adjustment unit 120 calculates 10 wavelet coefficients, and defines a 10-dimentional image feature vector (w1, w2, . . . , w10) with the 10 wavelet coefficients as elements. In this case, the degree of similarity is proportional to a distance between image feature vectors in a 10-dimentional image feature space.

Figure 14:
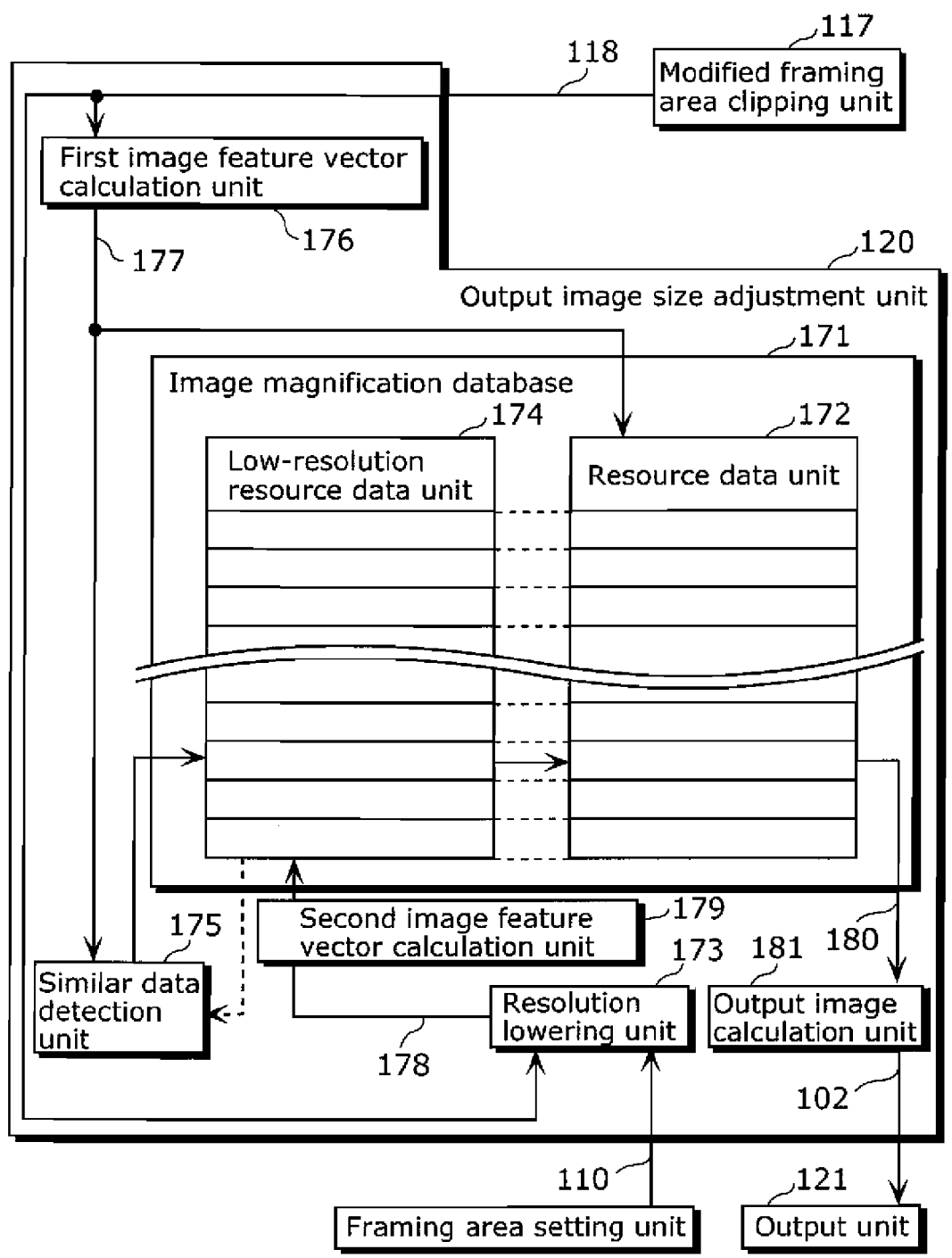
FIG. 14 is a block diagram showing an internal structure of the output image size adjustment unit that calculates an image feature vector in the first embodiment of the present invention.

FIG. 14 is a block diagram showing an example of an internal structure of the output image size adjustment unit 120 that calculates an image feature vector.

The output image size adjustment unit 120 includes a first image feature vector calculation unit 176, a second image feature vector calculation unit 179, the image magnification database 171, the resolution lowering unit 173, the similar data detection unit 175, and an output image calculation unit 181.

In the case of performing the magnification process, the output image size adjustment unit 120 creates resources of the image magnification database 171 beforehand, and performs the magnification process using the resources, as with the above case.

A process of performing the magnification process by the output image size adjustment unit 120 in a state where resources are created in the image magnification database 171 is described first.

The resource data unit 172 and the low-resolution resource data unit 174 store an image feature vector showing a high-resolution image and an image feature vector showing a low-resolution image corresponding to the high-resolution image, respectively.

When the output image size adjustment unit 120 performs the magnification process, the first image feature vector calculation unit 176 obtains the blurring-corrected framing image 118 outputted from the modified framing area clipping unit 117, converts the blurring-corrected framing image 118 to an image feature vector 177, and outputs the image feature vector 177 to the similar data detection unit 175. Here, the first image feature vector calculation unit 176 calculates the image feature vector in the manner shown in FIG. 13, as one example.

The similar data detection unit 175 detects an image feature vector that has highest similarity to the image feature vector 177 of the blurring-corrected framing image 118, in the low-resolution resource data unit 174. The similar data detection unit 175 outputs an image feature vector of the high resolution associated with the detected image feature vector of the low resolution, from the resource data unit 172.

That is, the similar data detection unit 175 which is the similar data search unit searches for low-resolution resource data that shows a spatial frequency characteristic having similarity to a spatial frequency characteristic of the image clipped by the clipping unit.

The output image calculation unit 181 performs inverse transform of the wavelet transform performed by the first image so feature vector calculation unit 176, on the high-resolution image feature vector outputted form the resource data unit 172, thereby converting an output image feature vector 180 to the output image 102. The output image calculation unit 181 outputs the output image 102 to the output unit 121.

To create resources of the image magnification database 171 in the output image size adjustment unit 120, the first image feature vector calculation unit 176 calculates the high-resolution image feature vector 177 corresponding to the blurring-corrected framing image 118, and stores the high-resolution image feature vector 177 in the resource data unit 172 in the image magnification database 171. The image feature vector 177 stored in this way is referenced as an image feature quantity of a magnified image.

The resolution lowering unit 173 obtains the blurring-corrected framing image 118 corresponding to the image feature vector 177 calculated by the first image feature vector calculation unit 176. The resolution lowering unit 173 lowers a resolution of the blurring-corrected framing image 118 in accordance with the ratio of the number of horizontal pixels and the number of lines of the framing area 160 to the target size of the output image 102 and the resolution lowering model of the image sensor unit 103, and outputs a low-resolution blurring-corrected framing image 178.

The second image feature vector calculation unit 179 calculates an image feature vector of the low-resolution blurring-corrected framing image 178, and stores the image feature vector in the low-resolution resource data unit 174. The second image feature vector calculation unit 179 uses the same image feature vector calculation method as the first image feature vector calculation unit 176, with it being possible to ensure compatibility with the resource data unit 172.

According to this structure of the output image size adjustment unit 120, the similar data detection unit 175 can detect a low-resolution resource having highest similarity to the blurring-corrected framing image 118 in an image feature quantity vector space, reference a high-resolution resource from which the detected low-resolution resource has been generated in the resource data unit 172, and output the high-resolution resource as the output image feature vector 180.

Note here that the process of the similar data detection unit 175 can be effectively accelerated by a method of narrowing down a reference range through the use of, for example, an LL component of scale n shown in FIG. 13 and comparing distances between image feature vectors within the narrowed range.

The output unit 121 has a same interface as the display apparatus 40 and the video recording apparatus 50, and outputs the output image 102 to the display apparatus 40 or the video recording apparatus 50. The display apparatus 40 and the video recording apparatus 50 are merely examples of external video appliances, and the present invention is not limited to such external video appliances.

Figure 15:
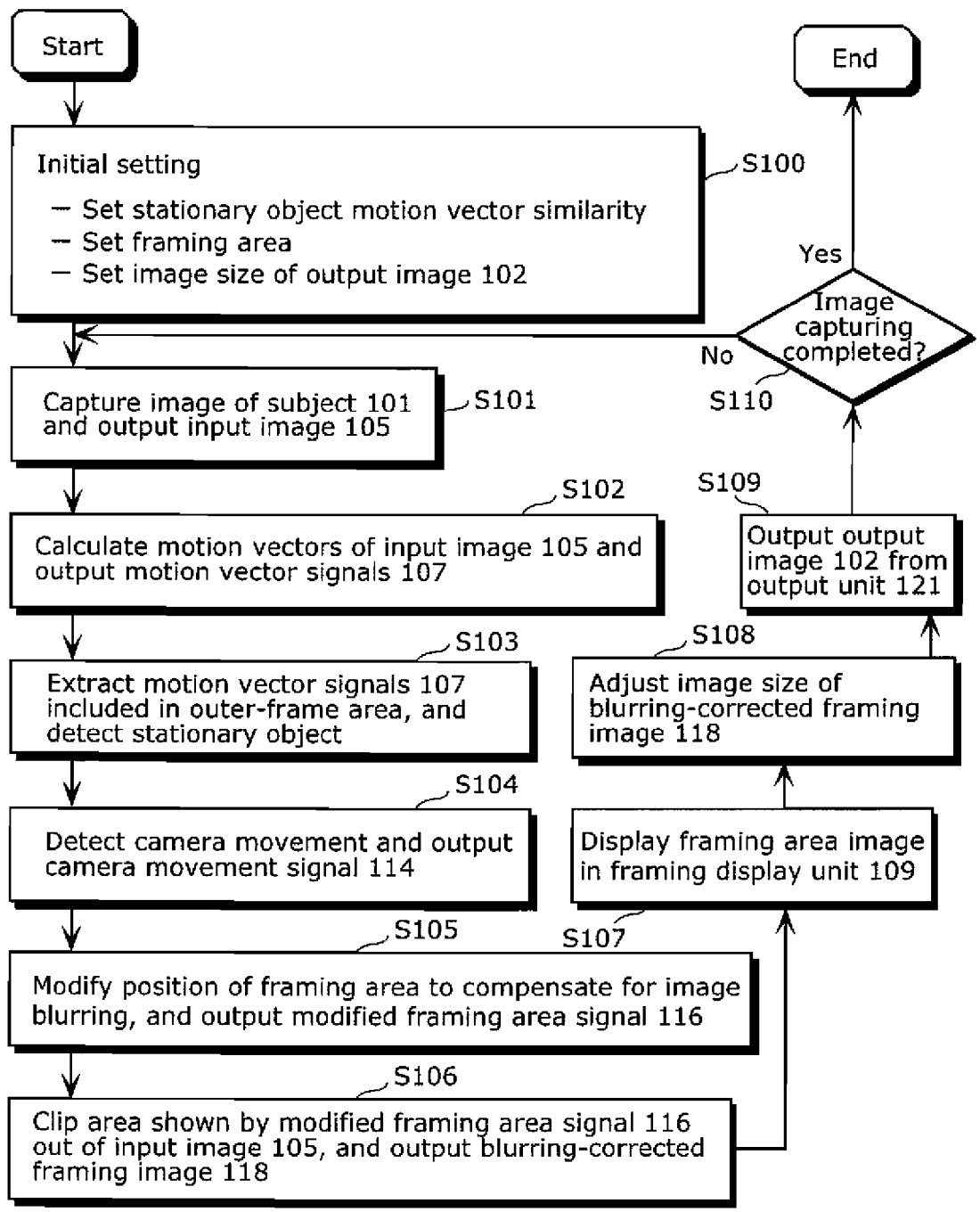
FIG. 15 is a flowchart showing an operation of the image capturing apparatus in the first embodiment of the present invention.

FIG. 15 is a flowchart showing an operation of the image capturing apparatus 100 in this embodiment.

First, the image capturing apparatus 100 performs three initial settings which are described below in sequence (Step S100). A first initial setting is the setting of the motion vector similarity (tolerable range) when detecting stationary object motion vectors.

A second initial setting in Step S100 is the setting of the framing area. For instance, the framing area setting unit 108 in the image capturing apparatus 100 sets a ratio of the number of horizontal pixels and the number of lines of the framing area to the number of horizontal pixels and the number of lines of the input image 105. Suppose the number of horizontal pixels and the number of lines of the input image 105 are 1080 pixels and 720 lines. When the ratio of the framing area is 75%, the number of horizontal pixels and the number of lines of the framing area are 810 pixels and 540 lines. The framing area is positioned so that a center of the framing area 160 matches a center of the input image 105, as shown in FIG. 7. The setting of the framing area 160 is performed by the framing area setting unit 108 in the internal structure of the image capturing apparatus 100. It should be noted here that the above method is merely one example and the present invention is not limited to such a method of setting the framing area 160. For example, individual ratios may be set for the number of horizontal pixels and the number of lines of the framing area 160 to the input image 105. The setting of the framing area 160 is executed by reading from a memory in the framing area setting unit 108.

A third initial setting in Step S100 is the setting of the image size of the output image 102. The output image size adjustment unit 120 in the image capturing apparatus 100 sets the size of the output image 102 according to the output image size selection signal 123. As one example, when the output image size selection signal 123 shows a size of a Digital Video (DV) format, the output image size adjustment unit 120 sets the target size of the output image 102 to 720 pixels×480 lines. When the output image size selection signal 123 shows a size of a high-definition format, the output image size adjustment unit 120 sets the target size of the output image 102 to 1920 pixels×1080 lines.

In the case where an aspect ratio of the framing area 160 and an aspect ratio of the image size shown by the output image size selection signal 123 are different, the output image size adjustment unit 120 performs aspect ratio conversion. In this case, the output image size adjustment unit 120 performs an initial setting of an aspect ratio conversion method in Step S100. Examples of the conversion method include a method of cutting off a part of the framing area that does not match the aspect ratio of the output image (e.g., a top and bottom part or left and right part of the framing area), and a method of enlarging or reducing an image in a vertical direction or a horizontal direction by performing re-sampling from the framing area for each pixel position of the output image using interpolation. The present invention is not limited to the above aspect ratio conversion methods, and the aspect ratio can be converted according to an arbitrary method.

When the image capturing apparatus 100 is started, this setting of the image size of the output image 102 is executed by reading data from a memory in the output image size adjustment unit 120. Subsequently, when the photographer 60 selects the image size of the output image 102 from a setting menu displayed by the output image size selection unit 122, the output image size selection signal 123 showing the selected image size is inputted to the output image size adjustment unit 120. In other words, the image size selected by an operation of the photographer 60 is newly set as the target size of the output image 102.

Following the initial settings in Step S100, the image sensor unit 103 in the image capturing apparatus 100 captures the image of the subject 101 and outputs the input image 105 (Step S101). The motion vector calculation unit 106 calculates motion vectors of the input image 105, and outputs motion vector signals 107 (Step S102). The stationary object detection unit 111 extracts motion vectors included in the outer-frame area from the motion vectors shown by the motion vector signals 107 according to the framing area setting signal 110 outputted from the framing area setting unit 108, to detect a stationary object (stationary object motion vectors) (Step S103). The stationary object detection unit 111 outputs the detected stationary object motion vectors as a stationary object motion vector signal 112. In the case where no stationary object is detected, the stationary object detection unit 111 outputs the stationary object motion vector signal 112 indicating the absence of a stationary object, as mentioned earlier.

The camera movement calculation unit 113 calculates a camera movement from the stationary object motion vector signal 112, and outputs a camera movement signal 114 (Step S104). The framing area modification unit 115 corrects image blurring by moving the framing area shown by the framing area setting signal 110 in an opposite direction to a motion vector shown by the camera movement signal 114, and outputs the modified framing area signal 116 showing the moved framing area (Step S105). The modified framing area clipping unit 117 clips an area shown by the modified framing area signal 116 out of the input image 105, and outputs the clipped area as the blurring-corrected framing image 118 which has been blurring-corrected (Step S106).

The display image size adjustment unit 119 adjusts the image size of the blurring-corrected framing image 118 to the image size of the framing area display unit 109. The framing area display unit 109 displays the image of the framing area 160 for the photographer 60 (Step S107). Likewise, the output image size adjustment unit 120 adjusts the image size of the blurring-corrected framing image 118 (Step S108). In Step S108, however, the output image size selection signal 123 is outputted at an arbitrary timing according to an operation of the photographer 60, and the image size of the output image 102 is changed as needed. The output unit 121 outputs the output image 102 whose size has been adjusted, to outside the image capturing apparatus 100 (Step S109). After this, the image capturing apparatus 100 judges whether image capturing continues or is completed (Step S110). When image capturing continues (Step S110: No), the image capturing apparatus 100 repeats the process from Step S101. When image capturing is completed (Step S110: Yes), the image capturing apparatus 100 ends the entire image capturing operation.

Note here that Step S107 and Steps S108 and S109 may be performed in reverse order or simultaneously.

Figure 16A:
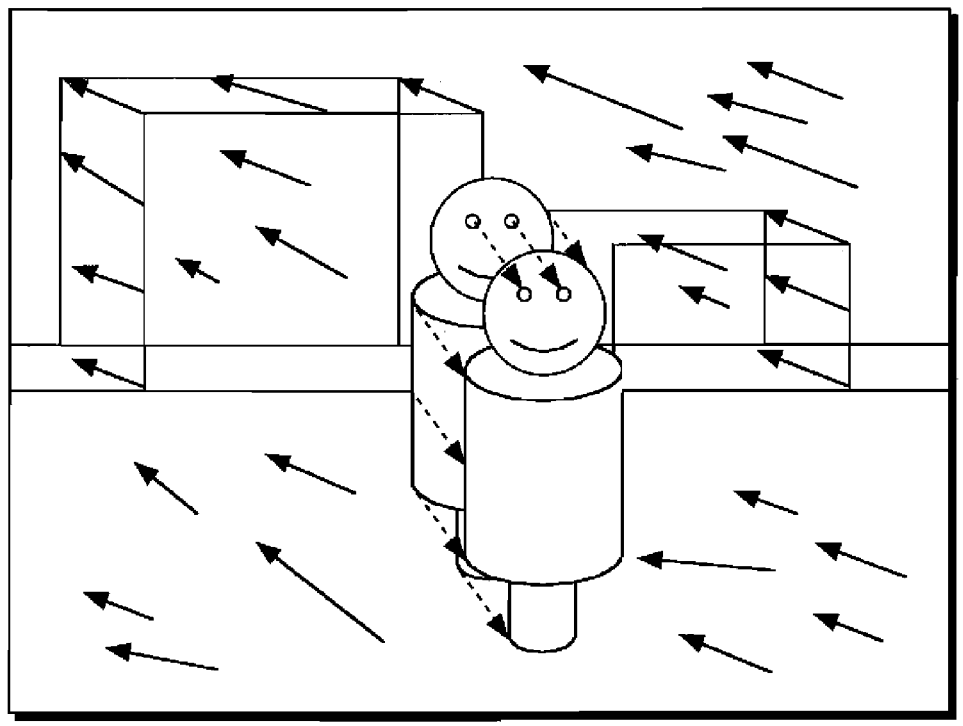
FIG. 16A is an explanatory view of similarity of stationary object motion vectors in the first embodiment of the present invention.
Figure 16B:
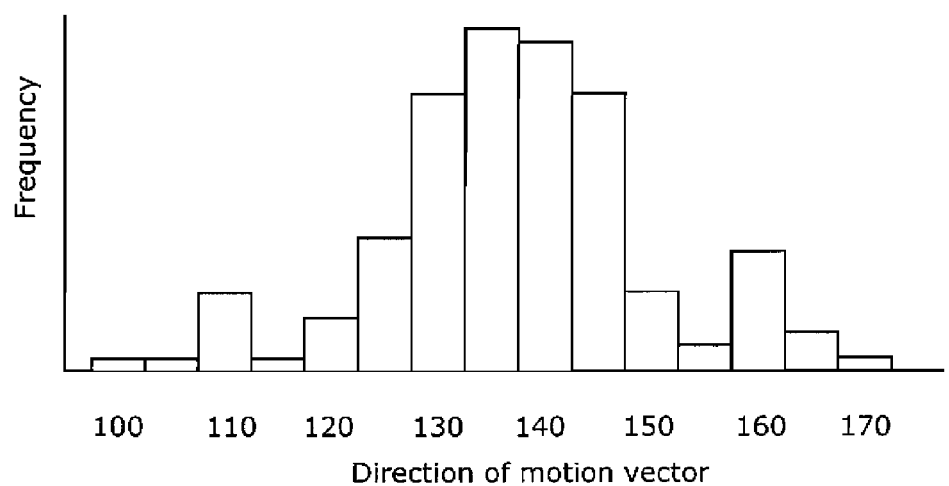
FIG. 16B is another explanatory view of the similarity of stationary object motion vectors in the first embodiment of the present invention.

FIGS. 16A and 16B are explanatory views of stationary object motion vector similarity (tolerable range) which is set in Step S100 in FIG. 15.

As explained with reference to FIG. 9, a motion vector is calculated as a movement of a feature point of a same pixel value from time T1 to time T2. In practice, however, the pixel value of the feature point may change due to various factors such as camera noise, a change of lighting, and anisotropy of a subject reflectance ratio.

Accordingly, stationary object motion vectors have various directions and magnitudes, as shown by solid-line arrows in FIG. 16A. This requires, for example, a process in which the stationary object detection unit 111 collects similar motion vectors from the motion vectors in the outer-frame area 161 and the camera movement calculation unit 113 calculates a mean of the similar motion vectors as a camera movement.

In detail, the stationary object detection unit 111 generates a histogram showing a relation between a motion vector direction and a frequency of motion vectors in the direction, as shown in FIG. 16B. The stationary object detection unit 111 accumulates motion vectors in decreasing order of frequency beginning with a maximum frequency. The stationary object detection unit 111 selects motion vectors corresponding to at least 50% of all frequencies as candidates for similar vectors (stationary object motion vectors), while discarding other motion vectors. The stationary object detection unit 111 then calculates a mean and variance of magnitudes of the similar vector candidates, extracts vectors which are, for example, within 75% of the variance, and finally determines the extracted vectors as stationary object motion vectors. In such a case, the stationary object detection unit 111 sets, as initial settings, a pitch of motion vector directions necessary for determining a horizontal axis of the histogram, a ratio to the accumulation frequency necessary for determining similar vector candidates, and a variance necessary for extracting final results from the similar vector candidates.

It should be noted here that the above method is merely one example and the present invention is not limited to such a method of detecting stationary object motion vectors. The setting of the stationary object motion vector similarity is executed by reading data from a memory in the stationary object detection unit 111.

Figure 17:
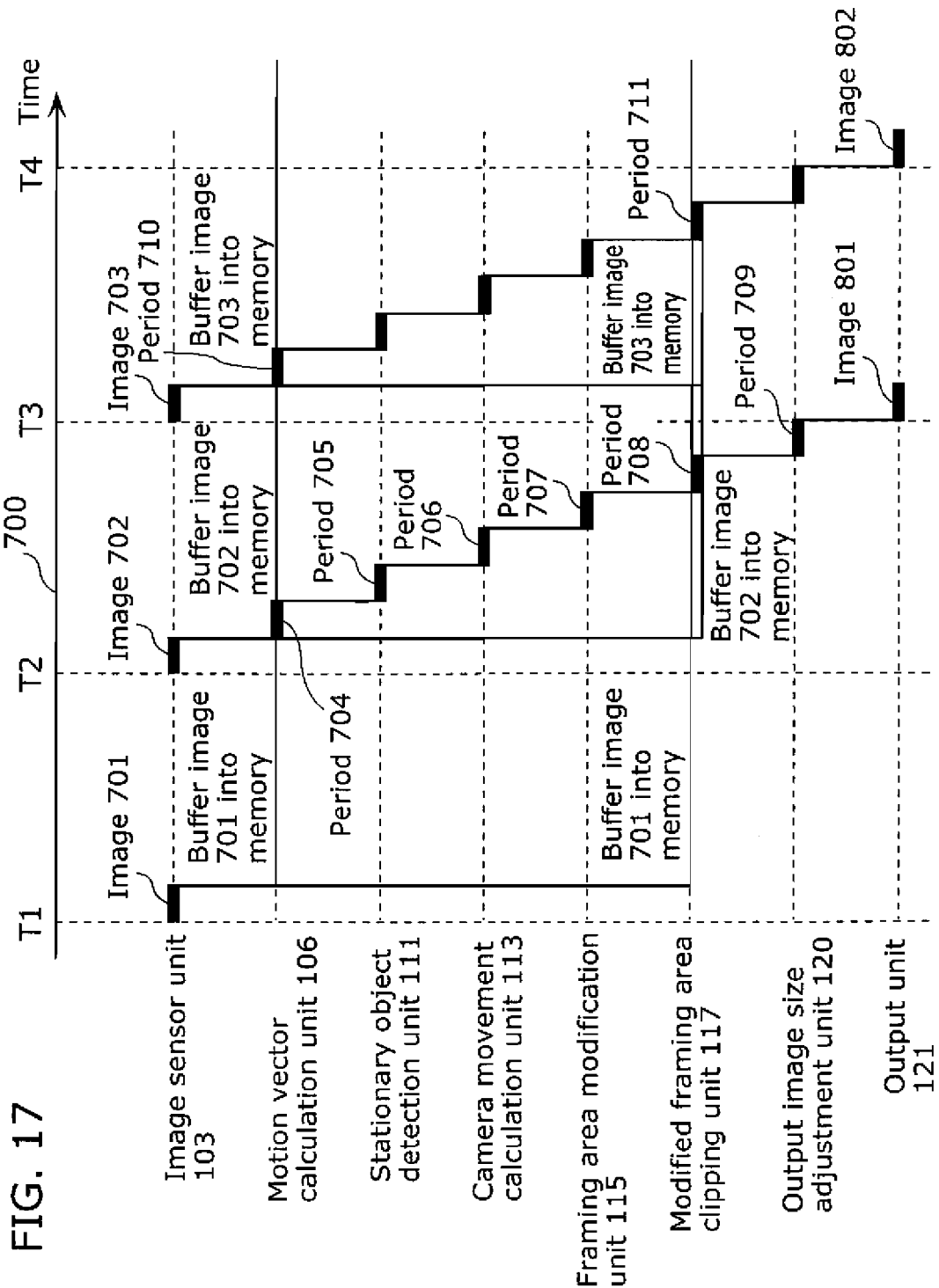
FIG. 17 shows an operation timing of each component in the image capturing apparatus in the first embodiment of the present invention.

FIG. 17 shows an operation timing of each component in the image capturing apparatus 100.

A time axis 700 shows time T1, time T2, time T3, and time T4 with time intervals at which the image sensor unit 103 and the output unit 121 output images. The image sensor unit 103 captures an image 701 which is the first image and outputs the image 701, at time T1. Subsequently, the image sensor unit 103 outputs an image 702 at time T2, and an image 703 at time T3.

The image 701 captured at time T1 is inputted to the motion vector calculation unit 106 and buffered in a memory internal to the motion vector calculation unit 106, and held until the image 702 is inputted at time T2 at which the image 701 becomes necessary to calculate motion vectors. Likewise, the image 701 captured at time T1 is inputted to the modified framing area clipping unit 117 and buffered in a memory internal to the modified framing area clipping unit 117, and held until the modified framing area signal 116 indicating a clipping position of the framing area is inputted.

In a period 704, the motion vector calculation unit 106 calculates motion vectors using the image 701 and the image 702, upon obtaining the image 702. Subsequently, in a period 705, the stationary object detection unit 111 detects a stationary object. In a period 706, the camera movement calculation unit 113 calculates a camera movement. In a period 707, the framing area modification unit 115 calculates the clipping position of the framing area for correcting image blurring.

In a period 708, the modified framing area clipping unit 117 clips an image of the area indicated by the modified framing area signal 116 out of the image 701 buffered in the memory. In a period 709, the output image size adjustment unit 120 converts a size of the image clipped out of the image 701. Lastly, the output unit 121 outputs an image 801 at time T3.

The image 702 captured at time T2 is continuously held in the memory in the motion vector calculation unit 106 after the period 704 in order to calculate, in a period 710, motion vectors between the image 702 and the image 703 captured at time T3. Likewise, the image 702 captured at time T2 is continuously held in is the memory in the modified framing area clipping unit 117 in order to modify the clipping position of the framing area in a period 711.

Thus, the image 701 captured at time T1 is outputted as the image 801 which has been blurring-corrected, at time T3. The same applies to time T2 onward, where the image 702 captured at time T2 is outputted as an image 802 at time T4.

A 3-dimensional movement of a camera can be decomposed into a rotation and a translation. The above method of image blurring correction whereby the position of the framing area is changed while fixing the size of the framing area mainly corrects image blurring caused by a rotation. On the other hand, image blurring caused by a translation can be corrected by changing the size of the framing area.

Accordingly, in the case of integratively considering a rotation and a translation, the camera movement calculation unit 113 and the framing area modification unit 115 perform 3-dimensional affine transform, integratively detect a rotation and a translation of the camera, and change the position and size of the framing area. Such integrative detection corresponds to least squares approximation of coefficients of a 3-dimensional affine transform matrix by a plurality of motion vectors. Thus, by generalizing the integrative detection by 3-dimensional affine transform, more accurate image blurring correction can be achieved than in the case of changing the position of the framing area 160 of the fixed size as explained with reference to FIGS. 1A to 1C.

It should be noted that the present invention can be realized not only as the image capturing apparatus 100 in this embodiment, but also as an image capturing method including steps corresponding to the characteristic units included in the image capturing apparatus 100, or a program causing a computer to execute these steps. Such a program can be distributed via a recording medium such as a CD-ROM or a transmission medium such as an internet.

As described above, according to the image capturing apparatus 100 in this embodiment, an unblurred image can be recorded even when capturing, for example, a sport scene in which a subject moves actively. In addition, even in the case where two or more players move in various directions at various speeds, the image capturing apparatus 100 can correct blurring by detecting a camera movement from a stationary object in the outer-frame area 161. Since a tripod is not necessary for image capturing unlike the conventional techniques, the subject can be captured from various angles and distances, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring.

Second Embodiment

An image capturing apparatus in this embodiment captures an image with a larger angle of view than an angle of view set by a photographer, and corrects image blurring when clipping an output image to be outputted from the image capturing apparatus out of the captured image, as with the image capturing apparatus in the first embodiment. The image capturing apparatus in this embodiment has the features of the image capturing apparatus in the first embodiment, and is also characterized in that image blurring correction accuracy can be enhanced by changing the outer-frame area in size depending on camera movement detection accuracy.

Figure 18:
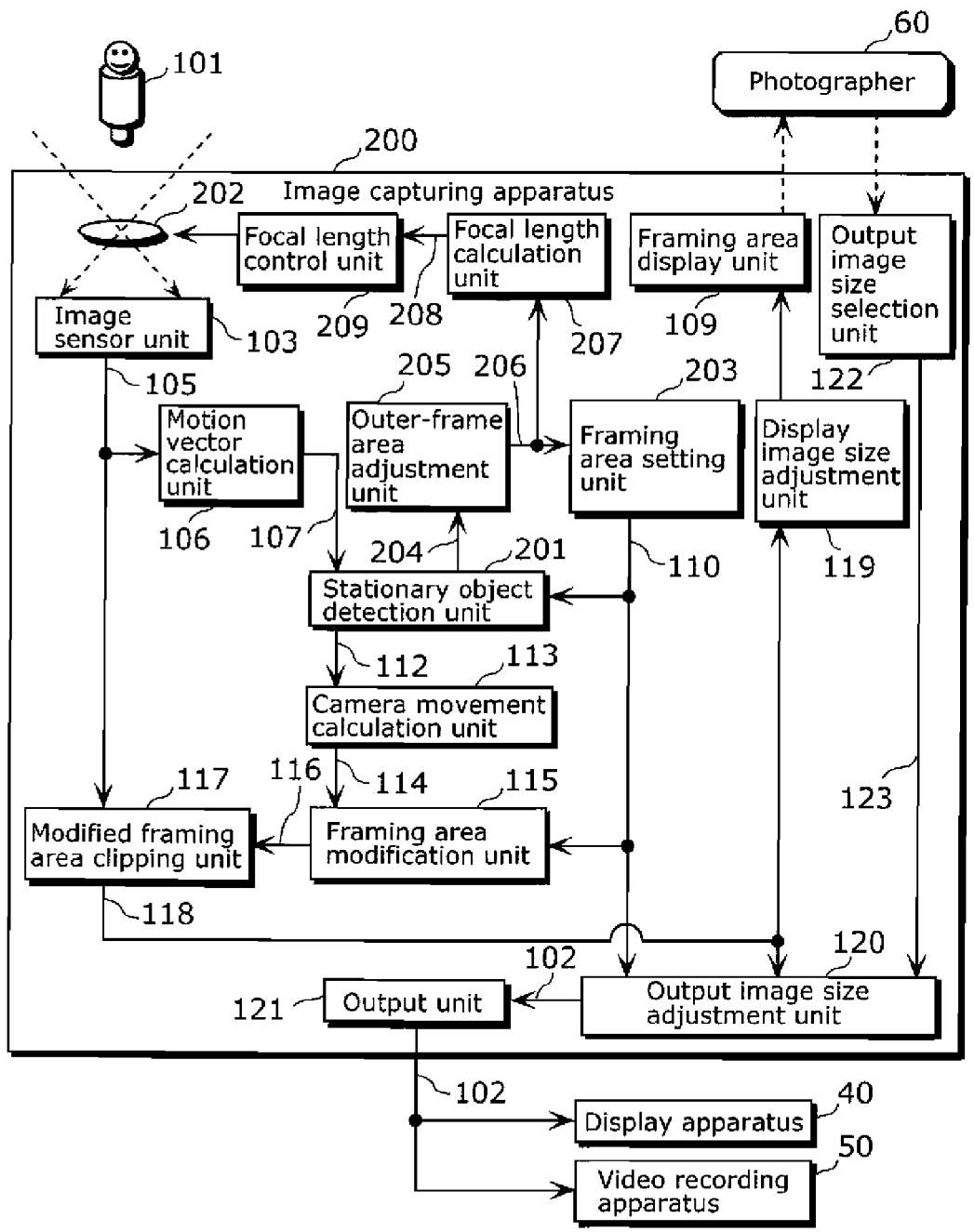
FIG. 18 is a block diagram showing a structure of an image capturing apparatus in a second embodiment of the present invention.

FIG. 18 is a block diagram showing a structure of an image capturing apparatus 200 in the second embodiment of the present invention. Components which are the same as those in the image capturing apparatus 100 shown in FIG. 5 have been given the same reference numerals and their detailed explanation has been omitted.

The image capturing apparatus 200 in this embodiment is an apparatus that captures the image of the subject 101 and outputs the output image 102 to the display apparatus 40 and the video recording apparatus 50, and includes the image sensor unit 103, the motion vector calculation unit 106, the framing area display unit 109, the camera movement calculation unit 113, the framing area modification unit 115, the modified framing area clipping unit 117, the display image size adjustment unit 119, the output image size adjustment unit 120, the output unit 121, the output image size selection unit 122, a stationary object detection unit 201, a focal length variable lens unit 202, a framing area setting unit 203, an outer-frame area adjustment unit 205, a focal length calculation unit 207, and a focal length control unit 209.

For example, the output image 102 is displayed on the display apparatus 40 connected to the image capturing apparatus 200 so as to include the image of the subject 101, or recorded to the video recording apparatus 50 connected to the image capturing apparatus 200.

The stationary object detection unit 201 detects a stationary object movement from motion vectors included in the outer-frame area 161, as explained with reference to FIG. 9. When doing so, the stationary object detection unit 201 measures stationary object motion vector detection accuracy, and compares the detection accuracy with a threshold (hereafter referred to as outer-frame area change threshold tr). When the detection accuracy is lower than outer-frame area change threshold tr, the stationary object detection unit 201 controls the outer-frame area adjustment unit 205 to widen the outer-frame area 161. As a result, the image capturing apparatus 100 captures the image of the subject 101 again in a state where the outer-frame area 161 is widened. In detail, the image sensor unit 103 outputs the input image 105 again in a state where the outer-frame area 161 is widened, and the stationary object detection unit 201 detects stationary object motion vectors again from this input image 105. Consequently, the stationary object detection unit 201 outputs the stationary object motion vector signal 112 showing stationary object motion vectors detected with detection accuracy equal to or higher than outer-frame area change threshold tr.

That is, the stationary object detection unit 201 which is included in the movement detection unit detects motion vectors in the outer area, and derives a dispersion of the detected motion vectors as detection accuracy. The image capturing apparatus 200 in this embodiment further includes the outer-frame area adjustment unit 205 which is an area adjustment unit that adjusts, when the detection accuracy does not meet a predetermined threshold, a size of the outer area so that the detection accuracy meets the predetermined threshold.

The framing area setting unit 203 sets a size of the framing area 160 according to the size of the outer-frame area 161 adjusted by the outer-frame area adjustment unit 205 so that a boundary of the outer-frame area 161 and a boundary of the framing area 160 coincide with each other.

The focal length variable lens unit 202 is located in front of the image sensor unit 103. The focal length variable lens unit 202 maintains a constant angle of view of the framing area 160 which is narrowed as a result of widening the outer-frame area 161, by reducing a focal length and widening an image capturing angle of view.

In the present invention, a method of detecting stationary object motion vectors and a definition of accuracy of the detection are arbitrary. As one example, the stationary object detection unit 201 calculates a mean of all motion vectors included in the outer-frame area 161, and compares a distance between each motion vector and the mean, with a threshold (hereafter referred to as stationary object detection threshold td). When the distance between the motion vector and the mean is smaller than stationary object detection threshold td, the stationary object detection unit 201 determines the motion vector subjected to the judgment as a stationary object motion vector, on the ground that the motion vector subjected to the judgment has high similarity to the mean.

Moreover, when measuring the detection accuracy, the stationary object detection unit 201 uses a variance of stationary object motion vectors as one example. In this case, the stationary object detection unit 201 compares the stationary object motion vector variance with outer-frame area change threshold tr. When the variance is smaller than outer-frame area change threshold tr, the stationary object detection unit 201 judges that only motion vectors of a single object are detected as stationary object motion vectors, and consequently judges that the stationary object motion vector detection accuracy is sufficient. When judging that the stationary object motion vector detection accuracy is sufficient, the stationary object detection unit 201 outputs the stationary object motion vector signal 112. Alternatively, the stationary object detection unit 201 judges that the stationary object motion vector detection accuracy is more than sufficient and, instead of outputting the stationary object motion vector signal 112, controls the outer-frame area adjustment unit 205 to narrow the outer-frame area 161 so that stationary object motion vector detection is performed again. Which is to say, the stationary object detection unit 201 outputs the stationary object motion vector detection accuracy as a stationary object motion vector detection accuracy signal 204.

On the other hand, when the stationary object motion vector variance is larger than outer-frame area change threshold tr, the stationary object detection unit 201 judges that the motion vectors extracted as stationary object motion vectors include a motion vector of a moving object. In this case, the stationary object detection unit 201 judges that the stationary object motion vector detection accuracy is insufficient and, instead of outputting the stationary object motion vector signal 112, controls the outer-frame area adjustment unit 205 to widen the outer-frame area 161 so that stationary object motion vector detection is performed again. Which is to say, the stationary object detection unit 201 outputs the stationary object motion vector detection accuracy as the stationary object motion vector accuracy signal 204. In the case of defining the detection accuracy on the basis of the variance, an inverse of the variance is used, where the detection accuracy is higher when the variance is smaller.

As explained with reference to FIGS. 11A and 11B, when the image capturing apparatus 200 and the subject 101 are very close to each other (as shown in FIG. 11A) or when the photographer 60 is moving on the movement unit 80 (as shown in FIG. 11B), a movement is observed in the entire screen, with a viewer naturally perceiving a movement from a produced image. In such a case, image blurring correction is unnecessary, and so stationary object detection is unnecessary.

In view of this, the stationary object detection unit 201 uses the stationary object motion vector detection accuracy signal 204 to suppress the process of adjusting the outer-frame area 161, and simultaneously uses the stationary object motion vector signal 112 to suppress image blurring correction. In more detail, first the stationary object detection unit 201 measures a frequency with which a distance between each individual motion vector and the mean of these motion vectors exceeds stationary object detection threshold td. When the frequency exceeds a predetermined threshold (stationary object recognition threshold ts), the stationary object detection unit 201 judges that there is a movement in the entire screen. Second, upon judging that there is a movement in the entire screen, the stationary object detection unit 201 outputs, for example, the stationary object motion vector detection accuracy signal 204 showing 0 to the outer-frame area adjustment unit 205, to suppress the adjustment of the outer-frame area 161. Third, upon judging that there is a movement in the entire screen, the stationary object detection unit 201 outputs, for example, the stationary object motion vector signal 112 showing a motion vector whose components are all 0 or the stationary object motion vector signal 112 showing a motion vector whose components are all clearly larger than a maximum motion vector magnitude (such as a diagonal length of an image), to the camera movement calculation unit 113, to suppress the camera movement calculation and thereby suppress the image blurring correction.

The outer-frame area adjustment unit 205 adjusts a rate of widening or narrowing the outer-frame area according to the detection accuracy shown by the stationary object motion vector detection accuracy signal 204, and outputs information showing coordinates of the outer-frame area 161 used for the next image capturing, as an outer-frame area update signal 206. Which is to say, when the detection accuracy shown by the stationary object motion vector detection accuracy signal 204 is lower than outer-frame area change threshold tr, the outer-frame area adjustment unit 205 judges that the detection accuracy is insufficient, and adjusts the outer-frame area 161 to be wider.

For example, when the current time is T1 and the next frame image timing is T2, the outer-frame area adjustment unit 205 changes width Wf1 of the framing area 160 at time T1 to width Wf2 of the framing area 160 at time T2 according to (Expression 1).

$$Wf2 = \frac{Wf1}{c} \quad \text{(Expression 1)}$$

Here, c is an outer-frame area change rate. When outer-frame area change rate c exceeds 1, the width of the framing area 160 becomes smaller, and the outer-frame area 161 widens. Conversely, when outer-frame area change rate c is below 1, the width of the framing area 160 becomes larger, and the outer-frame area 161 narrows.

Figure 19:
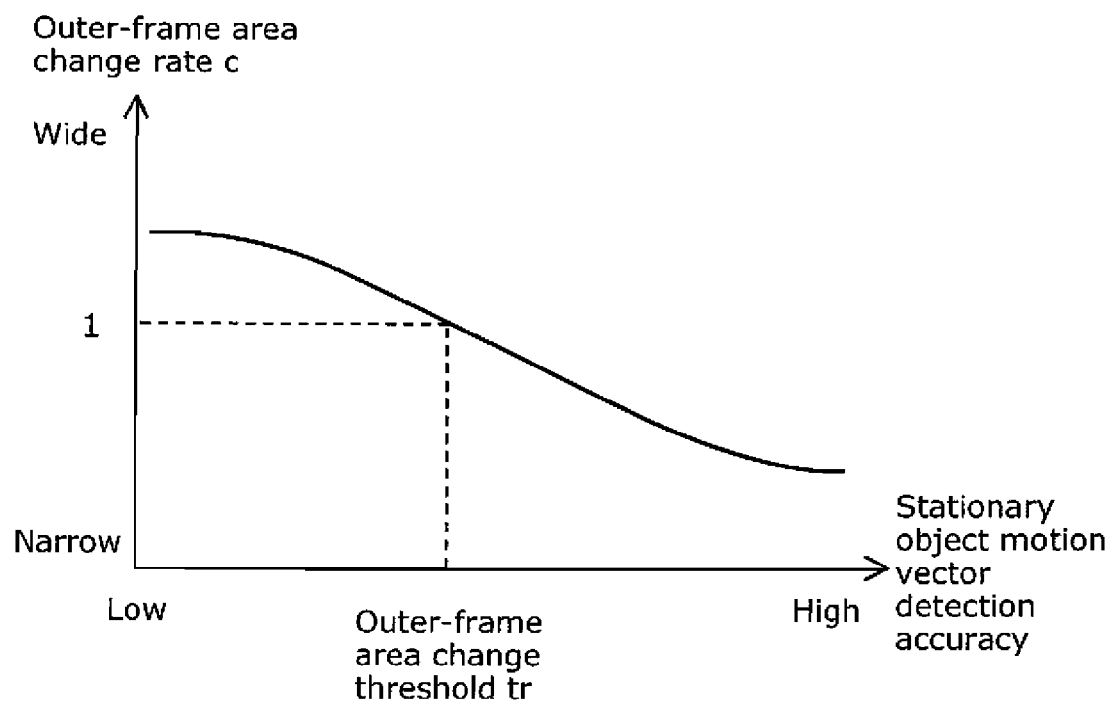
FIG. 19 shows an example of a relation between stationary object motion vector detection accuracy and an outer-frame area change rate in the second embodiment of the present invention.

Having set a relation (a relational expression or a conversion table) such as the one shown in FIG. 19 beforehand, the outer-frame area adjustment unit 205 calculates outer-frame area change rate c according to the stationary object motion vector detection accuracy signal 204.

FIG. 19 shows a relation between outer-frame area change rate c and the stationary object motion vector detection accuracy.

As shown in FIG. 19, outer-frame area change rate c is set to become smaller as the stationary object motion vector detection accuracy increases.

This being the case, when the stationary object motion vector detection accuracy is lower than outer-frame area change threshold tr, outer-frame area change rate c is larger than 1. As a result, the outer-frame area is widened according to (Expression 1). When the stationary object motion vector detection accuracy is higher than outer-frame area change threshold tr, on the other hand, outer-frame area change rate c is smaller than 1. As a result, the outer-frame area is narrowed according to (Expression 1).

The outer-frame area adjustment unit 205 outputs width Wf2 of the framing area 160 at time T2 to the framing area setting unit 203 as the outer-frame area update signal 206. The framing area setting unit 203 accordingly updates the framing area 160 so that the width of the framing area 160 at time T2 becomes Wf2. The outer-frame area adjustment unit 205 also outputs the outer-frame area update signal 206 to the focal length calculation unit 207, to change the image capturing angle of view.

Though the outer-frame area update signal 206 shows width Wf2 of the framing area 160 in this embodiment, this is merely one example, and the outer-frame area update signal 206 may show any information so long as it uniquely determines the outer-frame area 161. For example, the outer-frame area update signal 206 may show an area ratio of the outer-frame area 161 to the input image 105. Moreover, the relation between the stationary object motion vector detection accuracy and outer-frame area change rate c shown in FIG. 19 is arbitrary, and the present invention is not limited to such.

The focal length calculation unit 207 calculates a focal length of the focal length variable lens unit 202 at time T2, according to the outer-frame area update signal 206.

Figure 20:
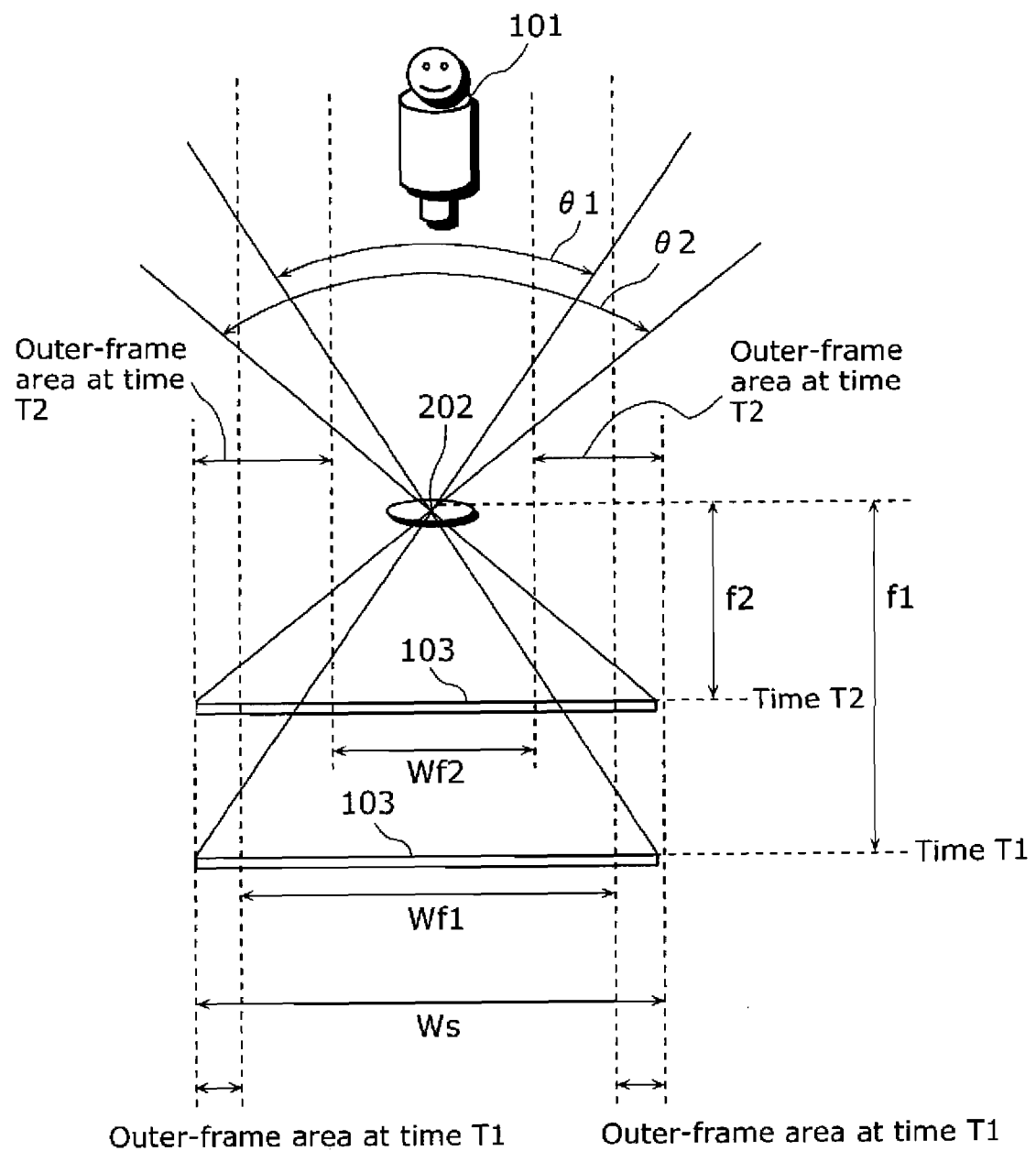
FIG. 20 shows a situation where an outer-frame area is widened in the second embodiment of the present invention.

FIG. 20 shows a situation where the outer-frame area 161 is widened from time T1 to time T2.

As one example, at time T1, the distance between the image sensor unit 103 and the focal length variable lens unit 202, i.e., the focal length, is f1, the angle of view is θ1, and the width of the framing area 160 is Wf1. Moreover, when the width of the image sensor unit 103 expressed by the number of horizontal pixels is Ws, the width of the outer-frame area 161 at time T1 is (Ws−Wf1).

Here, the outer-frame area update signal 206 indicating to decrease width Wf1 of the framing area 160 to widen the outer-frame area 161 is outputted.

This being the case, the focal length calculation unit 207 calculates focal length f2 (focal length f1>focal length f2) according to the outer-frame area update signal 206, and outputs an update focal length signal 208 showing focal length f2 to the focal length control unit 209.

Upon obtaining the update focal length signal 208, the focal length control unit 209 changes focal length f1 to focal length f2 shown by the update focal length signal 208, at time T2.

As a result, the angle of view is widened from θ1 to θ2 at time T2. In addition, the width of the framing area 160 is changed to Wf2 at time T2, according to the outer-frame area update signal 206. Consequently, the width of the outer-frame area 161 is increased from (Ws−Wf1) to (Ws−Wf2). Having changed the outer-frame area 161 in this way, the stationary object motion vector detection accuracy is checked again.

In more detail, the focal length calculation unit 207 calculates focal length f2 for changing the width of the framing area 160 to Wf2 at time T2, according to (Expression 2) shown below.

$$f2 = f1 \frac{Wf2}{Wf1} \quad \text{(Expression 2)}$$

Having calculated the focal length in this way, the focal length calculation unit 207 outputs the update focal length signal 208 showing the focal length to the focal length control unit 209. On the other hand, in the case where the accuracy of detecting stationary object motion vectors in the outer-frame area 161 is more than sufficient, the focal length calculation unit 207 and the focal length control unit 209 may increase the focal length to narrow the outer-frame area 161.

That is, the image capturing apparatus 200 in this embodiment includes the focal length calculation unit 207 and the focal length control unit 209 which are an angle-of-view adjustment unit that makes an angle of view of the image captured by the image sensor unit 103 wider when the outer area is adjusted to be wider by the outer-frame area adjustment unit 205 which is the area adjustment unit. This allows the angle of view of the framing area 160 to be maintained constant even when the size of the outer-frame area 161 changes.

Note that there may be a case where the stationary object motion vector detection accuracy never exceeds outer-frame area change threshold tr in the stationary object detection unit 201, even when the focal length of the focal length variable lens unit 202 continues to be updated. In such a case, the state where the update of motion vectors is not performed by the stationary object detection unit 201 and the update of the framing area 160 is not performed by the framing area modification unit 115 continues.

To address this, the stationary object detection unit 201 may set maximum update number m for the outer-frame area

161 and, when the number of updates of the outer-frame area 161 reaches maximum update number m, output stationary object motion vectors detected at this point as the stationary object motion vector signal 112. Maximum update number m can be determined basically from a frame rate difference between the image sensor unit 103 and the output unit 121.

For instance, suppose the image sensor unit 103 has a frame rate of 60 frames per second, and the output unit 121 has a frame rate of 15 frames per second. In this case, the image sensor unit 103 can capture 4 frames while the output unit 121 outputs one frame. Though this means there are four chances of performing stationary object detection, maximum update number m for the outer-frame area is set to, for example, 3 or 2, given that processes such as the stationary object detection and the change of the focal length of the focal length variable lens unit 202 require time. In the case where, instead of completing an image blurring correction update for every frame image of the output unit 121, the update of the framing area 160 by the framing area modification unit 115 is performed once every two frames of the output unit 121, maximum update number m is increased by 1 to be, for example, 4 or 3.

When the image sensor unit 103 and the output unit 121 have the same frame rate, the update of the framing area 160 by the framing area modification unit 115 is performed intermittently with respect to the output unit 121. In detail, since the image sensor unit 103 and the output unit 121 operate at the same frame rate, as the number of times the outer-frame area 161 is adjusted increases, the update speed of the framing area modification unit 115 decreases, as a result of which the same state of image blurring correction continues in the output unit 121. In view of this, maximum update number m is about 1 to 4, and is determined from the frame rates of the image sensor unit 103 and the output unit 121. Here, immediately after the image capturing apparatus 200 is started, the image capturing apparatus 200 initially does not perform the adjustment of the outer-frame area 161 by setting maximum update number m to 0, and executes the series of processes to output, from the output unit 121, the output image 102 which has been blurring-corrected.

Moreover, maximum update number m also relates to how much the outer-frame area 161 is widened or narrowed by the outer-frame area adjustment unit 205. In detail, when maximum update number m is 1, there is one chance of changing the size of the outer-frame area, and so it is desirable to change the size of the outer-frame area to a relatively large extent. For example, the outer-frame area is widened by decreasing the width of the framing area 160 to half. When maximum update number m is 4, there are four chances of changing the size of the outer-frame area, which allows finer control than in the case where maximum update number m is 1. In the case where maximum update number m is 4, by changing the size of the outer-frame area to a relatively large extent the first time and then gradually decreasing the extent of change the second time, the third time, and the fourth time, finer control can be performed.

According to the above structure, the image capturing apparatus 200 in this embodiment widens the outer-frame area 161 to recover the stationary object motion vector detection accuracy, when the stationary object motion vector detection accuracy is low. This operation increases the camera movement detection accuracy, and improves the image blurring correction accuracy. When the stationary object motion vector detection accuracy is high, on the other hand, the image capturing apparatus 200 narrows the outer-frame area 161 to suppress excessive detection of stationary object motion vectors. This operation widens the framing area 160, with it being possible to limit the image magnification rate in the output image size adjustment unit 120. Typically, when the image magnification rate is higher, the image magnification process becomes more complex, making the obtainment of resources shown in FIGS. 12 and 14 difficult. Therefore, by widening the framing area 160 and suppressing excessive widening of the outer-frame area 161, it is possible to prevent an excessive processing load on the output image size adjustment unit 120.

Figure 21:
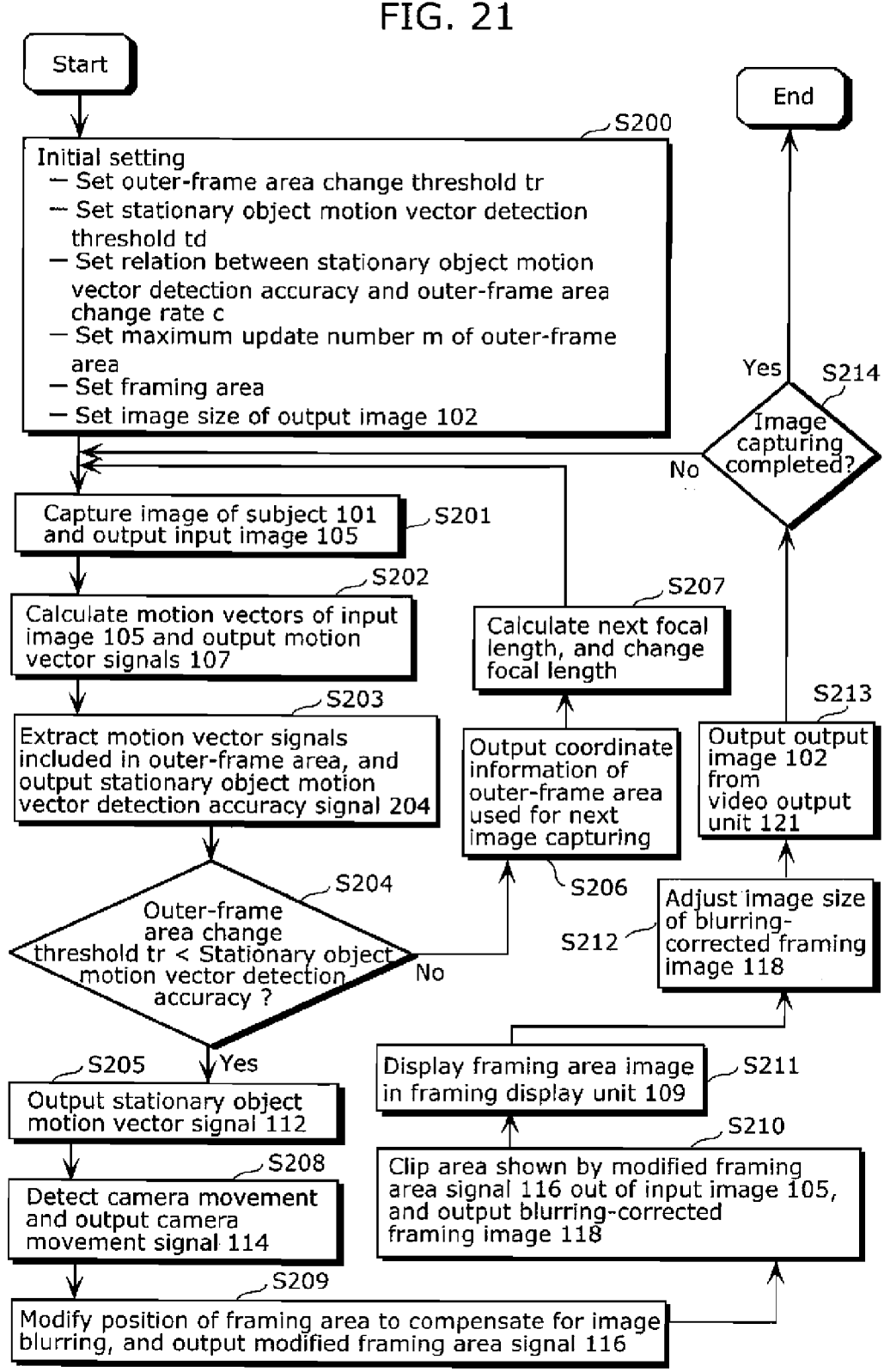
FIG. 21 is a flowchart showing an operation of the image capturing apparatus in the second embodiment of the present invention.

FIG. 21 is a flowchart showing an operation of the image capturing apparatus 200 in this embodiment shown in FIG. 18.

First, the image capturing apparatus 200 performs six initial settings which are described below in sequence (Step S200). A first initial setting is the setting of outer-frame area change threshold tr. When the stationary object motion vector detection accuracy is lower than outer-frame area change threshold tr, the image capturing apparatus 200 widens the outer-frame area 161, and captures the input image 105 and detects stationary object motion vectors again. Outer-frame area change threshold tr is set in the stationary object detection unit 201.

A second initial setting in Step S200 is the setting of stationary object detection threshold td. This setting is the same as the one in FIGS. 16A and 16B in the first embodiment.

A third initial setting in Step S200 is the setting of the relation between the stationary object motion vector detection accuracy and outer-frame area change rate c. As explained with reference to FIG. 19, since outer-frame area change rate c depends on the stationary object motion vector detection accuracy, the relation with the measure of the stationary object motion vector detection accuracy (e.g. an inverse of a variance of stationary object motion vectors) is provided in the initial setting. The relation between the stationary object motion vector detection accuracy and outer-frame area change rate c is set in the stationary object detection unit 201 and the outer-frame area adjustment unit 205.

A fourth initial setting in Step S200 is the setting of maximum update number m for the outer-frame area. There may be a case where, even when the outer-frame area 161 continues to be widened while repeatedly updating the focal length of the focal length variable lens unit 202, the stationary object motion vector detection accuracy (e.g., the variance of stationary object motion vectors) never fall below outer-frame area change threshold tr. Maximum update number m is a threshold for breaking out of such an infinite loop state. Maximum update number m for the outer-frame area 161 is set in the stationary object detection unit 201.

A fifth initial setting in Step S200 is the setting of the framing area. This is the same setting as Step S100 in FIG. 15.

A sixth initial setting in Step S200 is the setting of the image size of the output image 102. This is the same setting as Step S100 in FIG. 15.

Following the initial settings in Step S200, the image sensor unit 103 in the image capturing apparatus 200 captures the image of the subject 101 through the focal length variable lens unit 202, and outputs the input image 105 (Step S201). The motion vector calculation unit 106 calculates motion vectors of the input image 105, and outputs motion vector signals 107 (Step S202). The stationary object detection unit 201 extracts motion vectors included in the outer-frame area 161, and outputs the stationary object motion vector detection accuracy signal 204 (Step S203).

The stationary object detection unit 201 compares the detection accuracy shown by the stationary object motion vector detection accuracy signal 204 with outer-frame area change threshold tr (Step S204). When the detection accuracy is higher than outer-frame area change threshold tr (Step S204: Yes), the stationary object detection unit 201 judges that the detection accuracy is sufficient, and outputs the stationary object motion vector signal 112 (Step S205). When the detection accuracy is lower than outer-frame area change threshold tr (Step S204: No), the stationary object detection unit 201 judges that the detection accuracy is insufficient, and cancels the output of the stationary object motion vector signal 112. The outer-frame area adjustment unit 205 outputs information showing coordinates of the outer-frame area 161 used for next image capturing at time T2 as the outer-frame area update signal 206, according to the stationary object motion vector detection accuracy signal 204 (Step S206).

The focal length calculation unit 207 calculates focal length f2 of the focal length variable lens unit 202 at time T2, according to the outer-frame area update signal 206. The focal length control unit 209 changes the focal length of the focal length variable lens unit 202 to focal length f2 (Step S207).

The camera movement calculation unit 113, upon obtaining the stationary object motion vector signal 112 outputted in Step S205, calculates the camera movement from the stationary object motion vector signal 112, and outputs the camera movement signal 114 (Step S208). The framing area modification unit 115 corrects image blurring by moving the framing area shown by the framing area setting signal 110 in an opposite direction to a motion vector shown by the camera movement signal 114, and outputs the modified framing area signal 116 (Step S209).

The modified framing area clipping unit 117 clips an area shown by the modified framing area signal 116 out of the input image 105, and outputs the clipped area as the blurring-corrected framing image 118 which has been blurring-corrected (Step S210). The display image size adjustment unit 119 adjusts the image size of the blurring-corrected framing image 118 to the image size of the framing area display unit 109. The framing area display unit 109 displays the image of the framing area 160 for the photographer 60 (Step S211). Likewise, the output image size adjustment unit 120 adjusts the image size of the blurring-corrected framing image 118 (Step S212). In Step S212, however, the output image size selection signal 123 is outputted at an arbitrary timing according to an operation by the photographer 60, and the image size of the output image 102 is changed as needed. The output unit 121 outputs the output image 102 whose size has been adjusted, to outside the image capturing apparatus 200 (Step S213). After this, the image capturing apparatus 200 judges whether image capturing continues or is completed (Step S214). When image capturing continues (Step S214: No), the image capturing apparatus 200 repeats the process from Step S201. When image capturing is completed (Step S214: Yes), the image capturing apparatus 200 ends the entire image capturing operation.

Note here that Step S211 and Steps S212 and S213 may be performed in reverse order or simultaneously.

Figure 22:
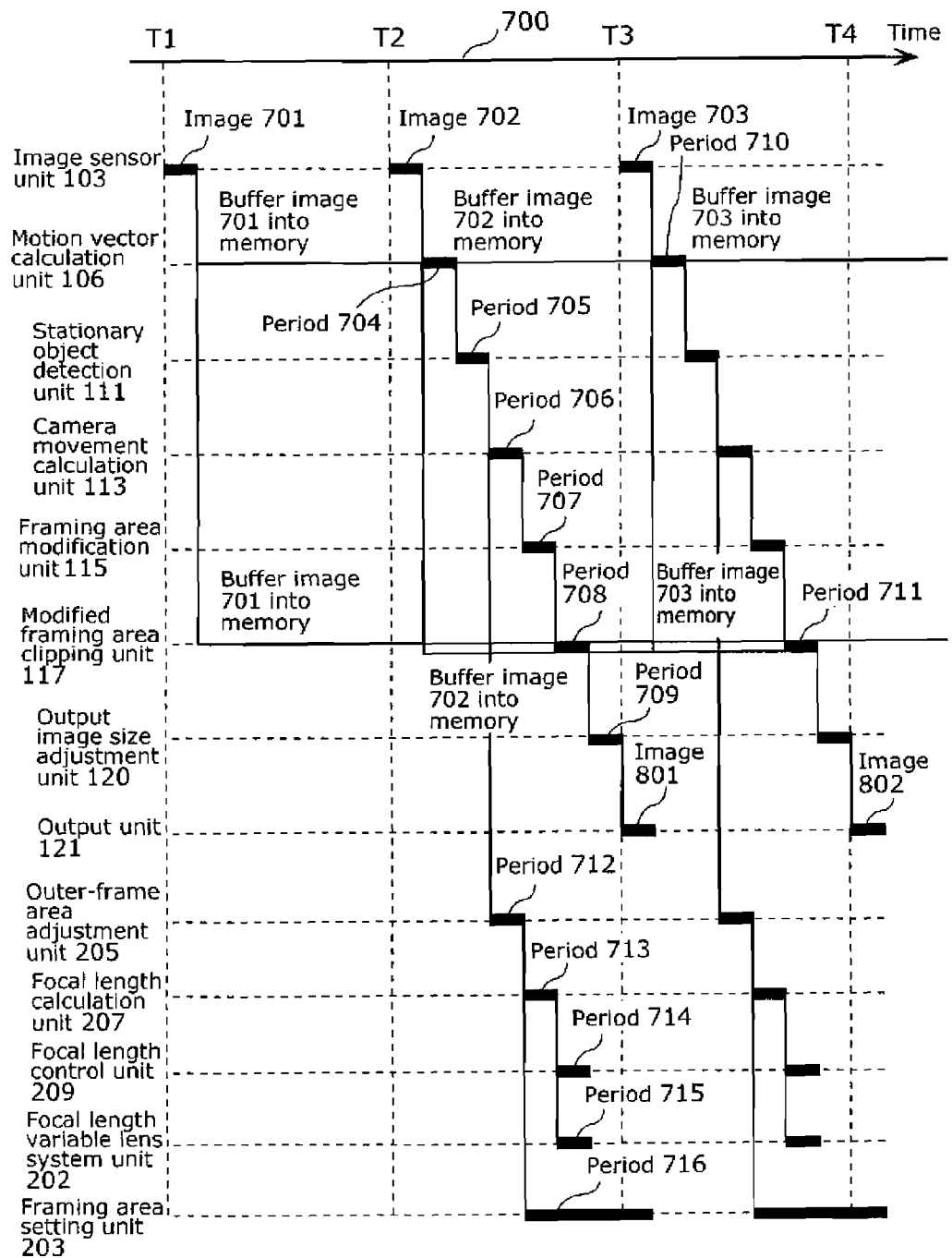
FIG. 22 shows an operation timing of each component in the image capturing apparatus in the second embodiment of the present invention.

FIG. 22 shows an operation timing of each component in the image capturing apparatus 200.

The time axis 700 shows time T1, time T2, time T3, and time T4 with time intervals at which the image sensor unit 103 and the output unit 121 output images. The timings at which the image 701 is captured at time T1 and the image 801 is outputted at time T3 are the same as the timings shown in FIG. 17.

In the period 705, the stationary object detection unit 111 notifies the outer-frame area adjustment unit 205 of the stationary object detection accuracy as the stationary object motion vector detection accuracy signal 204. As a result, in a period 712, the outer-frame area adjustment unit 205 adjusts the size of the outer-frame area 161, and outputs the outer-frame area update signal 206 showing the adjusted outer-frame area 161 to the focal length calculation unit 207. In a period 713 which follows, the focal length calculation unit 207 calculates the focal length according to the adjusted size of the outer-frame area 161. In a period 714, the focal length control unit 209 controls the focal length of the focal length variable lens unit 202. Accordingly, in a period 715, the focal length variable lens unit 202 changes its focal length. As a result, the image capturing by the image sensor unit 103 at time T3 is performed with the changed focal length.

Meanwhile, the outer-frame area adjustment unit 205 also outputs the outer-frame area update signal 206 showing the outer-frame area 161 adjusted in the period 712, to the framing area setting unit 203. As a result, in a period 716, the framing area setting unit 203 changes the size of the framing area. This change is outputted to the stationary object detection unit 201, the framing area modification unit 115, and the output image size adjustment unit 120 as the framing area setting signal 110, and the stationary object detection unit 201, the framing area modification unit 115, and the output image size adjustment unit 120 all reflect the change on the image 703 captured at time T3. Here, the stationary object detection unit 201, the framing area modification unit 115, and the output image size adjustment unit 120 need to wait until the processing of the image 702 captured at time T2 ends. Therefore, in the period 716, first the framing area setting unit 203 calculates the framing area setting signal 110, and then the stationary object detection unit 201, the framing area modification unit 115, and the output image size adjustment unit 120 each reflect the framing area setting signal 110 at a timing when the corresponding process ends.

As described above, according to the image capturing apparatus 200 in this embodiment, an unblurred image can be recorded even when capturing, for example, a sport scene in which a subject moves actively. In addition, even in the case where two or more players move in various directions at various speeds, the image capturing apparatus 200 can correct image blurring by detecting a camera movement from a stationary object in the outer-frame area. Since a tripod is not necessary for image capturing unlike the conventional techniques, the subject can be captured from various angles and distances, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring.

Moreover, when a moving subject appears large in the outer-frame area 161, motion vectors in that area have a large variance, and so the stationary object motion vector detection accuracy is lower than outer-frame area change threshold tr. This being so, in the image capturing apparatus 200 in this embodiment, the outer-frame area 161 is adjusted to be wider so that the detection accuracy exceeds outer-frame area change threshold tr. In other words, when the outer-frame area 161 is wider, a proportion of a stationary background in that area increases, with it being possible to increase the stationary object motion vector detection accuracy. As a result, the movement of the image capturing apparatus 200 can be detected accurately by using motion vectors which contribute to high stationary object motion vector detection accuracy, that is, motion vectors with a small variance, without being affected by a moving subject. Hence image blurring can be corrected appropriately.

Furthermore, the image capturing apparatus 200 adaptively changes the size of the outer-frame area 161 necessary for stationary object detection. This makes it possible to prevent a problem of widening the outer-frame area 161 more than necessary and as a result making the framing area too small. The framing area 160 needs to be magnified to match the image size of the display screen. When the framing area 160 becomes excessively small, there is a possibility of reaching a limit of a resolution increase process, which causes degradation of the output image. The image capturing apparatus 200 can achieve both the image blurring correction and the resolution increase of the framing area 160 by adjusting the stationary object detection accuracy. Hence image blurring correction with a high image quality can be realized.

Third Embodiment

An image capturing apparatus in this embodiment captures an image with a wider angle of view than an angle of view set by a photographer, and corrects image blurring when clipping an output image to be outputted from the image capturing apparatus out of the captured image, as with the image capturing apparatus in the second embodiment. The image capturing apparatus in this embodiment has the features of the image capturing apparatus in the second embodiment, and is also characterized in that the photographer can change a zoom factor (angle of view).

Figure 23:
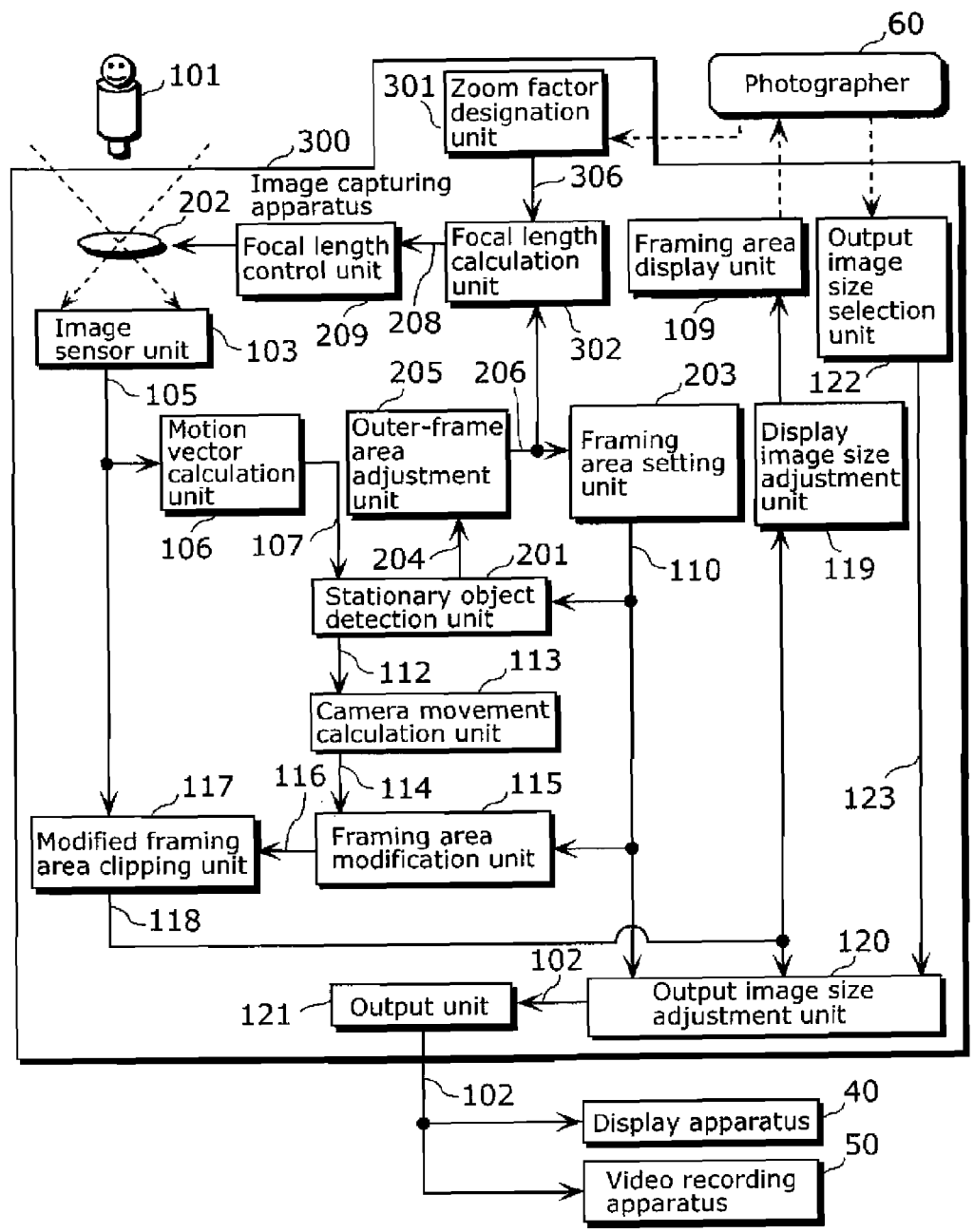
FIG. 23 is a block diagram showing a structure of an image capturing apparatus in a third embodiment of the present invention.

FIG. 23 is a block diagram showing a structure of an image capturing apparatus 300 in the third embodiment of the present invention. Components which are the same as those in the image capturing apparatus 200 shown in FIG. 18 have been given the same reference numerals, and their detailed explanation has been omitted.

The image capturing apparatus 300 in this embodiment is an apparatus that captures the image of the subject 101 and outputs the output image 102 to the display apparatus 40 and the video recording apparatus 50, and includes the image sensor unit 103, the motion vector calculation unit 106, the framing area display unit 109, the camera movement calculation unit 113, the framing area modification unit 1151 the modified framing area clipping unit 117, the display image size adjustment unit 119, the output image size adjustment unit 120, the output unit 121, the output image size selection unit 122, the stationary object detection unit 201, the focal length variable lens unit 202, the framing area setting unit 203, the outer-frame area adjustment unit 205, the focal length control unit 209, a zoom factor designation unit 301, and a focal length calculation unit 302.

For example, the output image 102 is displayed on the display apparatus 40 connected to the image capturing apparatus 300 so as to include the image of the subject 101, or recorded to the video recording apparatus 50 connected to the image capturing apparatus 300.

The zoom factor designation unit 301 receives designation of a zoom factor according to an operation by the photographer 60, and outputs a photographer-designated zoom factor signal 306 showing the designated zoom factor to the focal length calculation unit 302.

The photographer 60 can optically adjust the zoom factor by operating the image capturing apparatus 300, so as to widen or narrow the angle of view.

Figure 24A:
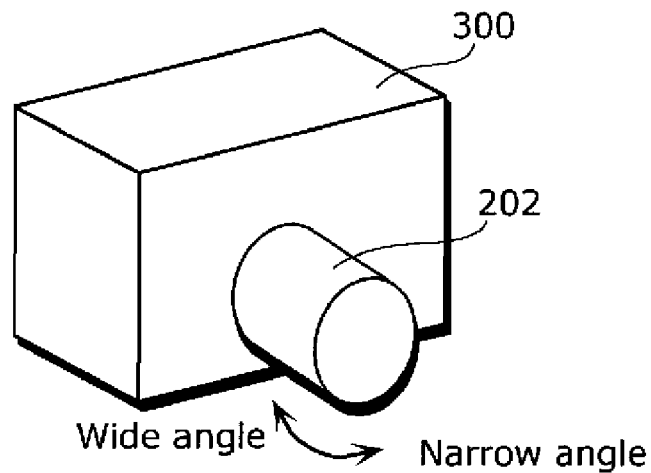
FIG. 24A shows a specific example of a zoom factor change operation by a photographer in the third embodiment of the present invention.
Figure 24B:
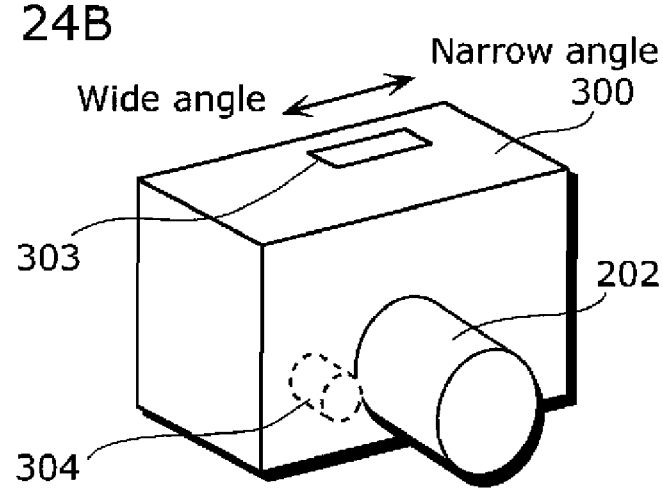
FIG. 24B shows another specific example of the zoom factor change operation by the photographer in the third embodiment of the present invention.
Figure 24C:
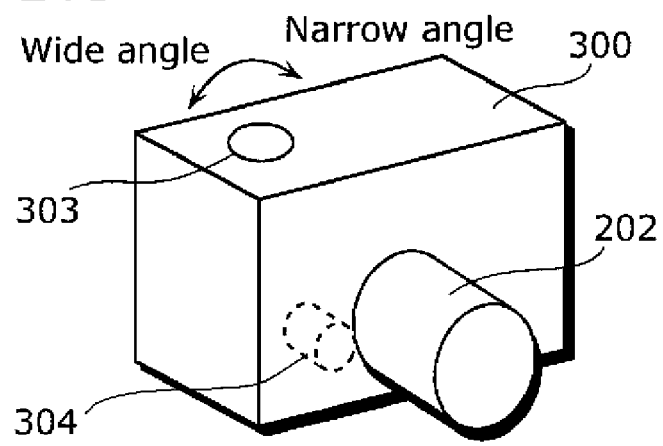
FIG. 24C shows another specific example of the zoom factor change operation by the photographer in the third embodiment of the present invention.

FIGS. 24A to 24C show examples of zoom factor change operations by the photographer 60.

For example, the photographer 60 directly rotates the focal length variable lens unit 202 in the image capturing apparatus 300, as shown in FIG. 24A. As a result, the focal length variable lens unit 202 moves back and forth with respect to the image sensor unit 103, which causes a change in focal length. Thus, the zoom factor corresponding to the rotation is obtained.

Alternatively, the image capturing apparatus 300 includes a motor 304 for rotating the focal length variable lens unit 202, and the zoom factor designation unit 301 includes a slider 303 operated by the photographer 60 for receiving designation of a zoom factor, as shown in FIG. 24B. In this case, the photographer 60 moves the slider 303 right and left.

The zoom factor designation unit 301 receives a zoom factor indicated by the movement of the slider 303, and outputs the photographer-designated zoom factor signal 306 showing the zoom factor to the focal length calculation unit 302. The focal length calculation unit 302 calculates a focal length corresponding to the photographer-designated zoom factor signal 306. The focal length control unit 209 rotates the focal length variable lens unit 202 by the motor 304 so that the focal length variable lens unit 202 has the calculated focal length. As a result, the focal length variable lens unit 202 moves back and forth with respect to the image sensor unit 103, which causes a change in focal length. Hence the zoom factor designated by the movement of the slider 303 is obtained.

Alternatively, the image capturing apparatus 300 includes the motor 304 for rotating the focal length variable lens unit 202, and the zoom factor designation unit 301 includes a dial 305 operated by the photographer 60 for receiving designation of a zoom factor, as shown in FIG. 24C. In this case, the photographer 60 turns the dial 305.

The zoom factor designation unit 301 receives a zoom factor indicated by the turn of the dial 305, and outputs the photographer-designated zoom factor signal 306 showing the zoom factor to the focal length calculation unit 302. The focal length calculation unit 302 calculates a focal length corresponding to the photographer-designated zoom factor signal 306. The focal length control unit 209 rotates the focal length variable lens unit 202 by the motor 304 so that the focal length variable lens unit 202 has the calculated focal length. As a result, the focal length variable lens unit 202 moves back and forth with respect to the image sensor unit 103, which causes a change in focal length. Hence the zoom factor designated by the turn of the dial 305 is obtained.

In this example, zoom factor $\alpha$ corresponding to focal length f is defined as shown by (Expression 3), where zoom factor $\alpha=1$ corresponding to minimum focal length fm. Zoom factor $\alpha$ increases as focal length f increases.

$$\alpha = \frac{f}{fm} \qquad \text{(Expression 3)}$$

The focal length calculation unit 302, upon obtaining the outer-frame area update signal 206, calculates the focal length of the focal length variable lens unit 202 according to the photographer-designated zoom factor signal 306 and the outer-frame area update signal 206, and outputs the focal length as the update focal length signal 208. As explained with reference to FIG. 7, the outer-frame area 161 is set outside the framing area 160 determined by the photographer 60. This being so, the angle of view of the focal length variable lens unit 202 is set so that the outer-frame area 161 is situated around the framing area 160. In other words, the focal length variable lens unit 202 is set at the angle of view which is wider by the outer-frame area 161 than the angle of view set by the photographer 60. When the zoom factor designated by the photographer-designated zoom factor signal 306 is denoted by α, (Expression 2) can be rewritten as (Expression 4).

$$f2 = \alpha \times f1 \frac{Wf2}{Wf1} \quad \text{(Expression 4)}$$

Zoom factor α assigns a weight to focal length f1, assign a weight to width Wf2 of the framing area 160, or assigns weights to both focal length f1 and width Wf2 of the framing area 160. In order to ensure the stationary object motion vector detection accuracy, however, it is desirable to widen the angle of view at time T2 to θ2 and capture more stationary objects by the image sensor unit 103, as explained with reference to FIG. 20. For this aim, the focal length at time T2 is maintained at f2. To apply zoom factor α as shown in (Expression 4) while maintaining focal length f2, width Wf2 of the framing area 160 needs to be multiplied by 1/α. When zoom factor α is larger than 1, the width of the framing area 160 is decreased to Wf2/α, to reflect the change of the angle of view by the photographer 60. When zoom factor α is smaller than 1, the width of the framing area 160 is increased to Wf2/α, to reflect the change of the angle of view by the photographer 60.

Which is to say, upon obtaining the outer-frame area update signal 206, the focal length calculation unit 302 calculates focal length f2 according to (Expression 2), regardless of zoom factor α shown by the photographer-designated zoom factor signal 306.

Thus, the focal length of the focal length variable lens unit 202 is set as indicated by the outer-frame area update signal 206, regardless of the change of zoom factor α by the photographer-designated zoom factor signal 306. In addition, in is the operation of (Expression 4), a weight of 1/α is assigned to width Wf2 of the framing area 160 indicated by the outer-frame area update signal 206.

As described above, according to the image capturing apparatus 300 in this embodiment, an unblurred image can be recorded even when capturing, for example, a sport scene in which a subject moves actively. In addition, even in the case where two or more players move in various directions at various speeds, the image capturing apparatus 300 can correct image blurring by detecting a camera movement from a stationary object in the outer-frame area 161. Since a tripod is not necessary for image capturing unlike the conventional techniques and also the angle of view can be changed by zoom, the subject can be captured from various angles and distances, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring. In particular, while accepting the change of the angle of view by the photographer's zoom operation, the image capturing apparatus 300 can adaptively change the size of the outer-frame area 161 necessary for stationary object detection to thereby detect a stationary object and correct image blurring with high accuracy. The angle of view decreases as the zoom factor increases, which causes an increase in the effect of the change of the camera posture on image blurring. However, the image capturing apparatus 300 adaptively controls the stationary object detection condition in accordance with the zoom factor. This enables image blurring correction to be performed accurately even when zoom is used.

(Variation)

A variation of the third embodiment is described below.

In the image capturing apparatus 300 in the third embodiment, the photographer-designated zoom factor signal 306 is reflected on the focal length variable lens unit 202 through the focal length calculation unit 302 and the focal length control unit 209, and the angle of view is changed by optical zoom, as shown in FIG. 23. On the other hand, an image capturing apparatus in this variation changes the angle of view by digital zoom.

Figure 25:
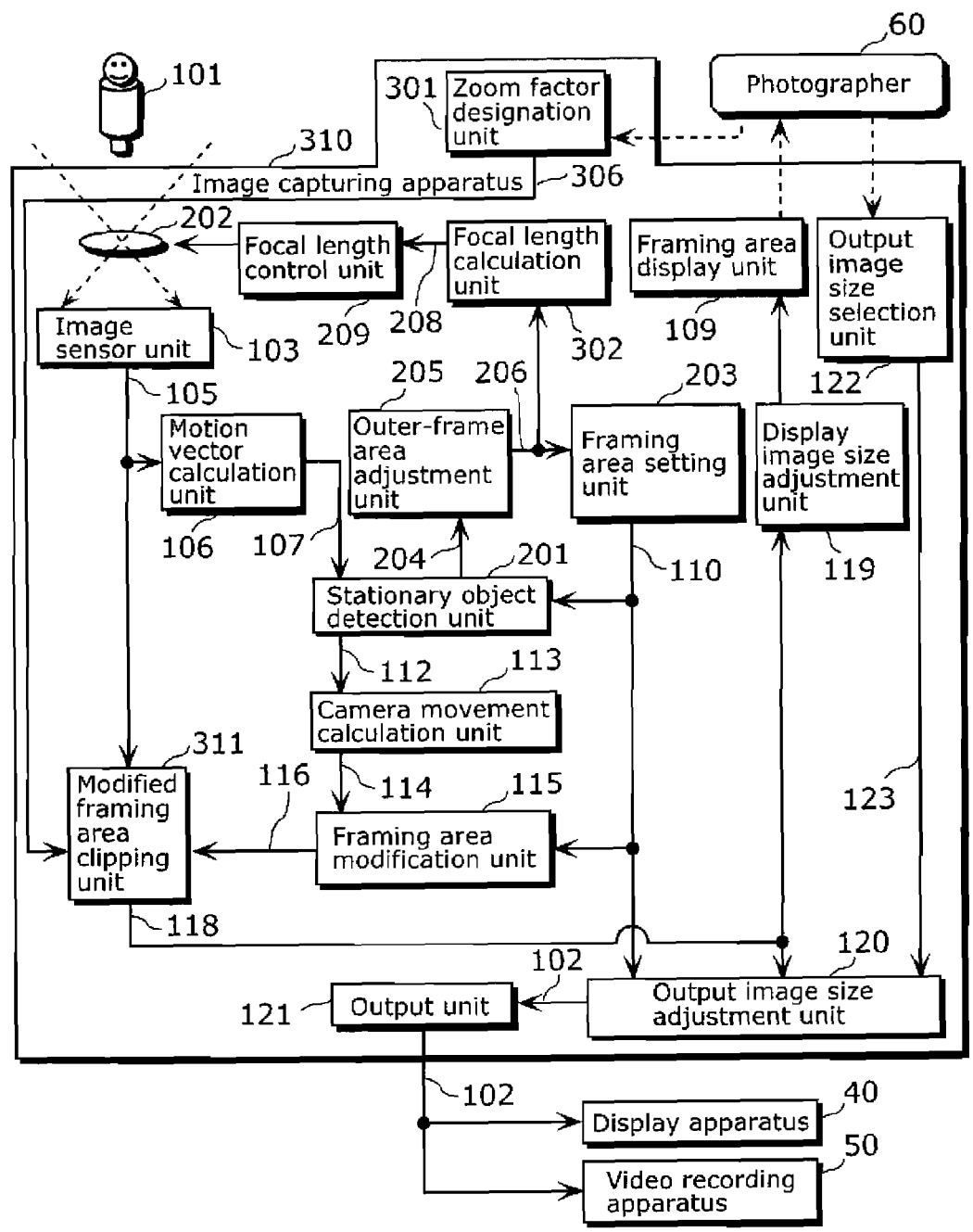
FIG. 25 is a block diagram showing a structure of an image capturing apparatus in a variation of the third embodiment of the present invention.

FIG. 25 is a block diagram showing a structure of the image capturing apparatus in this variation.

An image capturing apparatus 310 in this variation receives designation of a zoom factor according to an operation by the photographer 60, and outputs the photographer-designated zoom factor signal 306 showing the designated zoom factor to a modified framing area clipping unit 311. Note that, in this variation too, the zoom factor is designated by the photographer's operation such as those shown in FIGS. 24A to 24C.

The modified framing area clipping unit 311, upon obtaining the photographer-designated zoom factor signal 306, magnifies or reduces the modified framing area 160 shown by the modified framing area signal 116, by the zoom factor shown by the photographer-designated zoom factor signal 306. The modified framing area clipping unit 311 then clips the magnified or reduced framing area 160 out of the input image 105, and outputs the clipped image as the blurring-corrected framing image 118.

That is, the image capturing apparatuses 300 and 310 in this embodiment and its variation include the zoom factor designation unit 301 which is a zoom adjustment unit that zooms in or out the image outputted by the output unit 121, by changing an angle of view of the image captured by the image sensor unit 103 or a size of the framing area 160 according to an operation by a user.

According to this variation, the angle of view can be changed by an operation of the photographer 60 in the same way as in the third embodiment.

Fourth Embodiment

An image capturing apparatus in this embodiment captures an image with a wider angle of view than an angle of view set by a photographer, and corrects image blurring when clipping an output image to be outputted from the image capturing apparatus out of the captured image, as with the image capturing apparatus in the third embodiment. The image capturing apparatus in this embodiment has the features of the image capturing apparatus in the third embodiment, and is also characterized in that the framing area 160 and the outer-frame area 161 are managed independently of each other. In detail, the framing area 160 is determined by an angle of view designated by the photographer, whereas the outer-frame area 161 is determined by stationary object motion vector detection accuracy. Since the size of the outer-frame area 161 is controlled only on the basis of the stationary object motion vector detection accuracy irrespective of the size of the framing area 160, image blurring can be corrected accurately regardless of the zoom factor.

Figure 26:
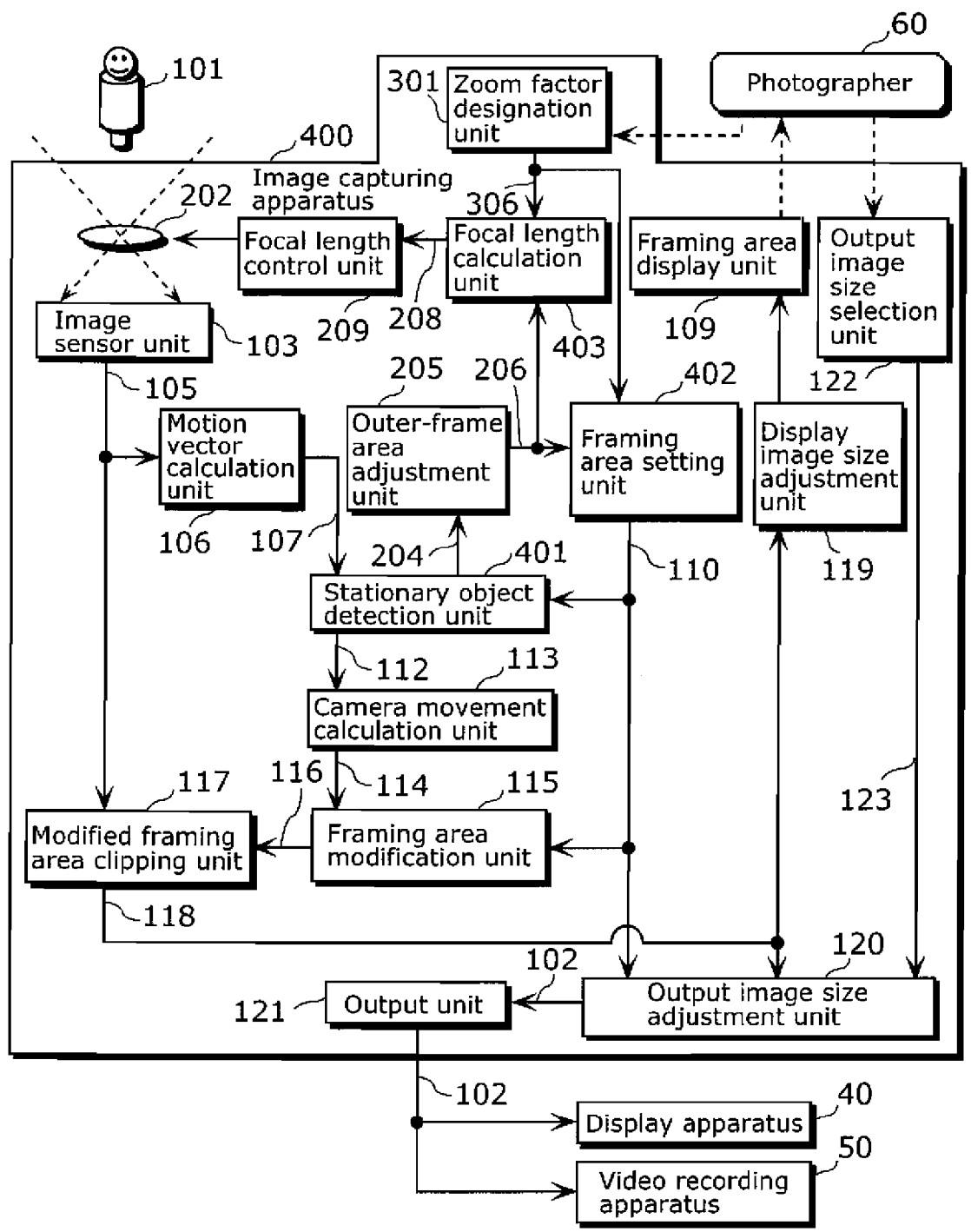
FIG. 26 is a block diagram showing a structure of an image capturing apparatus in a fourth embodiment of the present invention.

FIG. 26 is a block diagram showing a structure of an image capturing apparatus 400 in the fourth embodiment of the present invention. Components which are the same as those in the image capturing apparatus 300 shown in FIG. 23 have been given the same reference numerals, and their detailed explanation has been omitted.

The image capturing apparatus 400 in this embodiment is an apparatus that captures the image of the subject 101 and outputs the output image 102 to the display apparatus 40 and the video recording apparatus 50, and includes the image sensor unit 103, the motion vector calculation unit 106, the framing area display unit 109, the camera movement calculation unit 113, the framing area modification unit 115, the modified framing area clipping unit 117, the display image size adjustment unit 119, the output image size adjustment unit 120, the output unit 121, the output image size selection unit 122, the focal length variable lens unit 202, the outer-frame area adjustment unit 205, the focal length control unit 209, the zoom factor designation unit 301, a stationary object detection unit 401, a framing area setting unit 402, and a focal length calculation unit 403.

For example, the output image 102 is displayed on the display apparatus 40 connected to the image capturing apparatus 400 so as to include the image of the subject 101, or recorded to the video recording apparatus 50 connected to the image capturing apparatus 400.

The zoom factor designation unit 301 receives designation of a zoom factor according to an operation by the photographer 60, and outputs the photographer-designated zoom factor signal 306 showing the designated zoom factor to the focal length calculation unit 302 or the framing area setting unit 402.

When the photographer-designated zoom factor signal 306 is outputted to the focal length calculation unit 302, the focal length is changed and the zoom factor is optically adjusted, as in the case shown in FIG. 23 in the third embodiment. When the photographer-designated zoom factor signal 306 is outputted to the framing area setting unit 402, on the other hand, the framing area setting unit 402 adjusts the framing area 160 to a size corresponding to the zoom factor shown by the photographer-designated zoom factor signal 306. In other words, the zoom factor is adjusted by digital processing.

The stationary object detection unit 401 detects stationary object motion vectors in the outer-frame area 161 determined by the initial setting, for the first frame of the input image 105. The outer-frame area 161 of the initial setting is written in a memory internal to the stationary object detection unit 401 beforehand, and read from the memory when the image capturing apparatus 400 is started. After the first frame is processed using the outer-frame area of the initial setting, the size of the outer-frame area 161 is adjusted for the second frame which follows the first frame, in accordance with stationary object motion vector detection accuracy evaluation in the outer-frame area adjustment unit 205.

In more detail, when the stationary object motion vector detection accuracy is lower than outer-frame area change threshold tr, the stationary object detection unit 401 widens the outer-frame area to increase the detection accuracy, as shown in the example of FIG. 19. When the stationary object motion vector detection accuracy is higher than outer-frame area change threshold tr, the detection accuracy is sufficient, so that the stationary object detection unit 401 may narrow the outer-frame area 161 to reduce the processing load as shown in the example of FIG. 19, or may not change the outer-frame area 161.

It should be noted here that the outer-frame area adjusted by the stationary object detection unit 401 and the outer-frame area adjusted by the outer-frame area adjustment unit 205 always match each other.

The framing area setting unit 402 sets, as the framing area 160, a range of an image that corresponds to the angle of view designated by the photographer 60 and is to be displayed by the framing area display unit 109 or the display apparatus 40, as explained with reference to FIG. 7. Coordinate information of the framing area 160 is inputted to the framing area modification unit 115 as the framing area setting signal 110, and the framing area 160 is clipped out of the input image 105. At the time of this clipping, the clipping position is modified by a motion vector which has an opposite direction to and a same length as a motion vector shown by the camera movement signal 114, to compensate for image blurring.

Upon obtaining the outer-frame area update signal 206 from the outer-frame area adjustment unit 205, the framing area setting unit 402 magnifies or reduces the framing area 160 in accordance with the update of the outer-frame area 161 shown by the outer-frame area update signal 206. In the case where the focal length changes as a result of updating the outer-frame area 161, if the framing area 160 remains unchanged, the angle of view of the image displayed to the photographer 60 or the recorded image increases or decreases. To prevent this, upon receiving the outer-frame area update signal 206, the framing area setting unit 402 adjusts the framing area 160 so that the angle of view of the displayed or recorded image does not vary.

Figure 27:
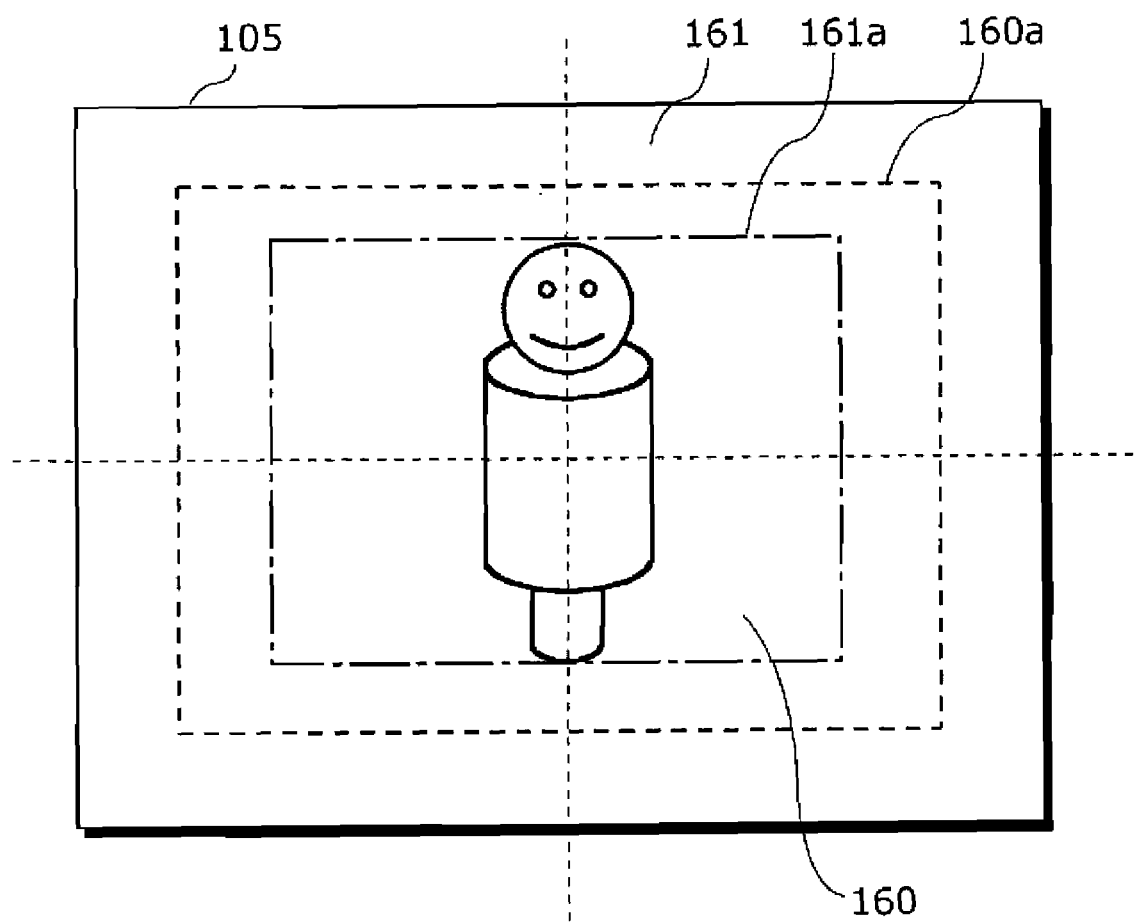
FIG. 27 shows an independent relation between a framing area and an outer-frame area in the fourth embodiment of the present invention.

FIG. 27 shows an independent relation between the framing area 160 and the outer-frame area 161.

The framing area setting unit 402 sets an area enclosed by a dotted-line box 160$a$ shown in FIG. 27, as the framing area 160. Meanwhile, the stationary object detection unit 401 and the outer-frame area adjustment unit 205 set an area sandwiched between a dashed-dotted line box 161$a$ and an outer periphery of the input image 105, as the outer-frame area 161. Thus, the framing area 160 and the outer-frame area 161 do not have a complementary relation, partially overlap each other, and are adjusted independently of each other.

As described above, in the image capturing apparatus 400, the framing area and the outer-frame area are controlled separately and do not relate to each other. Therefore, the positional relation shown in FIG. 7 where the framing area 160 and the outer-frame area 161 are in contact with each other without any overlap is merely one example, as the framing area 160 and the outer-frame area 161 may overlap each other as shown in FIG. 27, or may be separate from each other.

The focal length calculation unit 403 changes the size of the outer-frame area 161 at time T1 according to the outer-frame area update signal 206, and outputs focal length f2 of the focal length variable lens unit 202 at time T2 as the update focal length signal 208. As one example, the size of the outer-frame area 161 is expressed by a width as shown in FIG. 20, and the change of the width of the outer-frame area 161 is designated by outer-frame area change rate c defined according to (Expression 1). In this case, focal length f2 of the focal length variable lens unit 202 at time T2 indicates that width Wf1 of the outer-frame area at time T1 is changed to Wf1/c at time T2. When outer-frame area change rate c is smaller than 1, the width of the outer-frame area 161 increases, and the focal length of the focal length variable lens unit 202 decreases to enable wide-angle image capturing. The relation between the width of the outer-frame area 161 and the focal length is the same as the one shown in FIG. 20, where focal length f1 at time T1 is changed to focal length f2 at time T2 according to (Expression 2).

When the framing area 160 and the outer-frame area 161 are managed independently of each other, a contradiction can arise between movements of the framing area 160 and the outer-frame area 161. Because the focal length of the focal length variable lens unit 202 is determined by the stationary object motion vector detection accuracy in the outer-frame area 161, the angle of view captured by the image sensor unit 103 is controlled according to the outer-frame area 161. On the other hand, the framing area 160 is determined on the basis of the zoom factor (digital zoom) designated by the photographer 60, and so there is a possibility that an angle of view (framing area 160) which exceeds the input image 105 is designated. When the designated angle of view (framing area 160) exceeds the input image 105, a priority is given to ensure the designated framing area 160 while shortening the focal length of the focal length variable lens unit 202, so that wide-angle image capturing is performed. As explained with reference to FIGS. 8A and 8B, when the angle of view increases, there is a greater chance of capturing an image of a stationary object which is in contact with a same surface as the photographer 60. Accordingly, the stationary object motion vector detection accuracy in the outer-frame area 161 is enhanced in most cases. At least there is no drop in detection accuracy. Hence the focal length control of the focal length variable lens unit 202 that prioritizes the ensurance of the framing area 160 has no adverse effect on stationary object motion vector detection.

It should be noted however that, since the focal length of the focal length variable lens unit 202 cannot fall below-minimum focal length fm, the zoom factor that can be designated by the photographer 60 is limited by minimum focal length fm of the focal length variable lens unit 202. For instance, when the maximum focal length and minimum focal length of the focal length variable lens unit 202 are respectively 192 mm and 24 mm, the maximum zoom factor is 8 times (=192/24).

As described above, according to the image capturing apparatus 400 in this embodiment, an unblurred image can be recorded even when capturing, for example, a sport scene in which a subject moves actively. In addition, even in the case where two or more players move in various directions at various speeds, the image capturing apparatus 400 can correct image blurring caused by a camera movement, by detecting the camera movement from a stationary object in the outer-frame area 161. Since a tripod is not necessary for image capturing unlike the conventional techniques and also the angle of view can be changed by zoom, the subject can be captured from various angles and distances, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring.

In particular, while accepting the change of the angle of view by the photographer's zoom operation, the image capturing apparatus 400 can adaptively change the size of the outer-frame area 161 necessary for stationary object detection to thereby detect a stationary object and correct image blurring with high accuracy. The angle of view decreases as the zoom factor increases, which causes an increase in the effect of the change of the camera posture on image blurring. However, the image capturing apparatus 400 adaptively controls the stationary object detection condition in accordance with the zoom factor. This enables image blurring correction to be performed accurately even when zoom is used. Furthermore, the framing area 160 and the outer-frame area 161 are managed independently of each other. This prevents the framing area 160 from becoming excessively small, with it being possible to ensure the high-resolution image quality of the framing area 160 displayed on the display screen.

Fifth Embodiment

An image capturing apparatus in this embodiment captures an image with a larger angle of view than an angle of view set by a photographer, and corrects image blurring when clipping an output image to be outputted from the image capturing apparatus out of the captured image, as with the image capturing apparatus in the first embodiment. The image capturing apparatus in this embodiment has the features of the image capturing apparatus in the first embodiment, and is also characterized in that an operation load can be reduced by performing motion vector calculation only in the outer-frame area.

Figure 28:
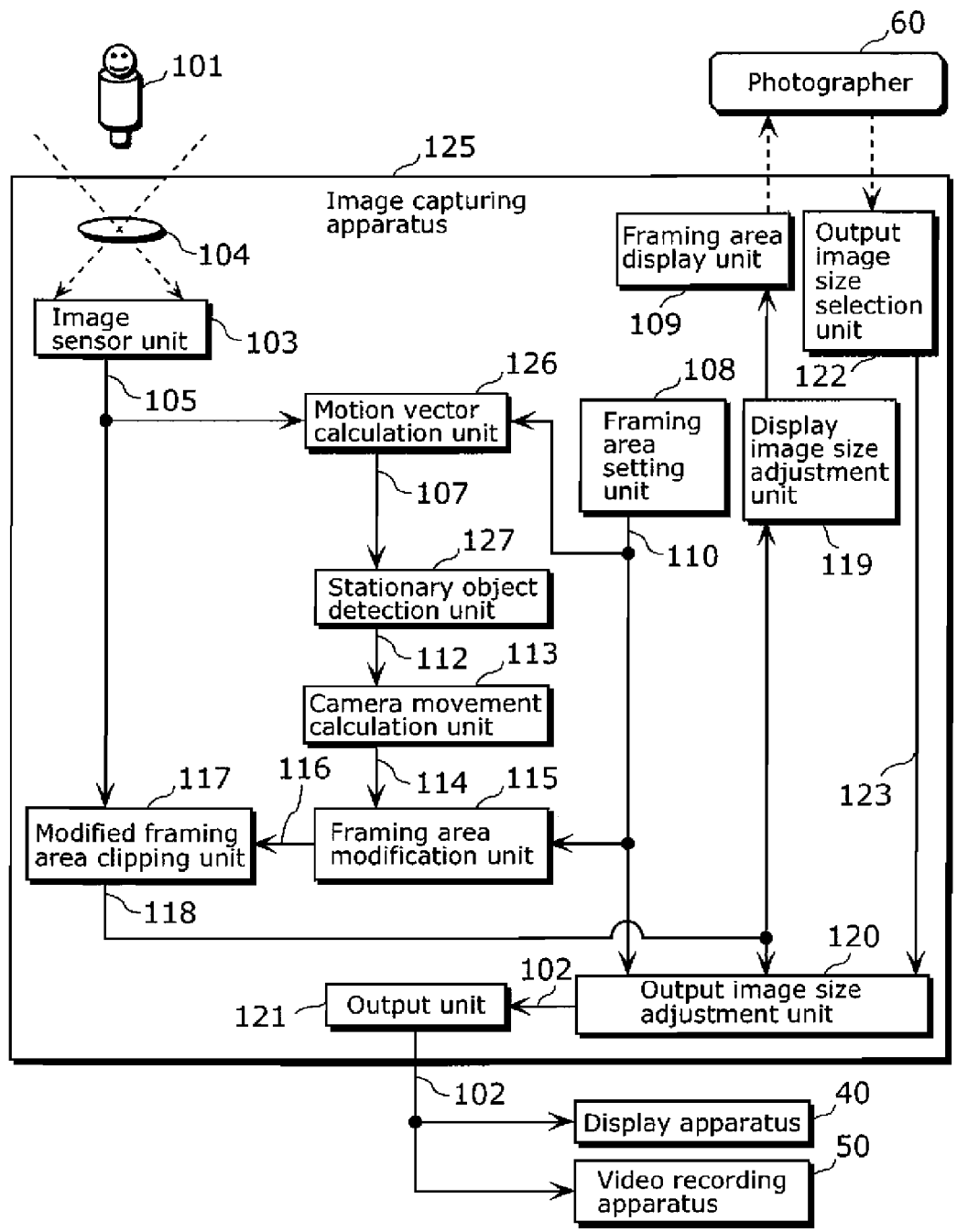
FIG. 28 is a block diagram showing a structure of an image capturing apparatus in a fifth embodiment of the present invention.

FIG. 28 is a block diagram showing a structure of an image capturing apparatus 125 in the fifth embodiment of the present invention. Components which are the same as those in the image capturing apparatus 100 shown in FIG. 5 have been given the same reference numerals and their detailed explanation has been omitted.

The image capturing apparatus 125 in this embodiment is an apparatus that captures the image of the subject 101 and outputs the output image 102 to the display apparatus 40 and the video recording apparatus 50, and includes the image sensor unit 103, the focal length fixed lens system 104, a motion vector calculation unit 126, the framing area setting unit 108, the framing area display unit 109, a stationary object detection unit 127, the camera movement calculation unit 113, the framing area modification unit 115, the modified framing area clipping unit 117, the display image size adjustment unit 119, the output image size adjustment unit 120, the output unit 121, and the output image size selection unit 122.

For example, the output image 102 is displayed on the display apparatus 40 connected to the image capturing apparatus 125 so as to include the image of the subject 101, or recorded to the video recording apparatus 50 connected to the image capturing apparatus 125.

The motion vector calculation unit 126 specifies the outer-frame area 161 shown in FIG. 7 on the basis of the framing area setting signal 110 outputted from the framing area setting unit 108, and calculates motion vectors using only the outer-frame area 161. This makes it unnecessary to calculate motion vectors in the framing area 160, which contributes to a significant reduction in processing load. The stationary object detection unit 127 does not need to identify the outer-frame area 161, and subjects all motion vector signals 107 outputted from the motion vector calculation unit 126 to processing.

As described above, according to the image capturing apparatus 125 in this embodiment, an unblurred image can be recorded even when capturing, for example, a sport scene in which a subject moves actively. In addition, the amount of operation for motion vector calculation can be reduced, with it being possible to reduce a time from the obtainment of the input image 105 to the output of the output image 102. This contributes to faster image capturing. Faster image capturing means more chances of image capturing, so that the number of opportunities of stationary object detection increases. This leads to higher accuracy of camera movement detection, which in turn favorably benefits image blurring correction.

Sixth Embodiment

An image capturing and recording/reproduction apparatus in this embodiment captures an image with a larger angle of view than an angle of view set by a photographer, records the captured image on a recording medium, and corrects image blurring when reading the captured image and a framing area from the recording medium and clipping an image to be reproduced out of the captured image.

Figure 29:
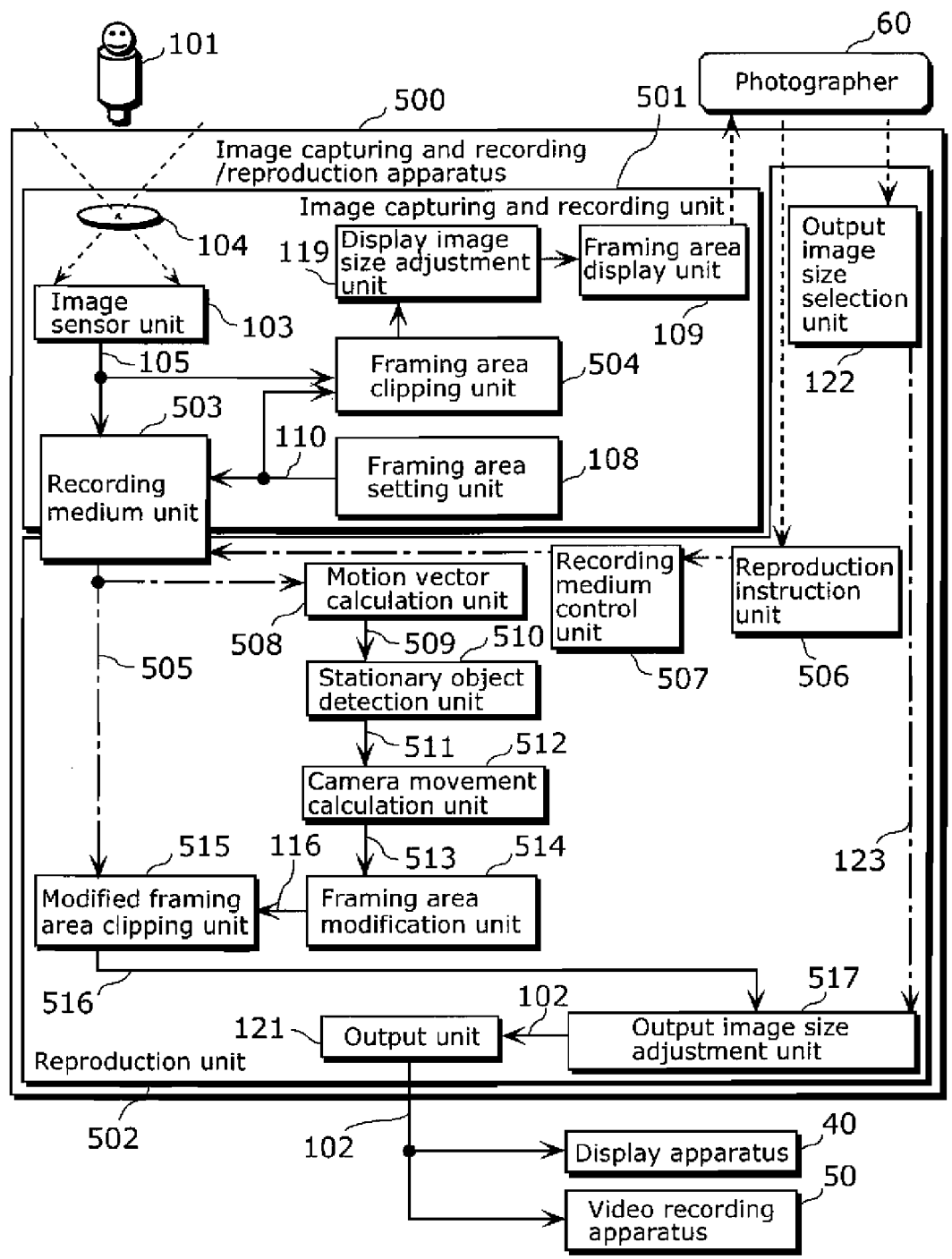
FIG. 29 is a block diagram showing a structure of an image capturing and recording/reproduction apparatus in a sixth embodiment of the present invention.

FIG. 29 is a block diagram showing a structure of an image capturing and recording/reproduction apparatus 500 in the sixth embodiment of the present invention. Components which are the same as those in the image capturing apparatus 100 shown in FIG. 5 have been given the same reference numerals and their detailed explanation has been omitted.

The image capturing and recording/reproduction apparatus 500 in this embodiment includes an image capturing and recording unit 501 that captures the image of the subject 101 and records the image in a recording medium unit 503, and a reproduction unit 502 that reproduces the image recorded in the recording medium unit 503 and outputs the output image 102.

The image capturing and recording unit 501 includes the image sensor unit 103, the focal length fixed lens system 104, the framing area setting unit 108, the framing area display unit 109, the display image size adjustment unit 119, the recording medium unit 503, and a framing area clipping unit 504. The reproduction unit 502 includes the recording medium unit 503, a motion vector calculation unit 508, a stationary object detection unit 510, a camera movement calculation unit 512, a framing area modification unit 514, a modified framing area clipping unit 515, an output image size adjustment unit 517, the output unit 121, and the output image size selection unit 122.

For example, the output image 102 is displayed on the display apparatus 40 connected to the image capturing and recording/reproduction apparatus 500 so as to include the image of the subject 101, or recorded to the video recording apparatus 50 connected to the image capturing and recording/reproduction apparatus 500.

The photographer 60 starts the image capturing and recording unit 501 and captures the image of the subject 101. As a result, the input image 105 is recorded in the recording medium unit 503. After the image capturing ends, the photographer 60 starts the reproduction unit 502, and reproduces the input image 105 recorded in the recording medium unit 503. At this time, the modified framing area clipping unit 117 corrects image blurring of the input image 105, and the resulting output image 102 is outputted from the output unit 121.

The recording medium unit 503 is a removable medium that can be inserted in and removed from the image capturing and recording unit 501 and the reproduction unit 502. The recording medium unit 503 is inserted in the image capturing and recording unit 501 at the time of image capturing of the subject 101, and inserted in the reproduction unit 502 at the time of reproduction. This being so, the image capturing and recording unit 501 and the reproduction unit 502 do not need to be provided in a same enclosure, and may be physically separate from each other as different appliances. Conversely, the image capturing and recording unit 501 and the reproduction unit 502 may be provided in a same enclosure to form a single appliance as the so-called camcorder (a combined camera and video recorder). Furthermore, the recording medium unit 503 may be included in the image capturing and recording/reproduction apparatus 500 so as to be used commonly by the image capturing and recording unit 501 and the reproduction unit 502. In this case, the output image 102 is archived in the external video recording apparatus 50. When the storage amount of the internal recording medium unit 503 reaches an upper limit, image data is deleted or overwritten.

The recording medium unit 503 stores the input image 105 and the framing area setting signal 110. The framing area setting signal 110 is the coordinate information of the framing area 160 explained with reference to FIG. 7, and is used when clipping the framing area out of the input image 105 at the time of reproduction. The input image 105 and the framing area setting signal 110 are outputted from the recording medium unit 503 as a reproduction image signal 505. In this embodiment, the coordinate information of the framing area is fixed, and repeatedly put to use for each frame. Accordingly, the framing area setting signal 110 is supplied to the reproduction unit 502 in a state of, for example, being written in a header unit of the reproduction image signal 505.

That is, the image capturing and recording/reproduction apparatus 500 in this embodiment includes the recording medium unit 503 which is a storage unit in which the image captured by the image sensor unit 103 is stored, and the output unit 121, the motion vector calculation unit 508, and the stationary object detection unit 510 each read the image stored in the storage unit and process the read image.

Figure 30:
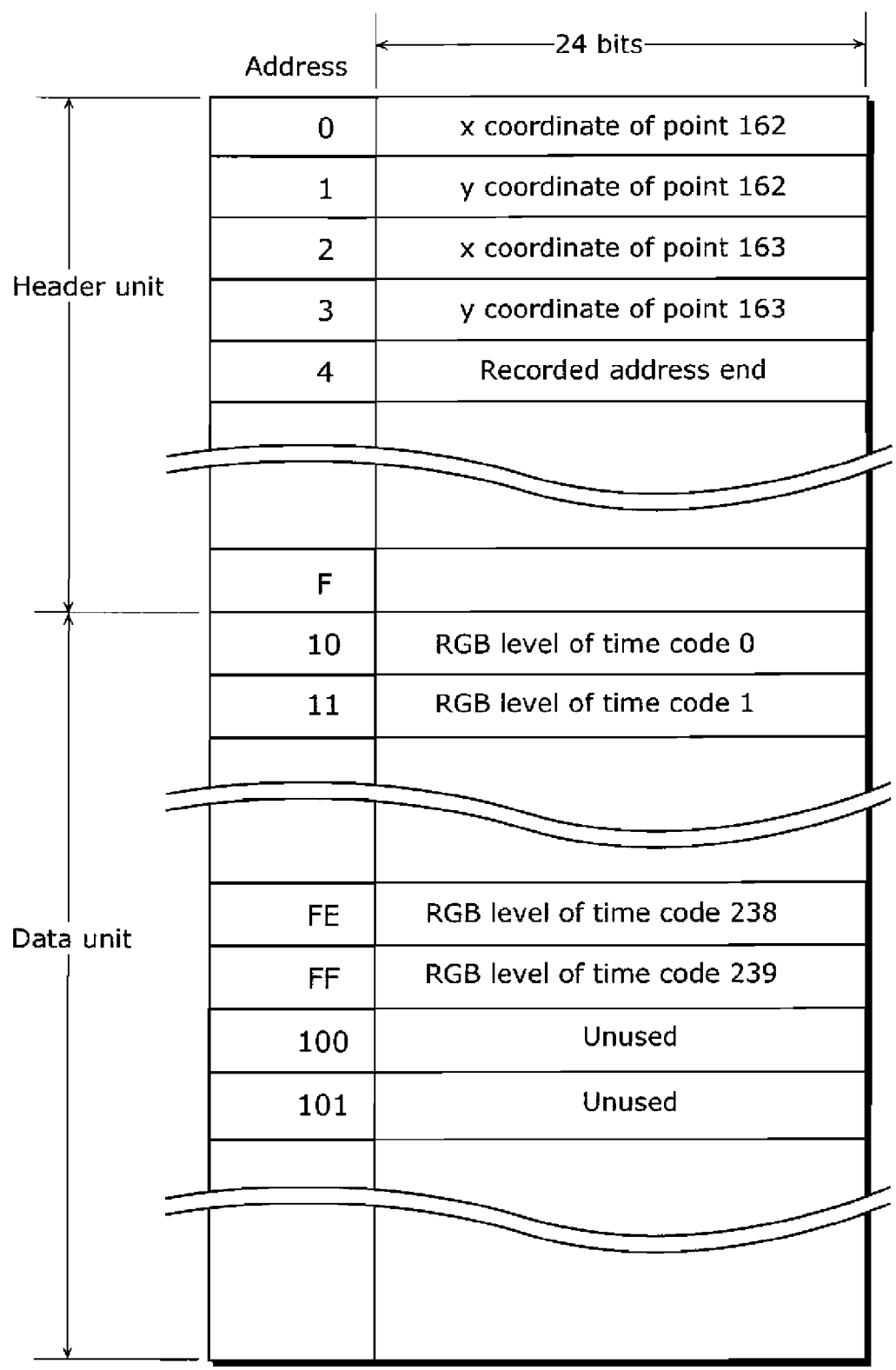
FIG. 30 shows an example of a data structure of a recording medium unit in the sixth embodiment of the present invention.

FIG. 30 shows an example of a data structure of the recording medium unit 503.

In memory addresses expressed in hexadecimal, address 0 to address F constitute a header unit. The x and y coordinates of the point 162 and the x and y coordinates of the point 163 which show the spatial position of the framing area 160 as explained with reference to in FIG. 7 are respectively recorded in address 0, address 1, address 2, and address 3. Addresses from address 10 onward constitute a data unit, where RGB levels of the input image 105 are recorded. In detail, each of R, G, and B is set at 8 bits, and these are recorded in a 24-bit width per address.

A time code showing a time position in a video sequence corresponds to an address, such that a frame image of time code 0 is recorded in address 10 and a frame image of time code 1 is recorded in address 11. When recording the input image 105 to the recording medium unit 503, the image capturing and recording unit 501 designates a recording position by an address. In the case of additional recording, the image capturing and recording unit 501 designates an address following an end of recorded addresses. The end of recorded addresses is written in address 4 in the header unit. In the example of FIG. 30, address 10 to address FF have already been recorded. Accordingly, RGB levels of the input image 105 are additionally recorded from address 100. After the additional recording ends, address 4 is updated by writing an address in which the input image 105 was last recorded.

The framing area clipping unit 504 clips the image of the framing area 160 out of the input image 105, according to the framing area setting signal 110. The size of the clipped image of the framing area 160 is converted by the display image size adjustment unit 119 to match the display image size of the framing area display unit 109, and the converted image is displayed by the framing area display unit 109. The photographer 60 can visually check the image capturing angle of view, by viewing the image displayed by the framing area display unit 109.

The image capturing and recording unit 501 does not have an image blurring correction function. In this embodiment, the image blurring correction function is provided in the reproduction unit 502. The purpose of this structure is to divide the "image capturing and recording" function and the "reproduction" function and narrow down to essential components for the respective functions, thereby achieving reductions in size, weight, power consumption, and cost of the appliance. Image blurring correction is not essential at the time of image capturing and recording, and only needs to be completed before the captured image is reproduced and displayed on the display screen. For reinforcing the fundamental function of image capturing, the foremost priority is to improve the performance of an image capturing optical system and an image sensor, and also a recording time length, image capturing (framing) ease, and the like are important.

It would be ideal if the captured image displayed by the framing area display unit 109 has been blurring-corrected, given that the image is eventually checked as an image displayed on the display screen. However, the prime concern of the photographer 60 is a composition (framing) of clipping the captured image out of the scene in front of the photographer 60, and gives a higher priority to capture the subject 101 within the image capturing angle of view as intended by the photographer 60. Besides, since the photographer 60 captures the image by holding the image capturing and recording/reproduction apparatus 500 by hand, the hand movement and the optic nerve interact with each other according to the human body's ability, and therefore image blurring is corrected to a certain extent by the optic nerve. This can be understood from an ordinary experience that one can easily read text of mail on a mobile phone held by hand while walking.

On the other hand, when a blurred image is displayed on the display apparatus 40 that does not operate in conjunction with the movement of the photographer 60, such blurring causes annoyance and discomfort. This is because, despite the photographer 60 being stationary without movement, a stationary object that is supposed to be unmoved in the output image 102 has a movement as image blurring. The same applies to the case where the photographer 60 is moving. Because a movement of the photographer 60 at the time of viewing the display apparatus 40 is not in agreement with a movement of the photographer 60 at the time of image capturing which appears in the output image 102 as image blurring, annoyance and discomfort arise. As explained with reference to FIG. 9, in the case where a person who is viewing an image displayed on the display apparatus is stationary, annoyance and discomfort due to image blurring arise when a stationary object which is in contact with a same surface, such as a land surface or a wall, as the photographer 60 is not stationary in the displayed image. In other words, annoyance and discomfort due to image blurring arise when the movement of the person who is viewing the image displayed on the display apparatus is not in agreement with the movement of the stationary object in contact with the same land surface or wall as the photographer 60 in the displayed image.

The reproduction unit 502 operates according to a reproduction instruction which is issued to the reproduction instruction unit 506 by the photographer 60. Upon receiving the reproduction instruction from the reproduction instruction unit 506, the recording medium control unit 507 causes the motion vector calculation unit 508 and the modified framing area clipping unit 515 to read the reproduction image signal 505 from the recording medium unit 503. In the reproduction unit 502, a signal indicated by a dashed-dotted line corresponds to an operation according to the reproduction instruction by the photographer 60, and the reproduction image signal 505 is outputted from the recording medium unit 503 according to the reproduction instruction from the reproduction instruction unit 506. This operation is separated from the image capturing and recording unit 501. To show this independence, each signal synchronous with the reproduction instruction is indicated by a dashed-dotted line in FIG. 29. The output image size selection signal 123 described later is a signal according to the reproduction instruction, too.

The motion vector calculation unit 508 extracts the input image 105 from the reproduction image signal 505, and calculates movements of feature points in the input image 105 as motion vectors. The motion vector calculation unit 508 outputs the calculated motion vectors and the framing area setting signal 110 included in the reproduction image signal 505, as a framing-area-added motion vector signal 509.

The stationary object detection unit 510 extracts the coordinate information of the framing area from the framing-area-added motion vector signal 509, and sets the outer-frame area 161 as explained with reference to FIG. 7. The stationary object detection unit 510 also extracts motion vectors included in the outer-frame area 161 from the framing-area-added motion vector signal 509, to detect stationary object motion vectors. The stationary object detection unit 510 outputs the detected stationary object motion vectors and the framing area setting signal 110 included in the framing-area-added motion vector signal 509, as a framing-area-added stationary object motion vector signal 511.

The camera movement calculation unit 512 extracts the stationary object motion vectors from the framing-area-added stationary object motion vector signal 511, and calculates a camera movement. The camera movement calculation unit 512 outputs the calculated camera movement and the framing area setting signal 110 included in the framing-area-added stationary object motion vector signal 511, as a framing-area-added camera movement signal 513.

The framing area modification unit 514 extracts the coordinate information of the framing area from the framing-area-added camera movement signal 513, and sets the framing area 160 as explained with reference to FIG. 7. The framing area modification unit 514 also extracts the camera movement from the framing-area-added camera movement signal 513, and modifies the framing area to a position that compensates for image blurring, by moving the framing area in an opposite direction to and by a same magnitude as the camera movement. Positional information of the modified framing area is outputted as the modified framing area signal 116.

The modified framing area clipping unit 515 extracts the input image 105 from the reproduction image signal 505, and clips the blurring-corrected framing area shown by the modified framing area signal 116 to generate a blurring-corrected framing image. The modified framing area clipping unit 515 outputs the blurring-corrected framing image and the framing area setting signal 110 included in the reproduction image signal 505, as a framing-area-added blurring-corrected framing image 516.

The output image size adjustment unit 517 extracts the blurring-corrected framing image from the framing-area-added blurring-corrected framing image 516. The output image size adjustment unit 517 also extracts the framing area setting signal 110 from the framing-area-added blurring-corrected framing image 516, and detects the number of horizontal pixels and the number of lines of the framing area 160. The number of horizontal pixels and the number of lines of the framing area 160 match the number of horizontal pixels and the number of lines of the blurring-corrected framing image. Meanwhile, the output image size selection signal 123 shows the number of horizontal pixels and the number of lines of the output image 102. The output image size adjustment unit 517 compares the number of horizontal pixels and the number of lines of the blurring-corrected framing image with the number of horizontal pixels and the number of lines of the output image 102, and adjusts the size of the blurring-corrected framing image to the size of the output image 102 by an image magnification process or an image reduction process, to obtain the output image 102.

Though the photographer 60 makes the reproduction instruction in the example of FIG. 29, the photographer and the person who makes the reproduction instruction need not be the same, and the reproduction instruction may be made by another person.

As described above, according to the image capturing and recording/reproduction apparatus 500 in this embodiment, the image capturing and recording function and the image blurring correction function can be separated from each other. This allows the image capturing and recording unit 501 to be made slimmer, with it being possible to achieve reductions in size, weight, power consumption, and cost of the appliance. The smaller and lighter appliance is suitable for capturing, for example, an image of a sport scene in which a subject moves actively. Moreover, the lower-power appliance has an advantage of a longer image capturing period, and is convenient for outdoor image capturing using a battery. In image blurring correction by the reproduction unit 502, a camera movement is detected from a stationary object in the outer-frame area. Accordingly, image blurring can be corrected even in the case where two or more players move in various directions at various speeds. Therefore, the subject can be captured from various angles and distances without using a tripod, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring.

Seventh Embodiment

An image capturing and recording/reproduction apparatus in this embodiment captures an image with a larger angle of view than an angle of view set by a photographer, records the captured image on a recording medium, and corrects image blurring when reading the captured image and a framing area from the recording medium and clipping an image to be reproduced out of the captured image, as with the image capturing and recording/reproduction apparatus in the sixth embodiment. The image capturing and recording/reproduction apparatus in this embodiment has the features of the image capturing and recording/reproduction apparatus in the sixth embodiment, and is also characterized in that the photographer can change a zoom factor to thereby change an angle of view.

Figure 31:
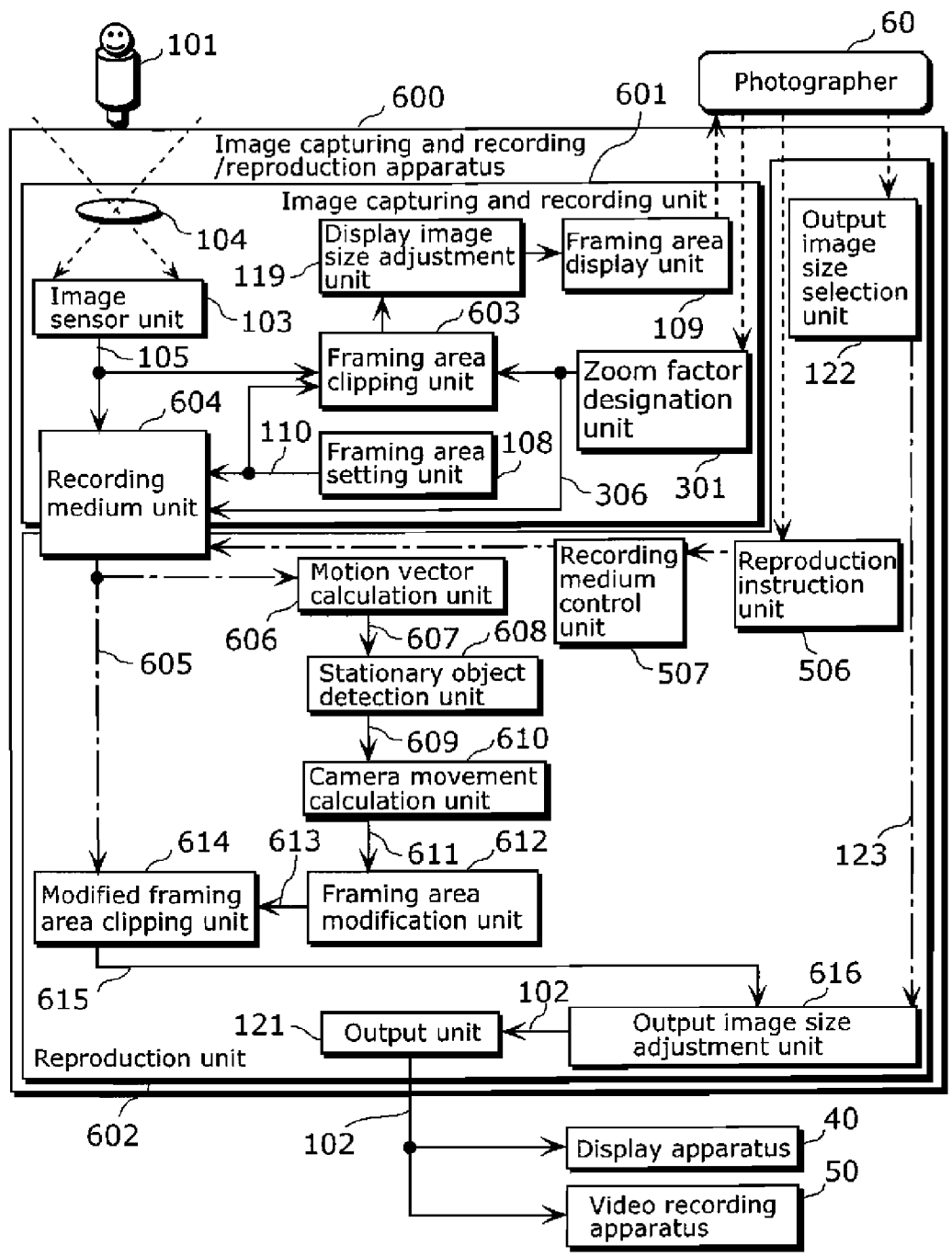
FIG. 31 is a block diagram showing a structure of an image capturing and recording/reproduction apparatus in a seventh embodiment of the present invention.

FIG. 31 is a block diagram showing a structure of an image capturing and recording/reproduction apparatus 600 in the seventh embodiment of the present invention. Components which are the same as those in the image capturing and recording/reproduction apparatus 500 shown in FIG. 9 have been given the same reference numerals and their detailed explanation has been omitted.

The image capturing and recording/reproduction apparatus 600 in this embodiment includes an image capturing and recording unit 601 that captures the image of the subject 101 and records the image in a recording medium unit 604, and a reproduction unit 602 that reproduces the image recorded in the recording medium unit 604 and outputs the output image 102.

The image capturing and recording unit 601 includes the image sensor unit 103, the focal length fixed lens system 104, the framing area setting unit 108, the framing area display unit 109, the display image size adjustment unit 119, a framing area clipping unit 603, the recording medium unit 604, and the zoom factor designation unit 301. The reproduction unit 602 includes the recording medium unit 604, the motion vector calculation unit 508, the stationary object detection unit 510, the camera movement calculation unit 512, the framing area modification unit 514, the modified framing area clipping unit 515, the output image size adjustment unit 517, the output unit 121, and the output image size selection unit 122.

For example, the output image 102 is displayed on the display apparatus 40 connected to the image capturing and recording/reproduction apparatus 600 so as to include the image of the subject 101, or recorded to the video recording apparatus 50 connected to the image capturing and recording/reproduction apparatus 600.

The zoom factor designation unit 301 allows the photographer 60 to adjust the zoom factor. The photographer 60 can widen or narrow the angle of view by changing the zoom factor. The designated zoom factor is outputted from the zoom factor designation unit 301 as the photographer-designated zoom factor signal 306.

The framing area clipping unit 603 magnifies or reduces the framing area 160 set by the framing area setting signal 110 according to the zoom factor shown by the photographer-designated zoom factor signal 306, and clips an image of a range corresponding to the zoom factor out of the input image 105. The size of the clipped image of the framing area 160 is converted by the display image size adjustment unit 119 to match the display image size of the framing area display unit 109, and the converted image is displayed by the framing area display unit 109. The photographer 60 can visually check the image capturing angle of view while also taking the zoom factor into consideration, by viewing the image displayed by the framing area display unit 109.

The recording medium unit 604 stores the input image 105, the framing area setting signal 110, and the photographer-designated zoom factor signal 306. The framing area setting signal 110 is the coordinate information of the framing area 160 explained with reference to FIG. 7, and is used when clipping the framing area out of the input image 105 at the time of reproduction. The input image 105, the framing area setting signal 110, and the photographer-designated zoom factor signal 306 are outputted from the recording medium unit 604 as a reproduction image signal 605. In this embodiment, the outer-frame area 161 determined by the framing area setting signal 110 is fixed, and repeatedly put to use for each frame. Accordingly, the framing area setting signal 110 is supplied to the reproduction unit 602 in a state of, for example, being written in a header unit of the reproduction image signal 605.

Figure 32:
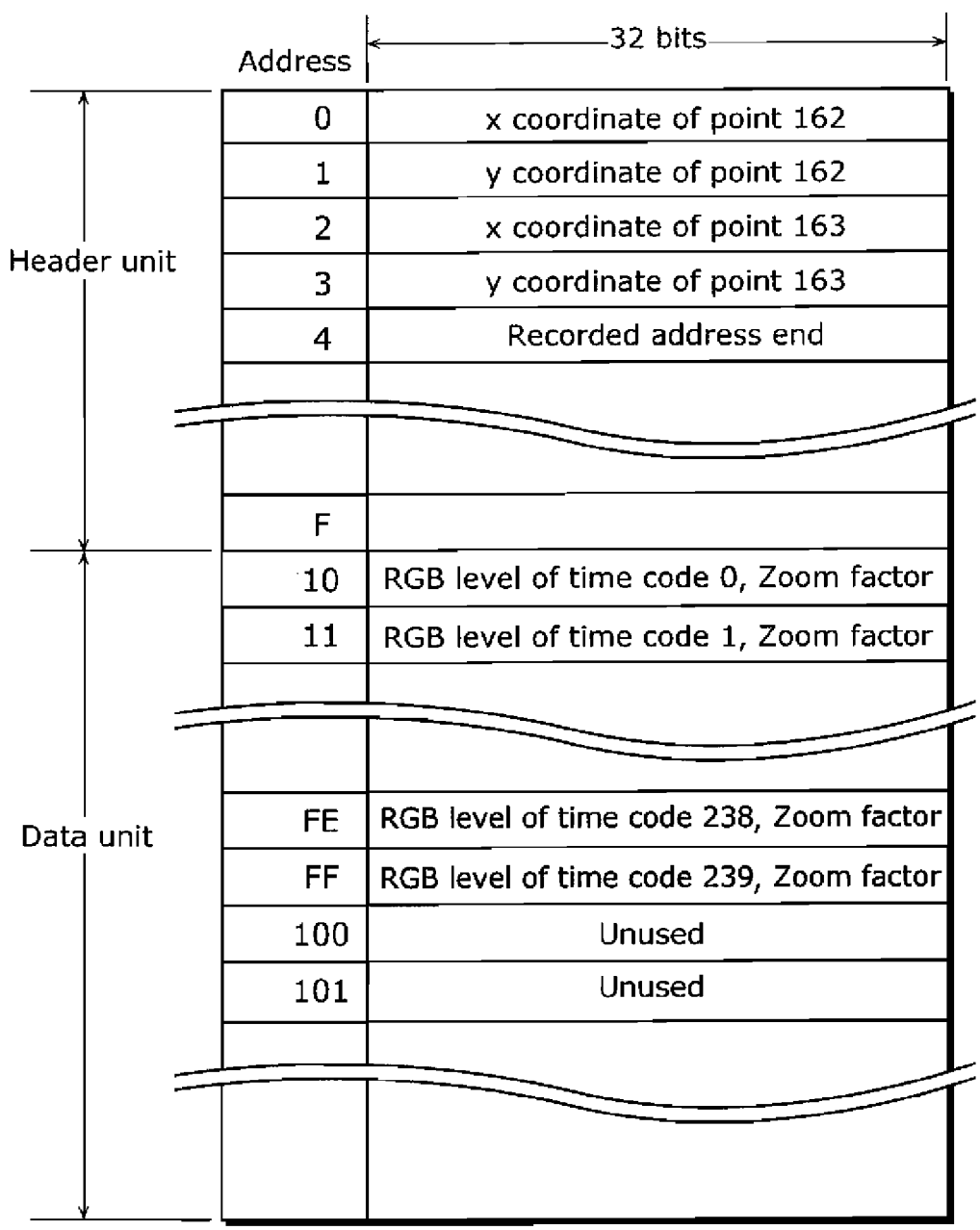
FIG. 32 shows an example of a data structure of a recording medium unit in the seventh embodiment of the present invention.

FIG. 32 shows an example of a data structure of the recording medium unit 604.

In memory addresses expressed in hexadecimal, address 0 to address F constitute a header unit. The x and y coordinates of the point 162 and the x and y coordinates of the point 163 which show the spatial position of the framing area 160 as explained with reference to FIG. 7 are respectively recorded in address 0, address 1, address 2, and address 3. Addresses from address 10 onward constitute a data unit, where RGB levels of the input image 105 and the photographer-designated zoom factor signal 306 are recorded, In detail, each of R, G, B, and the photographer-designated zoom factor signal 306 is set at 8 bits, and these are recorded in a 32-bit width per address.

A time code showing a time position in a video sequence corresponds to an address, such that a frame image of time code 0 is recorded in address 10 and a frame image of time is code 1 is recorded in address 11. When recording the input image 105 and the photographer-designated zoom factor signal 306 to the recording medium unit 604, the image capturing and recording unit 601 designates a recording position by an address. In the case of additional recording, the image capturing and recording unit 601 designates an address following an end of recorded addresses. The end of recorded addresses is written in address 4 in the header unit. In the example of FIG. 32, address 10 to address FF have already been recorded. Accordingly, RGB levels of the input image 105 and the photographer-designated zoom factor signal 306 are additionally recorded from address 100. After the additional recording ends, address 4 is updated by writing an address in which the input image 105 was last recorded.

The reproduction unit 602 operates according to a reproduction instruction which is issued to the reproduction instruction unit 506 by the photographer 60. Upon receiving the reproduction instruction from the reproduction instruction unit 506, the recording medium control unit 507 causes the motion vector calculation unit 606 and the framing area clipping unit 614 to read the reproduction image signal 605 from the recording medium unit 604. In the reproduction unit 602, a signal indicated by a dashed-dotted line corresponds to an operation according to the reproduction instruction by the photographer 60, and the reproduction image signal 605 is outputted from the recording medium unit 604 according to the reproduction instruction from the reproduction instruction unit 506. This operation is separated from the image capturing and recording unit 601. To show this independence, each signal synchronous with the reproduction instruction is indicated by a dashed-dotted line in FIG. 31. The output image size selection signal 123 described later is a signal according to the reproduction instruction, too.

The motion vector calculation unit 606 extracts the input image 105 from the reproduction image signal 605, and calculates movements of feature points in the input image 105 as motion vectors. The motion vector calculation unit 606 outputs the calculated motion vectors and the framing area setting signal 110 and the photographer-designated zoom factor signal 306 included in the reproduction image signal 605, as a framing-area-added motion vector signal 607.

The stationary object detection unit 608 extracts the coordinate information of the framing area from the framing-area-added motion vector signal 607, and sets the outer-frame area 161 as explained with reference to FIG. 7. The stationary object detection unit 608 also extracts motion vectors included in the outer-frame area 161 from the framing-area-added motion vector signal 607, to detect stationary object motion vectors. The stationary object detection unit 608 outputs the detected stationary object motion vectors and the framing area setting signal 110 and the photographer-designated zoom factor signal 306 included in the framing-area-added motion vector signal 607, as a framing-area-added stationary object motion vector signal 609.

The camera movement calculation unit 610 extracts the stationary object motion vectors from the framing-area-added stationary object motion vector signal 609, and calculates a camera movement. The camera movement calculation unit 610 outputs the calculated camera movement and the framing area setting signal 110 and the photographer-designated zoom factor signal 306 included in the framing-area-added stationary object motion vector signal 609, as a framing-area-added camera movement signal 611.

The framing area modification unit 612 first extracts the coordinate information of the framing area from the framing-area-added camera movement signal 611, and sets the framing area 160 as explained with reference to FIG. 7. The framing area modification unit 612 then extracts the camera movement from the framing-area-added camera movement signal 611, and modifies the framing area to a position that compensates for image blurring, by moving the framing area in an opposite direction to and by a same magnitude as the camera movement. The framing area modification unit 612 further extracts the photographer-designated zoom factor signal 306 from the framing-area-added camera movement signal 611, and magnifies or reduces the blurring-corrected framing area according to the zoom factor designated by the photographer. Positional information of the framing area on which the image blurring correction and the zoom factor have been reflected is outputted as a modified framing area signal 613.

The modified framing area clipping unit 614 extracts the input image 105 from the reproduction image signal 605, and clips the framing area shown by the modified framing area signal 613 on which the image blurring correction and the zoom factor have been reflected, to generate a blurring-corrected framing image. The modified framing area clipping unit 614 outputs the blurring-corrected framing image and the framing area setting signal 110 and the photographer-designated zoom factor signal 306 included in the reproduction image signal 605, as a framing-area-added blurring-corrected framing image 615.

The output image size adjustment unit 616 extracts the blurring-corrected framing image from the framing-area-added blurring-corrected framing image 615. The output image size adjustment unit 616 also extracts the framing area setting signal 110 and the photographer-designated zoom factor signal 306 from the framing-area-added blurring-corrected framing image 615, and detects the number of horizontal pixels and the number of lines of the framing area 160 on which the zoom factor has been reflected. The number of horizontal pixels and the number of lines of the framing area 160 on which the zoom factor has been reflected match the number of horizontal pixels and the number of lines of the blurring-corrected framing image extracted from the framing-area-added blurring-corrected framing image 615. Meanwhile, the output image size selection signal 123 shows the number of horizontal pixels and the number of lines of the output image 102. The output image size adjustment unit 616 compares the number of horizontal pixels and the number of lines of the blurring-corrected framing image extracted from the framing-area-added blurring-corrected framing image 615 with the number of horizontal pixels and the number of lines of the output image 102, and adjusts the size of the blurring-corrected framing image to the size of the output image 102 by an image magnification process or an image reduction process, to obtain the output image 102.

Though the photographer 60 makes the reproduction instruction in the example of FIG. 31, the photographer and the person who makes the reproduction instruction need not be the same, and the reproduction instruction may be made by another person.

As described above, according to the image capturing and recording/reproduction apparatus 600 in this embodiment, the angle of view can be changed by the photographer 60 by zoom, and a also the image capturing and recording function and the image blurring correction function can be separated from each other. This allows the image capturing and recording unit 601 to be made slimmer while enabling framing to be performed freely, with it being possible to achieve reductions in size, weight, power consumption, and cost of the appliance. The smaller and lighter appliance is suitable for capturing, for example, an image of a sport scene in which a subject moves actively. Moreover, the lower-power appliance has an advantage of a longer image capturing period, and is convenient for outdoor image capturing using a battery. In image blurring correction by the reproduction unit 502, a camera movement is detected from a stationary object in the outer-frame area. Accordingly, image blurring can be corrected even in the case where two or more players move in various directions at various speeds. Therefore, the subject can be captured from various angles and distances without using a tripod, with it being possible to produce an image with high expressiveness. Moreover, a special consideration such as holding the camera with the elbows brought tightly into the body as in the conventional techniques becomes unnecessary. As a result, even the user who is unaccustomed to the camera can freely capture video without worrying out image blurring.

As described above, the present invention can be applied to all types of video appliances such as a video movie camera, a television, a digital still camera having a moving image capturing function, and a camera mobile phone. In addition, the present invention can be applied to personal computers which are used widely.

Although the present invention has been described by way of the first to seventh embodiments, changes and modifications may be appropriately made to each of the embodiments, and the features of the embodiments may be combined so long as they are not mutually contradictory.

INDUSTRIAL APPLICABILITY

The image capturing apparatus and the image capturing and recording/reproduction apparatus according to the present invention enable even a user who is unaccustomed to a camera to freely capture video without worrying about image blurring. Hence the present invention has a significant advantage of making video capturing easier and thereby allowing more people to enjoy video capturing. The expansion of video photographers leads to the expansion of capturing subjects, and increases opportunities that not only sport scenes but also various video content can be distributed in the world. This also has news quality and artistic quality, and influences every situation of video communication. Thus, the image capturing apparatus and the image capturing and recording/reproduction apparatus according to the present invention provide unlimited potential to the development of video communication.

The invention claimed is:

1. An image capturing apparatus that captures an image and corrects blurring of the captured image, said image capturing apparatus comprising:
   an image capturing unit configured to capture an image;
   an output unit configured to output an image of a framing area, the framing area being a part of a spatial area of the image captured by said image capturing unit;
   a movement detection unit configured to detect motion vectors in an outer area in the spatial area of the image captured by said image capturing unit, and derive a dispersion of the detected motion vectors as detection accuracy;
   an area adjustment unit configured to adjust a size of the outer area so that the detection accuracy derived by said movement detection unit meets a predetermined threshold; and
   a correction unit configured to correct blurring of the image outputted by said output unit, by moving the framing area according to the motion vectors detected by said movement detection unit in the outer area of the size which has been adjusted by said area adjustment unit, irrespective of a movement of an image in an inner area in the spatial area.

2. The image capturing apparatus according to claim 1, further comprising
   a framing area setting unit configured to set, according to the size of the outer area adjusted by said area adjustment unit, a size of the framing area so that a boundary of the outer area and a boundary of the framing area coincide with each other.

3. The image capturing apparatus according to claim 1, wherein said image capturing unit is configured to capture the image so that an image of a moving subject is contained in the inner area.

4. The image capturing apparatus according to claim 1, further comprising
   an angle-of-view adjustment unit configured to make an angle of view of the image captured by said image capturing unit wider, when the size of the outer area is adjusted to be larger by said area adjustment unit.

5. The image capturing apparatus according to claim 1, further comprising
   a zoom adjustment unit configured to zoom in or out the image outputted by said output unit, by changing an angle of view of the image captured by said image capturing unit or a size of the framing area according to an operation by a user.

6. The image capturing apparatus according to claim 1, further comprising
   a storage unit in which the image captured by said image capturing unit is stored,
   wherein said output unit and said movement detection unit are each configured to read the image stored in said storage unit and process the read image.

7. The image capturing apparatus according to claim 1, wherein said movement detection unit is configured to detect the motion vectors each of which has at least one of an initial point and a terminal point included in the outer area.

8. The image capturing apparatus according to claim 1, wherein said movement detection unit is configured to further extract, from the detected motion vectors, motion vectors having higher similarity to a mean of the detected motion vectors as motion vectors of an image of a stationary object, with a higher priority, and
   said correction unit includes:
   a calculation unit configured to calculate a mean motion vector showing a mean of the extracted motion vectors of the image of the stationary object; and
   a framing area modification unit configured to move the framing area according to the mean motion vector.

9. The image capturing apparatus according to claim 1, further comprising
   a correction judgment unit configured to judge whether or not to perform the correction, according to a movement of the image captured by said image capturing unit,
   wherein said correction unit is configured to cancel the movement of the framing area, when said correction judgment unit judges not to perform the correction.

10. The image capturing apparatus according to claim 1, wherein said movement detection unit and said area adjustment unit are configured to repeat respective processes until the detection accuracy meets the predetermined threshold, by said movement detection unit re-performing the detection in the outer area of the size which has been adjusted by said area adjustment unit, and
   said area adjustment unit is configured to adjust the size of the outer area to a smaller extent than in previous adjustment, when repeating the adjustment of the size of the outer area.

11. The image capturing apparatus according to claim 1, further comprising:
   a clipping unit configured to clip the image of the framing area out of the image captured by said image capturing unit; and
   a size adjustment unit configured to magnify the image clipped by said clipping unit, wherein said output unit is configured to output the image magnified by said size adjustment unit.

12. The image capturing apparatus according to claim 11, wherein said size adjustment unit includes:
a resource data storage unit in which low-resolution resource data and high-resolution resource data are stored for each image, the low-resolution resource data showing the image in a low resolution, and the high-resolution resource data showing the image in a high resolution; and
a similar data search unit configured to magnify the image clipped by said clipping unit, by searching said resource data storage unit for low-resolution resource data that shows an image having similarity to the clipped image, and extracting high-resolution resource data corresponding to the low-resolution image data from said resource data storage unit.

13. The image capturing apparatus according to claim 12, wherein said similar data search unit is configured to search for the low-resolution resource data that shows a spatial frequency characteristic having similarity to a spatial frequency characteristic of the image clipped by said clipping unit.

14. An image capturing method for capturing an image and correcting blurring of the captured image, said image capturing method comprising:
capturing an image;
outputting an image of a framing area, the framing area being a part of a spatial area of the image captured in said capturing;
detecting motion vectors in an outer area in the spatial area of the image captured in said capturing, and deriving a dispersion of the detected motion vectors as detection accuracy;
adjusting a size of the outer area so that the detection accuracy derived in said deriving meets a predetermined threshold; and
correcting blurring of the image outputted in said outputting, by moving the framing area according to the motion vectors detected in said detecting in the outer area of the size which has been adjusted in said adjusting, irrespective of a movement of an image in an inner area in the spatial area.

15. A program for capturing an image and correcting blurring of the captured image, said program causing a computer to execute:
capturing an image;
outputting an image of a framing area, the framing area being a part of a spatial area of the image captured in said capturing;
detecting motion vectors in an outer area in the spatial area of the image captured in said capturing, and deriving a dispersion of the detected motion vectors as detection accuracy;
adjusting a size of the outer area so that the detection accuracy derived in said deriving meets a predetermined threshold; and
correcting blurring of the image outputted in said outputting, by moving the framing area according to the motion vectors detected in said detecting in the outer area of the size which has been adjusted in said adjusting, irrespective of a movement of an image in an inner area in the spatial area.

* * * * *